: United States Patent (10) Patent No.: US 6,675,880 B2
Namba et al. (45) Date of Patent: Jan. 13, 2004

(54) AIR HEATER FOR RECOVERING A HEAT OF EXHAUST GAS

(75) Inventors: Masao Namba, Tamano (JP); Kenzo Miura, Tamano (JP); Yoshitada Tomoyasu, Tamano (JP); Hidehiro Kiuchi, Tamano (JP); Yasuaki Harada, Chuo-ku (JP); Teruo Urayama, Tamano (JP); Kazuo Shimamura, Chuo-ku (JP); Norio Tezuka, Ichihara (JP)

(73) Assignee: Mitsui Engineering and Shipbuilding Company Limited (JP)

( * ) Notice: Subject to any disclaimer, the term of this patent is extended or adjusted under 35 U.S.C. 154(b) by 165 days.

(21) Appl. No.: 09/985,779

(22) Filed: Nov. 6, 2001

(65) Prior Publication Data

US 2002/0058225 A1 May 16, 2002

Related U.S. Application Data

(63) Continuation-in-part of application No. 09/142,432, filed as application No. PCT/JP97/01098 on Mar. 31, 1997, now abandoned.

(30) Foreign Application Priority Data

Mar. 29, 1996 (JP) .............................. 8-077675
Aug. 10, 1996 (JP) .............................. 8-227601
Aug. 14, 1996 (JP) .............................. 8-214658
Aug. 14, 1996 (JP) .............................. 8-214659
Dec. 13, 1996 (JP) .............................. 8-333224
Feb. 28, 1997 (JP) .............................. 9-046089
Feb. 28, 1997 (JP) .............................. 9-046090

(51) Int. Cl.[7] ........................ F23L 15/00; F25F 13/00
(52) U.S. Cl. ................... 165/135; 165/136; 165/901; 165/905; 110/302
(58) Field of Search ........................... 165/135, 136, 165/75, 80.4, 901, 164, 154, 155, 905; 110/203, 211, 301, 302, 322, 323

(56) References Cited

U.S. PATENT DOCUMENTS

| 2,200,694 A | 5/1940 | Gerecke et al. ............. 165/180 |
| 2,215,173 A | 9/1940 | Clarke ...................... 165/109.1 |
| 2,578,917 A | 12/1951 | Bisch ........................ 165/164 |
| 2,632,089 A | 3/1953 | Buckmaster ............. 165/109.1 |
| 2,856,905 A | 10/1958 | Bowen, III ................. 165/180 |
| 2,944,494 A | 7/1960 | Mary |
| 2,944,531 A | 7/1960 | Mary ......................... 110/260 |
| 2,969,967 A | * 1/1961 | Buhrer et al. ............. 165/74 X |
| 2,988,851 A | 6/1961 | Holscher .................... 165/135 |
| 3,065,768 A | 11/1962 | Delsa |
| 3,301,320 A | 1/1967 | Huntington ................. 165/154 |
| 3,346,042 A | 10/1967 | Seehausen .................. 165/154 |
| 3,416,011 A | 12/1968 | Lyczko ....................... 165/154 |
| 3,446,279 A | 5/1969 | White ........................ 165/155 |

(List continued on next page.)

FOREIGN PATENT DOCUMENTS

| EP | 0 253 633 | 1/1988 |
| GB | 845365 | 8/1960 |
| JP | 8-14207 | 9/1933 |
| JP | 56-54451 | 12/1981 |
| JP | 60-61697 | 4/1985 |
| JP | 63-38888 | 2/1988 |
| JP | 2-7477 | 1/1990 |

Primary Examiner—Ljiljana Ciric
(74) Attorney, Agent, or Firm—Parkhurst & Wendel, L.L.P.

(57) ABSTRACT

A high temperature air heater including a heat transfer conduit located in higher temperature gas. The heat transfer conduit is made up of a heat transfer pipe through which the air to be heated flows and a refractory protective pipe covering the heat transfer pipe. A clearance is provided between the heat transfer pipe and the refractory protective pipe. The clearance makes it possible to accommodate the differences in thermal expansion between the heat transfer pipe and the refractory protective pipe to prevent damaging the refractory protective pipe, thus extending the service life of the high temperature air heater.

1 Claim, 45 Drawing Sheets

U.S. PATENT DOCUMENTS

| | | | | |
|---|---|---|---|---|
| 3,754,869 A | | 8/1973 | Van Raden | 110/210 |
| 3,814,174 A | | 6/1974 | Beggs | 165/135 |
| 3,913,663 A | | 10/1975 | Gates | 165/154 |
| 4,072,189 A | | 2/1978 | Chaix et al. | 165/155 |
| 4,106,556 A | * | 8/1978 | Heyn et al. | 165/81 |
| 4,248,834 A | | 2/1981 | Tokumitsu | 165/135 |
| 4,421,159 A | * | 12/1983 | Lin | 165/41 X |
| 4,453,570 A | | 6/1984 | Hutchinson | 138/149 |
| 4,528,761 A | | 7/1985 | Kolhi | 165/155 |
| 4,546,709 A | * | 10/1985 | Astrom | 110/266 X |
| 4,632,043 A | | 12/1986 | Pendergraft | 110/346 |
| 4,682,568 A | | 7/1987 | Green et al. | 165/180 |
| 4,817,672 A | | 4/1989 | Broodman | 165/154 |
| 4,874,037 A | * | 10/1989 | Papst et al. | 165/47 |
| 4,965,107 A | | 10/1990 | Oshima et al. | 138/114 |
| 5,092,304 A | * | 3/1992 | McNelley | 165/41 X |
| 5,463,528 A | | 10/1995 | Umezawa | 165/80.4 |
| 5,718,281 A | * | 2/1998 | Bartalone et al. | 165/41 |

\* cited by examiner

AIR HEATER FOR RECOVERING A HEAT OF EXHAUST GAS

This is a Continuation-in-Part of U.S. Ser. No. 09/142,432, filed Sep. 9, 1998, now abandoned.

TECHNICAL FIELD

The present invention relates to the air heater for recovering a heat of exhaust gas from an incinerator for disposing wastes. More particularly, the invention relates to an apparatus for heating air that is capable of recovering heat energy out of burnt exhaust gas of elevated temperature by heat exchange with air and hence of using the resultant heat energy to advantage, where exhaust gas occurs during incineration of wastes (in which are included combustibles of general wastes such as municipal wastes disposed of by households and offices and also of industrial wastes such as waste plastics, shredded car dusts, waste office equipment, waste electronic equipment, waste cosmetic containers and the like) in a incinerator for municipal wastes and in an incinerator for industrial wastes. The invention also relates to an apparatus for disposing of wastes which is provided with the above heating apparatus.

BACKGROUND ART

An incinerator for municipal wastes and an incinerator for industrial wastes have been equipped with an apparatus for heating high-temperature air in order to recover and utilize the heat energy of burnt gas of elevated temperature derived by incinerating those wastes. This heating apparatus of high-temperature air is so designed that heat is recovered by allowing air to flow through a heat transfer conduit formed of a metal, followed by heating of the air on heat exchange with the burnt gas of elevated temperature. The heat energy thus recovered is utilized as a heat source in decomposing wastes thermally, in generating electricity and in other systems.

In FIG. 49, there is shown one form of a conventional heating apparatus of high-temperature air. A burning melting portion 49 is located upwardly of a burning melting furnace 53, and a heating apparatus 1 of high-temperature air is disposed downwardly of that apparatus. In the burning melting portion 49, gas and air for use in combustion are supplied to a burner 56 so as to burn combustible components such as wastes at a high temperature of about 1300° C. so that a melted slug 53f and a burnt exhaust gas G are generated. Usually, the burnt exhaust gas G contains dust (refuse) and constitutes a highly corrosive gas including corrosive materials such as chlorine and hydrogen chloride which, however, depend on the kind of wastes. In such furnace, the burnt exhaust gas flows at a temperature of 1000–1100° C. and at a flow rate of about 2–3 m/sec. The heating apparatus 1 of high-temperature air is essentially constructed with a heat transfer conduit 9 arranged to recover the heat from the burnt exhaust gas G of high temperature stated above. For the heating apparatus 1 of high-temperature air to entrap heated air in a large quantity, the heat transfer conduit 9 is structured to be elongate and is usually disposed in a plurally paralleled posture.

It is required, therefore, that such heat transfer conduit located in the incineration furnace and exposed to a high temperature and to a highly corrosive gas atmosphere should be sufficiently durable, in respect of both the material and the structure, with respect to the corrosive gas of elevated temperature noted above. As means for imparting improved corrosion resistance to the heating apparatus of high-temperature air, it is thought that a stud pin could be welded to the heat transfer conduit formed of a metal, and an castable refractory material could be placed in surrounded relation to that pin and that refractory bricks basically of a rectangular parallelopiped shape could be arranged with their joints connected lengthwise and widthwise. These systems permit such a refractory material to act as a physical barrier against convection and mutual diffusion in a corrosive gas phase, and therefore, can somewhat prevent the heat transfer conduit from getting corroded.

Problems to be Solved by the Invention

However, each such system leads to cracked refractory material, eventually resulting in corroded and impaired fixing jig for the refractory material, or in damaged and detached refractory material itself, because of the difference in thermal expansion which arises from combination of different materials between the refractory material and the metallic heat transfer conduit. This causes a serious corrosion phenomenon in which the metallic heat transfer conduit becomes corrosively damaged, creating the problem that the heating apparatus of high-temperature air suffers from shortened service life and hence from reduced working efficiency with consequent decline in the efficiency of heat recovery upon heat exchange.

Moreover, the heat transfer conduit has the problem that it is rather elongate and hence liable to be thermally deformable and bendable. Another problem is that since a plurality of heat transfer conduits are disposed in parallel to each other, dust contained in an exhaust gas gets deposited between those conduits, thus inviting reduced efficiency of heat recovery based on heat exchange.

One object of the present invention is to attain prolonged service life in an apparatus for heating high-temperature air and also to make the apparatus highly efficiently workable, thereby gaining improved efficiency of heat recovery through heat exchange. For other objects, the invention provides an apparatus for heating high-temperature air which is less thermally deformable and less susceptible to dust deposition, and further an apparatus for disposing of wastes which is provided with such heating apparatus.

Disclosure of the Invention

In order to achieve the foregoing objects, the present invention is constructed as will be described hereinbelow.

In the invention recited in claim 1, there is provided an apparatus for heating high-temperature air characterized in that such appratus is located for use in an atmosphere containing a gas of elevated temperature and has a heat transfer conduit disposed to heat, by means of heat exchange with the gas of elevated temperature, air to be heated and caused to flow through the heat transfer conduit, and such heat transfer conduit comprises a heat transfer pipe arranged to flow the air to be heated therethrough, and a refractory protective pipe formed of a refractory material and held in coaxially covered relation to the heat transfer pipe with a gapping defined between the protective pipe and the heat transfer pipe.

According to this invention, the heat transfer pipe (usually formed of a metal) and the refractory protective pipe formed of a refractory material are less susceptible, by the provision of such gapping, to mutual propagation of those effects attributable to different thermal expansion of the different materials used for formation of both pipes. This makes it possible to reduce damaged and detached portion of the refractory material which tends to result from such varied thermal expansion.

In the invention recited in claim 2, there is provided an apparatus for heating high-temperature air characterized in that such apparatus is located for use in an atmosphere containing a gas of elevated temperature and has a heat transfer conduit disposed to heat, by means of heat exchange with the gas of elevated temperature, air to be heated and flowing through the heat transfer conduit, and such heat transfer conduit comprises an inner heat transfer pipe formed of a metal and opened at a tip thereof, and an outer heat transfer pipe formed of a refractory material and held in coaxially covered relation to the inner metallic heat transfer pipe with a spacing defined between the outer and inner pipes, and after being caused to flow through the inner metallic heat transfer pipe, the air to be heated is heated with the gas of elevated temperature while the former air is being passed at from the open tip of the inner pipe through the spacing between the inner and outer pipes.

In this invention, damaged and detached portion of the refractory material due to the different thermal expansion stated above can likewise be reduced by the provision of such gap passage.

The invention recited in claim 3 is as set forth in claim 1 or 2 and is characterized in that the refractory protective pipe or the outer refractory heat transfer pipe is structured to have an angular face in cross section, and the heat transfer conduit is disposed in a plural number and fixed in face-to-face contact with the adjoining protective pipe or heat transfer pipe at its sectional angular face.

According to this invention, the refractory protective pipe or the outer refractory heat transfer pipe is formed to be angular in a tetrahedral shape or the like when seen cross-sectionally, and the heat transfer conduit is disposed in a plural number and fixed in face-to-face contact with the adjoining protective pipe or heat transfer pipe. Therefore, the heating apparatus of high-temperature air so constructed leads to improved structural rigidity, resulting in a marked decrease in the thermal decomposition discussed above. Furthermore, such face-to-face arrangement renders the apparatus flat throughout the surface thereof and hence less prone to dust deposition on the surface than an arrangement having a concave and convex surface so that the efficiency of heat transfer can be maintained on a high level and over an extended period of time.

The invention recited in claim 4 is as set forth in claim 1 or 3 and is characterized in that the heat transfer pipe of the heat transfer conduit comprises an inner heat transfer pipe formed of a metal, and an outer heat transfer pipe formed of a metal and held in covered relation to the inner metallic heat transfer pipe with a spacing defined between the two pipes, the air to be heated is heated with the gas of elevated temperature while the former air is being passed through the spacing disposed between the inner and outer pipes, and such refractory protective pipe is arranged to cover the outer metallic heat tradfer pipe and disposed coaxially of the latter pipe with a gapping defined between the protective and outer pipes.

The invention recited in claim 5 is as set forth in claim 1 or 3 and is characterized in that the heat transfer pipe of the heat transfer conduit comprises an outer heat transfer pipe formed of a metal, and an inner pipe arranged to communicate with one end of the outer pipe with a spacing defined between the outer and inner pipes, the inner pipe is formed into a thermally insulated structure with a lower thermal conductivity than the metal, and the air to be heated is heated with the gas of elevated temperature along an outer wall of the outer metallic heat transfer pipe while the former air is being passed through the spacing defined between the outer metallic heat transfer pipe and the inner thermal insulating pipe.

According to these inventions, the air to be heated is heated alone which is allowed to flow through the spacing defined between the outer metallic heat transfer pipe and the inner thermally insulating pipe, but the air being passed through the inner thermally insulating pipe is not heated together with the former air. Namely, the air present in the inner pipe is thermally isolated such that the temperature change of the air to be heated in the inner pipe is held to so small an extent as to be acceptable. Enhanced heat transfer efficiency as well as simplified temperature control is thus feasible.

More specifically, with use of the heat transfer conduit constructed such that the heat of the gas of elevated temperature is recovered by allowing air to be heated to flow through the spacing defined between the outer metallic heat transfer pipe and the inner heat transfer pipe, followed by discharging of the resultant heat through the inner heat transfer pipe at from the one end thereof made to communicate with the outer heat transfer pipe, or with use of the heat transfer conduit constructed such that the heat recovery is effected by flowing the air in a reverse direction, the heat of the gas of elevated temperature is recovered by the air being flowed in the spacing between such outer and inner pipes and along the metallic wall of the outer pipe. In this case, the recovered heat gets transmitted along the metallic wall of the inner heat transfer pipe up to the air flowing through such inner pipe. For that reason, conventional practice has the problem that the air present in the inner heat transfer pipe is markedly changeable in temperature, and the air to be heated when taken outside is variable in temperature, the efficiency of heat transfer being thus difficult to obtain as desired. In order to gain desired heat transfer efficiency, the air present in the outer heat transfer pipe located outwardly of the inner heat transfer pipe is required to be unnecessarily higher. This invites a small temperature difference between a gas of elevated temperature and an air in the outer heat transfer pipe with eventual need for a wide area of heat transfer, forcing conventional practice to employ an apparatus of a large scale. The present invention is so constructed that the heat of a gas of elevated temperature is transmitted solely to an air to be heated and caused to flow through the spacing between the outer metallic heat transfer pipe and the inner thermally insulating pipe. That is to say, such gas heat can be prevented from transmission up to an inner wall of the inner pipe. Hence, a desirable efficiency of heat transfer is obtainable.

The invention recited in claim 6 is as set forth in claim 5 and is characterized in that the inner pipe is formed of a thermally insulating material of low thermal conductivity other than a metal. The invention recited in claim 7 is characterized in that the inner pipe is brought into a thermally insulated structure in which the thermally insulating material is sandwiched with metallic tubes. The invention recited in claim 8 is characterized in that the inner pipe is brought into a thermally insulated structure in which such pipe is formed of a metal and in a double-piped vacuum-drawn arrangement. In the invention recited in claim 9, the thermal insulating material is specified to be ceramics. A highly thermally insulating material such as for example ceramics is used, as claimed, as a material itself for formation of the inner pipe so that structural simplicity is attained.

The invention recited in claim 10 is as set forth in any one of claims 4–9 and is characterized in that the air to be heated is caused to flow in a direction reverse to that of the gas of elevated temperature through the spacing between the inner pipe and the outer pipe, both of which pipes are arranged to constitute the heat transfer conduit. This is conducive to improved efficiency of heat transfer.

The invention recited in claim 11 is as set forth in any one of claims 1, 3–9 and is characterized in that a plurality of support materials are fixedly placed outwardly of the heat transfer pipe to thereby support the refractory protective pipe.

These support materials allow the gapping between the heat transfer pipe and the refractory protective pipe to be substantially uniform throughout the length thereof. As a consequence of provision of the support materials, even if such conduit and pipe are elongate, they are free from fear of being in partial contact with each other. Additionally, the refractory protective pipe of great mass can be held in firmly supported relation to the heat transfer pipe with the result that the former pipe is less likely to become unstable.

The invention recited in claim 12 is as set forth in any one of claims 4–11 and is characterized in that the gapping is defined to communicate with a passageway for flow of the air to be heated with a through hole made in a wall of the outer metallic heat transfer pipe.

This construction imparts to the gapping a positive pressure with respect to the external atmosphere, thus decreasing a tendency for the gas of elevated temperature to intrude from the outside into the refractory protective pipe. The outer metallic heat transfer pipe can thus be reliably prevented from getting corrosively deteriorated.

The invention recited in claim 13 is as set forth in any one of claims 1–12 and is characterized in that a partitioned gapping is defined at a region where a tip of the heat transfer pipe is opposed to a tip of the refractory protective pipe or the refractory heat transfer pipe, and the air to be heated is introduced into such space partitioned at the pipe tips. The same beneficial effects as in the invention of claim 12 are obtainable also in the partitioned space.

The invention recited in claim 14 is as set forth in any one of claims 4–11 and is characterized in that means is disposed for introducing extraneous air into the gapping between the refractory protective pipe and the outer metallic heat transfer pipe.

In this invention, because the extraneous air is introduced into the gapping between the refractory protective pipe and the outer metallic heat transfer pipe, a corrosive gas can be completely avoided from becoming reversely diffused toward and intermixed with the air to be heated as would be encountered in purging the corrosive gas by leakage of the air to be heated out of an opening made in a wall of the heat transfer pipe. This reveals enhanced anticorrosion and improved reliability concerning the associated apparatus.

The invention recited in claim 15 is as set forth in claim 14 and is characterized in that a partitioned gapping is defined at a region where a tip of the outer metallic heat transfer pipe is opposed to a tip of the refractory protective pipe, and the extraneous air is introduced into such gapping partitioned at the pipe tips. The same beneficial effects as noted in the invention of claim 14 are attained also in the partitioned gapping.

The invention recited in claim 16 is as set forth in any one of claims 1–15 and is characterized in that the tip of the refractory protective pipe or the outer refractory heat transfer pipe is formed in a convex shape so as to be less resistant to gas flow of elevated temperature.

In this invention, such convex tip has a role to relax those thermal effects of concentrated thermal stress and the like arising from contact of the refractory protective pipe or the outer refractory heat transfer pipe with the gas flow of elevated temperature, eventually leading to reduced damage of wear and breakage as to the top end of either of such pipes.

The invention recited in claim 17 is as set forth in claim 16 and is characterized in that the convex shape is of a hemispherical shape. This hemispherical shape makes it possible to uniformly distribute those thermal effects having produced on the tip, contributing to further reduced damage to the tip.

Additionally, the convex shape may be a conical shape as in the invention recited in claim 18 and a polyhedral convex shape as in the invention recited in claim 19. The conical shape stated here includes a shape in which the top end is chamfered, and the polyhedral convex shape stated here denotes a convexity shaped to have a polyhedron such as a polypyramid, a polygon or the like. In brief, the convex shape may be of a convexity shaped by a planar face and either one or both of curved faces as in the invention recited in claim 20, and no particular restriction should be imposed on the convex shape. A convexly streamlined shape may also be included.

The invention recited in claim 21 is as set forth in any one of claims 16–20 and is characterized in that the refractory protective pipe or the outer refractory heat transfer pipe of the heat transfer conduit is shaped like a circular pillar when seen outwardly sectionally, and either such pipe is formed to be smoothly extensive from its convex tip to its base portion. The invention recited in claim 22 is as set forth in any one of claims 16–20 and is characterized in that the refractory protective pipe or the outer refractory heat transfer pipe of the heat transfer conduit is shaped like a tetrahedral pillar when seen outwardly sectionally, and either such pipe is formed to be smoothly extensive from its convex tip to its base portion. Here, the smoothly extensive structure is exemplified to be obtainable as by chamfering. This structure can decrease those stepped or angular portions tending to take place from the tip to the base, alleviating the problems of wear and damage of the above pipe which would result from contact with the gas of elevated temperature flowing at a high speed.

The invention recited in claim 23 is as set forth in any one of claims 1–15 and is characterized in that the tip of the refractory protective pipe or the outer refractory heat transfer pipe is formed as a refractory removable cap member.

Therefore, even when the cap member is centrally worn or damaged due to collision with the burnt exhaust gas of elevated temperature caused to flow at a high speed, such cap is easily replaced by a new one.

Now, in the case where the outer metallic heat transfer conduit is constructed with the refractory protective pipe located to flow the air to be heated therethrough, the protective pipe disposed to cover the heat transfer pipe with the gapping defined between the two pipes, and the cap member is screwed with the space provided at a region where the tip of the protective pipe is opposed to the tip of the heat transfer pipe, and in the case where the outer metallic heat transfer pipe is provided with a through hole for the air to be heated and caused to pass therethrough to be partly flowed into the gapping, such cap is spirally secured, i.e., fixedly screwed. The cap is therefore held by means of spiral line contact. This means that no particular stress concentration is existent even if the temperature change (thermal cycling) is present between room temperature and high temperature, and detachment and damage are less likely to take place. Since, moreover, the gapping can be so made in its inside as to have a positive pressure, the gas of elevated temperature is prevented against intrusion from the outside into the refractory protective pipe and the refractory cap member. Also with this point taken in view, part of the refractory material can be alleviated from being impaired, and prolonged cycle of replacement is rendered possible.

To form the cap member into a rotatably screwing type, it is required that, in the case where the heat transfer conduit is arranged in a plural number and on a parallel with each other with no gap left therebetween and with the refractory protective pipe or the outer refractory heat transfer pipe longitudinally positioned in parallel with the direction of gas flow, the outside diameter of the cap member be so decided that the caps of two adjacent heat transfer conduits are not impinged on each other during rotation thereof.

The invention recited in claim 24 is as set forth in claim 23 and is characterized in that the cap member is formed in a convex shape so as to be less resistant to flow of the gas of elevated temperature. By use of this convex cap, those impacts brought about by gas flow of elevated temperature are relaxed so that the cap itself is prevented from wear and damage, and the cycle of replacement is prolonged.

The invention recited in claim 25 is as set forth in claim 23 or 24 and is characterized in that the cap member is screwed to the tip of the heat transfer pipe with a gapping defined at an opposed tip portion, the screwing is effected with a partial gap, and the heat transfer pipe is provided atits tip with a through hole for the air to be heated and caused to pass therethrough to be partly flowed into the gapping. Because the gapping at the screwed portion can be so made in its inside as to have a positive pressure with respect to the external atmosphere, the gas of elevated temperature is prevented against intrusion from the outside into the refractory cap member and subsequent contact with the metallic heat transfer pipe at the screwed portion.

The invention recited in claim 26 is as set forth in any one of claims 23–25 and is characterized in that the refractory protective pipe or the outer refractory heat transfer pipe of the heat transfer conduit is shaped like a circular pillar when seen outwardly sectinonally, and the cap member and either such pipe are connected to each other in an externally smoothly extensive manner. The invention recited in claim 27 is as set forth in any one of claims 23–25 and is characterized in that the refractory protective pipe or the outer refractory heat transfer pipe of the heat transfer conduit is shaped like a tetrahedral pillar when seen outwardly sectionally, and the cap member and either such pipe are connected to each other in an externally smoothly extensive manner. Here, the externally smoothly extensive shape is obtainable by forming such cap and pipe to have the same outside diameter, or by chamfering such cap and pipe when they are different in outside diameter.

The invention recited in claim 28 is as set forth in any one of claims 1–27 and is characterized in that the apparatus for heating high-temperature air comprises a first air heater positioned upstream of a passage for flow of the gas of elevated temperature, wherein a second air heater positioned downward of such flow passage, the air to be heated is supplied to and heated in the second air heater, and the resultant air is then transported to and heated in the first air heater.

The invention recited in claim 29 is as set forth in claim 28 and is characterized in that the apparatus for heating high-temperature air comprises a first air heater positioned upstream of a passage for flow of the gas of elevated temperature, and a second air heater positioned downward of such flow passage, the air to be heated is supplied to and heated in the first and second air heaters, respectively, and the two sorts of air heated are combined together and then taken outside.

In the apparatus for heating high-temperature air constructed as set forth in claim 28 or 29, the heat transfer conduit can be made short in length and light in weight. This makes the associated suspension support structure relatively light in weight and moreover permits simple operation when in dismantling the heat transfer conduit from the flow passage for the gas of elevated temperature during maintenance. Namely, the present invention enables the heat energy of the gas of elevated temperature to be recovered by the use of air, and the apparatus for heating high-temperature air for use of the heat energy to advantage can lead not only to shortened length per one heat transfer conduit and simplified support structure and maintenance operation, but also to simplified installation in terms of space and precision and reduced deformation arising from thermal strain. Thus, improved efficiency of heat transfer is attained.

In the apparatus for heating high-temperature air set forth in claim 28, low-temperature air to be heated is supplied to and heated in the second air heater. The outer heat transfer pipe and the inner heat transfer pipe, both of which are arranged to constitute the second air heater, are made to communicate with each other at one end of each pipe, specifically at a lower end of each pipe. The low-temperature air to be heated is selectively heated by either one of a system in which such air is supplied through the inner pipe to and heated in the outer pipe, and a system in which such air is supplied through the outer pipe to and heated in the inner pipe. The former system may be preferred from the point of view of thermal efficiency.

After being heated at a given temperature in the second air heater as stated above, the air to be heated is heated by either one of a system in which such air is supplied through the first air heater-constituting outer heat transfer pipe to and heated in the inner tube, and a system in which such air is supplied through the inner pipe to and superheated in the outer tube. The latter system may desirably be employed.

On the other hand, in the apparatus for heating high-temperature air set forth in claim 29, the low-temperature air to be heated is supplied to and heated in the first air heater and the second air heater, respectively. With use of the apparatus for heating high-temperature air thus constructed, the area for the flow passage of the air to be heated can be made greater than that of the gas of elevated temperature with eventual decline in pressure loss of the air to be heated. In such instance, the low-temperature air to be heated is heated by selecting either one of a system in which such air is supplied through the second air heater-constituting inner pipe to and heated in the outer heat transfer pipe, and a system in which such air is supplied through the outer heat transfer pipe to and heated in the inner pipe. When thermal efficiency is taken in view, the former system may be desired. The air to be heated and conveyed to the first air heater is heated, as in the second air heater, by selecting either one of a system in which such air is supplied through the inner pipe to and heated in the outer heat transfer pipe, and a system in which such air is supplied through the outer heat transfer pipe to and heated in the inner pipe. The latter system of the two selections is liable to suffer from increased temperature of the air at an inlet of the gas of elevated temperature, increased temperature of the pipe walls and increased temperature of the refractory material. In view of durability, therefore, the former system may be suitably selected.

The invention recited in claim 30 is as set forth in claim 29 and is characterized in that the air to be heated is partly supplied through either one of the first air heater-constituting heat transfer pipe or outer pipe and the inner pipe to and heated in either the inner pipe or the outer pipe, and the remaining portion of the the air to be heated is supplied through either one of the second air heater-constituting heat transfer pipe or outer pipe and the inner pipe to and heated in either the inner pipe or the outer pipe.

The invention recited in claim 31 is directed to the structure of a partition wall for use in an heat exchanger, which partition wall is disposed to separate an air passage from an exhaust gas passage, characterized in that the partition wall comprises a metallic wall placed in contact on one side with the air passage, and a refractory wall placed in contact on one side with the gas passage, a first gapping is defined between the other side of the metallic wall and the other side of the refractory wall and made to communicate with a through hole made in the metallic wall, thereby flowing burnt exhaust gas containing corrosive components and dust into the exhaust gas passage, and a plurality of support materials are securely attached to the other side of the metallic wall so as to support the refractory wall. The invention recited in claim 32 is as set forth in claim 31 and is characterized in that a second gapping is defined between the support materials and the refractory wall and made to communicate with the first gapping.

By the provision of these support materials, the gapping between the metallic wall and the refractory wall can be rendered substantially uniform throught the length thereof, and the refractory wall of great mass can also be held in firmly supported relation to the metallic wall. This gives least fear of the refractory wall becoming unstable. Further, since the air is flowed via the through hole into both the first gapping and the second gapping, the gas of elevated temperature can be prevented from intrusion into these spacings, and the metallic wall and the support materials can be reliably avoided from corrosion. Hence, the metallic wall and the like are noticeably prolonged in service life. In addition, the metallic wall is less corrosive even at high temperature so that it is possible to heat air at high temperature by heat exchange with a larger quantity of heat than is in conventional practice. Energy efficiency can thus be improved as to the finished apparatus on the whole.

In the invention recited in claim 33, there is provided a process for producing a partition wall for use in a heat exchanger wherein the partition wall is disposed to separate an air passage from an exhaust gas passage, the partition wall comprising a metallic wall placed in contact on one side with the air passage, and a refractory wall placed in contact on one side with the gas passage, a first gapping is defined between the other side of the metallic wall and the other side of the refractory wall and made to communicate with a through hole made in the metallic wall, thereby flowing burnt exhaust gas containing corrosive components and dust into the exhaust gas passage, and a plurality of support materials are securely attached to the other side of the metallic wall so as to support the refractory wall, characterized in that such process comprises the steps of disposing an interlaminar material over the other side of the metallic wall by covering vinyl sheet or paper tape thereover, or by coating tar or paint thereover, coating or spraying over the interlaminar material a water-containing castable material in a predetermined thickness, heating the castable material to dry and calcinate the same to thereby form the refractory wall and to remove the interlaminar material therefrom, and subsequently defining the first gapping on the refractory wall where the interlaminar material has been removed.

The invention recited in claim 34 is as set forth in claim 33 and is directed to the process for producing the partition wall wherein a second gapping is defined between the support materials and the refractory wall and made to communicate with the first gapping, characterizied in that such process comprises the steps of disposing an interlaminar material over the support materials, prior to or after welding of the the support materials to the metallic wall, by winding insulating tape made of polyvinyl chloride thereover, by covering vinyl hose cut short thereover, by coating aqueous paint thereover, or by immersing the support materials in stock solution of the aqueous paint, coating or spraying over the interlaminar material a water-containing castable material in a predetermined thickness, heating the castable material to dry and calcinate the same to thereby form the refractory wall and to remove the interlaminar material therefrom, and subsequently defining the second spacing on the support materials where the interlaminar material has been removed.

By use of these processes, a heat exchanger can be produced as desired by the present invention.

In the invention recited in claim 35, there is provided an apparatus for disposing of wastes which is provided with a thermal decomposition reactor in which wastes are thermally decomposed to generate a thermally decomposed gas and a thermally decomposed residue, a separator in which the thermally decomposed residue is separated into combustible components and incombustible components, a burning melting furnace in which the thermally decomposed gas and the combustible components are burnt at a temperature at which to melt ash to thereby discharge incombustible matter as melted slug, and an apparatus for heating high-temperature air in which the heat of gas of elevated temperature is recovered by heat exchange with air, characterized in that such apparatus for heating high-temperature air is as set forth in any one of claims 1–30. This apparatus for disposing of wastes can be improved in its operating efficiency in line with improved operating efficiency of the apparatus for heating high-temperature air.

MODES OF CARRYING OUT THE INVENTION

Embodiment 1

With reference to the drawings, certain specific embodiments of the apparatus for heating high-temperature air according to the present invention are described hereinbelow.

Figure 1:
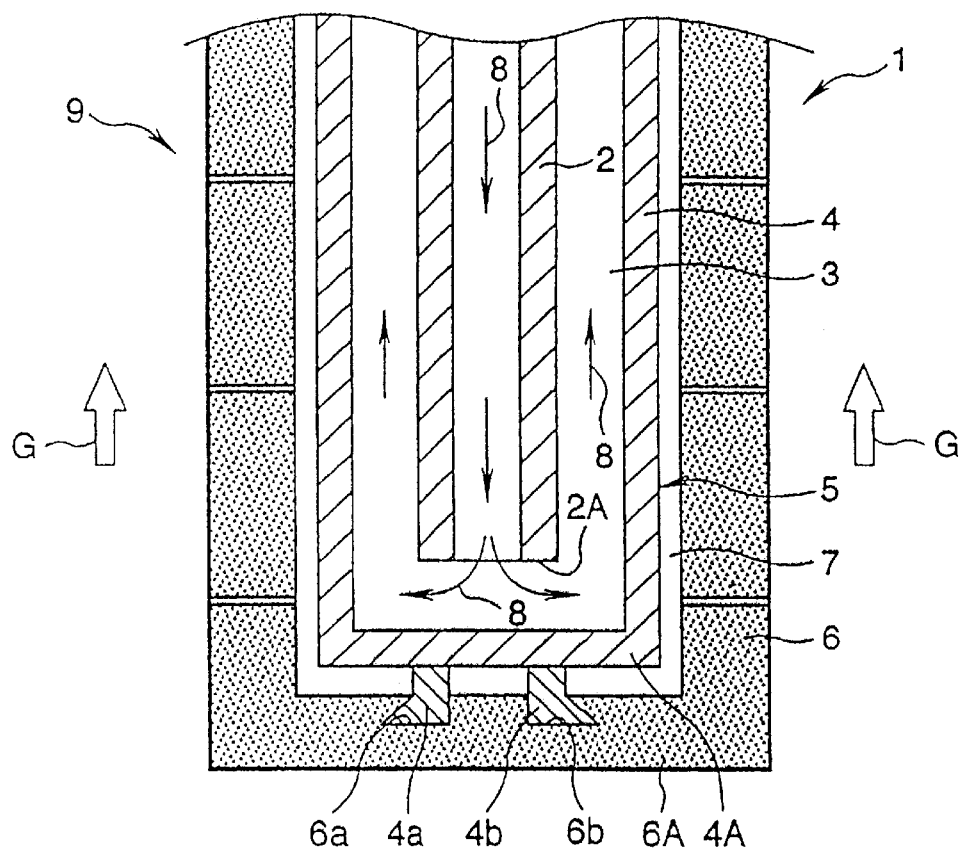
FIG. 1 is a longitudinally sectional view showing important parts of one form of the apparatus for heating high-temperature air according to the present invention.
Figure 2:
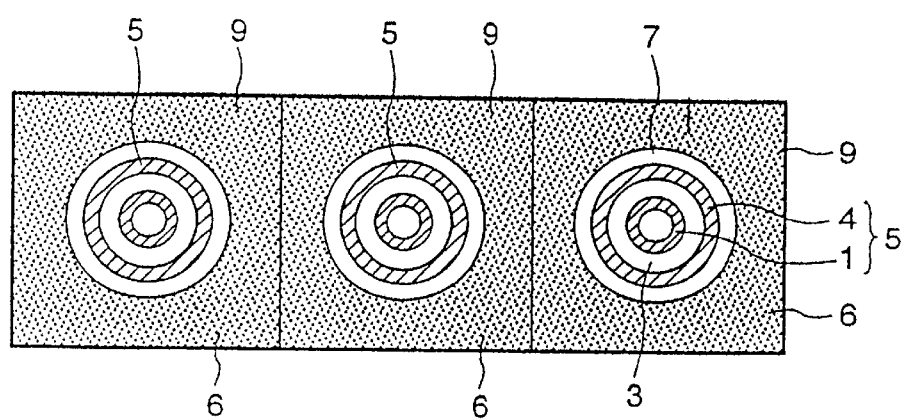
FIG. 2 is a horizontally sectional view showing important parts of one form of the apparatus for heating high-temperature air according to the invention.
Figure 3:
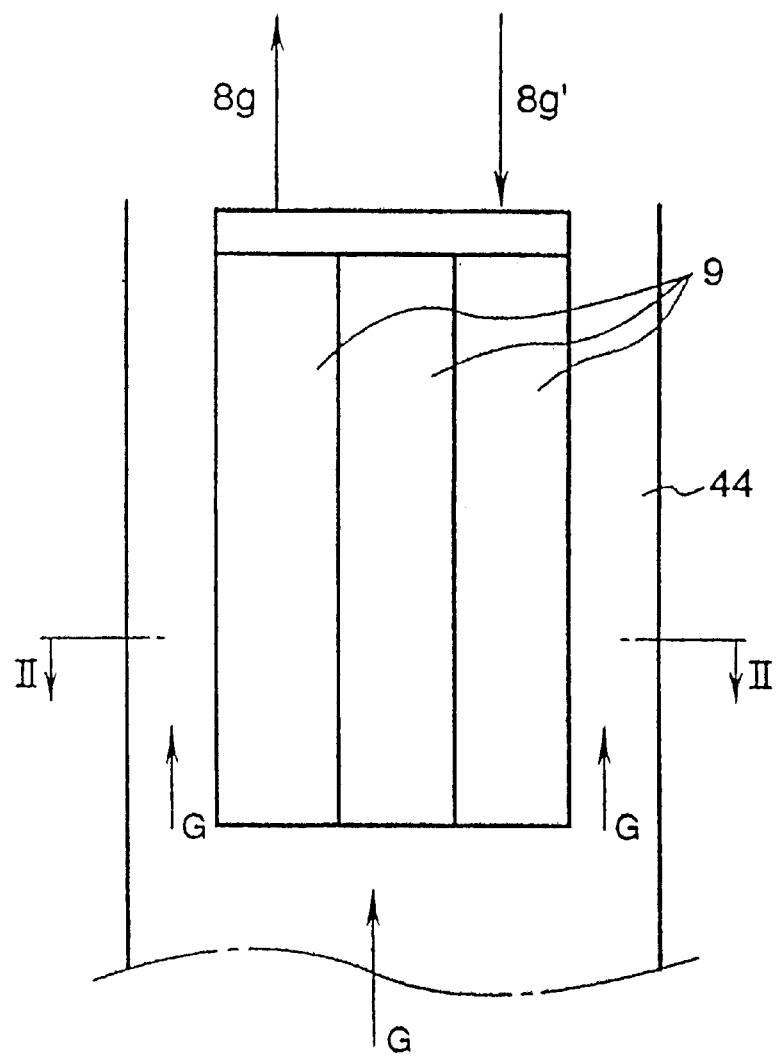
FIG. 3 is a schematically longitudinally sectional view showing one form of the apparatus for heating high-temperature air according to the invention.

FIG. 1 is a longitudinally sectional view, vertically cut, of one form of the apparatus for heating high-temperature air according to the invention, and FIG. 2 is a horizontally sectional view, laterally cut, of one form of the apparatus for heating high-temperature air according to the invention and also is a sectional view taken along the line II—II of FIG. 3 to be described later. FIG. 3 is a schematically side view showing the manner in which the apparatus for heating high-temperature air according to the invention is installed.

In the embodiment shown in the figures, an apparatus 1 for heating high-temperature air has a heat transfer conduit 5 constructed with an inner metallic heat transfer pipe 2 opened at its tip and an outer metallic heat transfer pipe 4 closed at its tip with a spacing 3 defined between the two pipes. A refractory protective pipe 6 closed at its tip and formed of a refractory material is disposed in coaxially covered relation to the heat transfer conduit 5 with a gapping 7 defined between such protective pipe and the outer pipe 4 of the conduit 5.

As metals for use in constituting the heat transfer conduit 5, SUS 310 and the like are preferable which are excellent in heat resistance and corrosion resistance. In addition, the section thicknesses of the inner pipe 2 and the outer pipe 4 of the heat transfer conduit 5 are desirably in the range of about 4–6 mm in consideration of strength, durability, weight and the like. Preferably, the inside diameter of the inner pipe 2 acting as a passage for air flow is in the range of 30–70 mm, and the width (½ of the difference between the inside diameter of the outer pipe and the inside diameter of the inner pipe) between the outer pipe 4 and the inner pipe 2 is preferably in the range of 10–30 mm. It can be said to be more desirable that a corrosion-resistant film is formed on an outer surface of the outer heat transfer 4. Suitable materials for use in the corrosion-resistant film are sole oxides such as alumina, silica and the like, or complex oxides such as mulite, spinel and the like, and the film thickness is chosen as is needed in attaining corrosion resistance, thermal cycling and the like. Thus, the outer pipe 4 can be more reliably protected from corrosion.

As refractory materials used for the refractory protective pipe 6, refractories are suitable which do not form low-melting compounds even upon reaction with components contained in waste-incinerated ash. For instance, a high-alumina refractory, a chromia refractory, a silicon carbide refractory and the like are preferred. The section thickness of the protective pipe 6 is preferably in the range of about 20–30 mm so as to obtain heat transfer efficiency and corrosion resistance. Moreover, the gapping 7 between the protective pipe 6 and the outer heat transfer pipe 4 is preferably in the range of about 1–2 mm (½ of the difference between the inside diameter of the protective pipe 6 and the outside diameter of the outer pipe 4). Too large a spacing is responsible for reduced efficiency of heat transfer and also for large-sized apparatus 1 for heating high-temperature air. Conversely, too small a spacing fails to sufficiently avoid damage which would result from the difference in thermal expansion.

Void filling of such a refractory can remarkably decrease the quantity of gas tending to diffusively transmit the protective pipe 6 and can also enhance the corrosion resistance of the refractory itself. This void filling may be effected by immersing the refractory protective pipe 6 in a liquid such as alumina sol, alumina slurry or the like that clogs the voids of the refractory, followed by drying and subsequent calcination of the immersed pipe. By means of the void filling, for example, an average void diameter of 10 mm or so prior to treatment may be reduced to that of 5 mm or below.

The apparatus 1 for heating high-temperature air is so arranged that the heat transfer conduit 5 and the refractory protective pipe 6 are positioned to be axially vertical. The protective pipe 6 has inverted triangular holes 6a, 6b made on an inner surface of a sealing end area 6A thereof, whereas the outer pipe 4 has pawl-shaped protrusions 4a, 4b formed on an outer surface of a sealing end area 4A thereof, these protrusions being interengageable with the holes 6a, 6b of the protective pipe 6. The protective pipe 6 is supported with respect to the heat transfer conduit 5 by interengagement of the holes 6a, 6b with the protrusions 4a, 4b. In the embodiment seen in FIG. 1, the protective pipe 6 is supported by the heat transfer conduit 5 only with the holes 6a, 6b and the protrusions 4a, 4b interengaged with each other, and other support members for use in supporting the weight of such protective pipe are not disposed.

The apparatus 1 for heating high-temperature air in this embodiment is located vertically in a gas stream (arrowed by G) of elevated temperature and high corrosiveness in an incinerator. Air 8 to be heated descends through the inner heat transfer pipe 2 and then ascends (arrowed) from an open tip 2A of the inner pipe 2 through the spacing 3 defined between the inner pipe 2 and the outer pipe 4. During that time, the air to be heated is subjected to heating by the external gas flow G of elevated temperature and high corrosiveness.

At a base end (top end) of the heat transfer conduit 5, there are located means for introducing the air 8 to be heated and means for discharging the heated air, neither of which is shown. The heat energy recovered is thus used to advantage.

In the apparatus 1 for heating high-temperature air, the heat transfer conduit 5 is covered on its outer side by the refractory protective pipe 6 so that such conduit is protected from corrosion on contact with the gas of elevated temperature and high corrosiveness and hence is made highly durable. Furthermore, even where the difference in thermal expansion takes place between the metal constituting the outer heat transfer pipe 4 and the refractory constituting the refractory protective pipe 6, those dimensional changes related to thermal expansion are less likely to mutually propagate because of the gapping 7 provided between the outer pipe 4 and the protective pipe 6. Hence, the protective pipe 6 is prevented from damage, delamination, detachment and the like. Additionally, the support structure is simple between the refractory protective pipe 6 and the outer heat transfer pipe 4, and the jointing ratio is small as to the refractory in the refractory protective pipe 6. This serves to prevent the outer heat transfer pipe 4 from impairing.

Moreover, as viewed in FIG. 2 and FIG. 3, a plurality of heat transfer conduits 9 constituted with the heat transfer pipe 5 and the refractory protective pipe 6 are formed in a sectionally square shape and secured in series and in face-to-face contact with the adjoining conduit 9 and the protective pipe 6. That is to say, the heat transfer conduits 9 except for the two outermost ones are placed on left and right sides in face-to-face contact with the adjoining conduits 9. Such conduits are mutually fixed by use of connecting means not shown so that they are highly rigid and wholly resistant to thermal decomposition. Each of the heat transfer conduits 9 is so arranged as to be coextensive and flat on its outer surface as shown in FIG. 2. This coextensive flat surface contributes to reduced deposition of dust.

Owing to the above face-to-face contact fixing in series according to the present invention, the apparatus 1 for heating high-temperature air is rendered highly rigid enough to be wholly resistant to thermal decomposition. Thus, such thermal decomposition is conspicuously decreased in a high-temperature atmosphere, especially in a passage for the flow of burnt exhaust gas immediately after combustible residues such as ash and the like are incinerated at a high temperature (1200° C. or higher) into molten slug.

Embodiment 2

Figure 4:
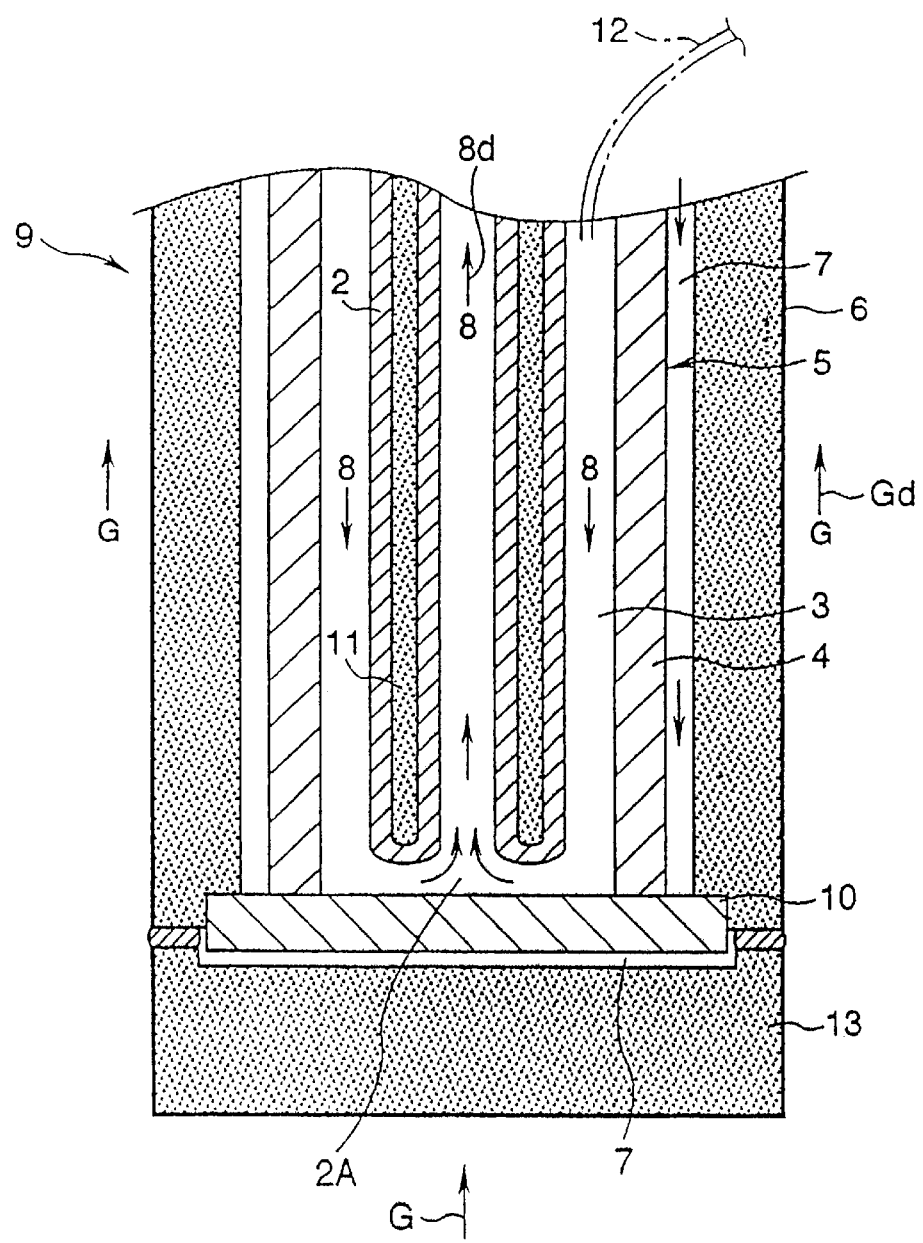
FIG. 4 is a longitudinally sectional view showing important parts of another form of the apparatus for heating high-temperature air according to the invention.

Embodiment 2 of the present invention is described with reference to FIG. 4. The heat transfer conduit 9 of the heating apparatus of high-temperature air is arranged, as shown in FIG. 4, in an atmosphere containing a corrosive gas G of elevated temperature discharged as from an incinerator not shown. An air 8 to be heated and caused to flow through a metallic heat transfer pipe 5 is heated by heat exchange with the gas G of elevated temperature, the heat transfer pipe 5 being covered by a refractory protective pipe 6. The heat transfer pipe 5 is constructed with an outer metallic heat transfer pipe 4 sealed at one end with a sealing material 10, and an inner tube 2 inserted in and communicating with the outer pipe 4 through an open tip 2A of the latter pipe. A gapping 7 is defined between the outer heat transfer pipe 4 and a refractory protective pipe 6, and the air 8 is flowed counter to the flow of the gas G of elevated temperature in the inner pipe 2 and in a spacing 3 as an air passageway between the outer pipe 4 and the inner pipe 2. In the present invention, the inner pipe 2 is brought into a thermally insulated structure with use of a material of a lower thermal conductivity than a metal. The inner pipe 2 is made to communicate at its base end, not shown, with an inlet of the air to be heated.

Figure 5:
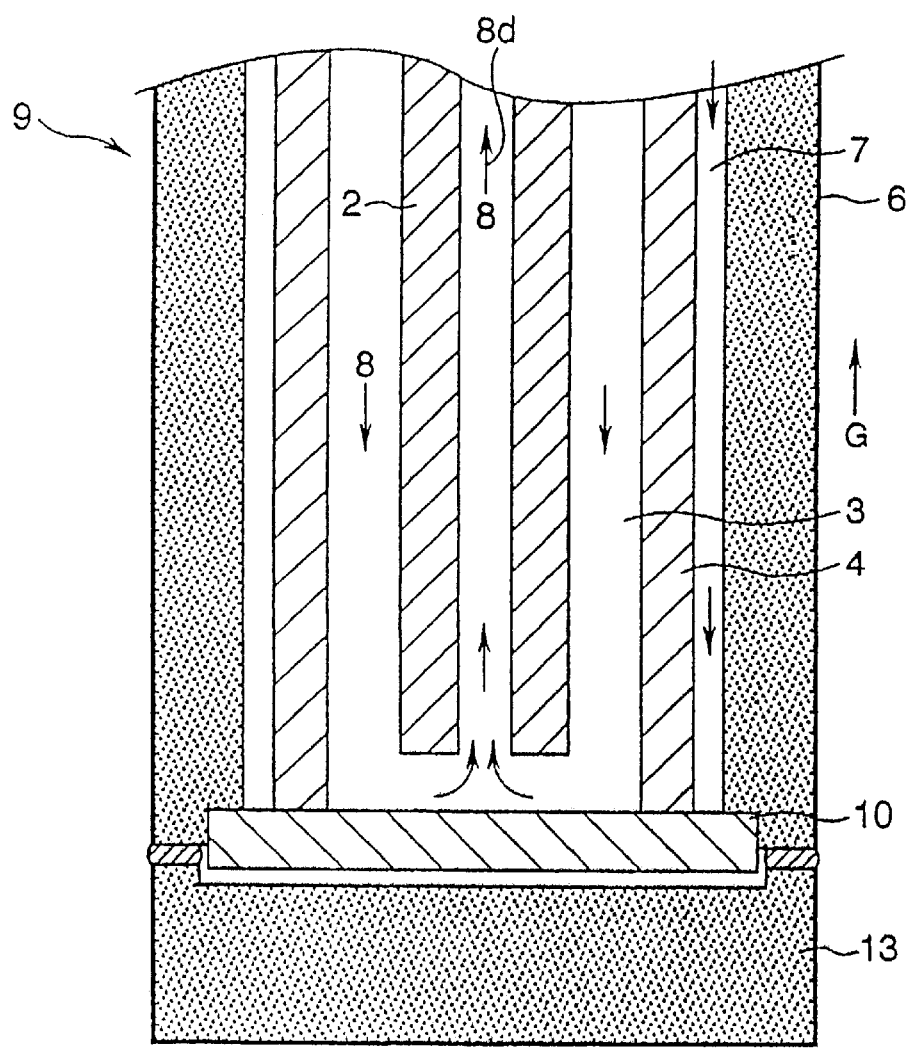
FIG. 5 is a longitudinally sectional view showing important parts of a further form of the apparatus for heating high-temperature air according to the invention.

More specifically, the inner pipe 2 shown in the embodiment of FIG. 4 is constructed in double-piped form and also in a thermally insulated structure in which a thermal insulating material 11 is sandwiched and filled as shown between the two pipes, or in a thermally insulated structure in which vacuum is drawn in between the two pipes (not shown). Moreover, the inner pipe 2 may be brought into a thermal insulated structure in which the whole is formed of ceramics as seen in FIG. 5.

With use of the above thermal insulating structure, the air 8 to be heated and flowed through the spacing 3 is heated alone without the air 8 to be heated in the inner pipe 2 exposed to simultaneous heating. Thus, the temperature change of the air 8 to be heated in the inner pipe 2 is held to so small an extent as to be acceptable.

To allow the air 8 to be heated to flow counter to the flow of the gas G of elevated temperature in the spacing 3, the air 8 to be heated may be flowed in two varying directions according to the flow direction of the the gas G of elevated temperature. That is, when the gas G of elevated temperature is flowed as shown by the arrow Gd, the air 8 to be heated is flowed and heated as arrowed by 8*d* as through an air supply tube 12 so connected to the spacing 3 as to introduce the air 8, and the air 8 is caused to return at a top end of the inner tube 2 into the latter tube and thereafter taken outside. As another way of flow, where the gas G of elevated temperature is flowed in a direction reverse to the arrow Gd, the air to be heated is first flowed in the inner pipe 2 and returned at the top end into the spacing 3 of the outer heat transfer pipe 4 and in a direction reverse to the arrow 8*d*. Thus, the heat of the gas of elevated temperature is recovered and then taken outside. In both ways of flow, the air alone flowing through the spacing 3 recovers the heat of such gas, while the air flowing through the inner pipe 2 stands thermally isolated.

The outer heat transfer pipe 4 is covered by the refractory protective pipe 6 with the gapping 7 interposed therebetween. When used at high temperature, a top end of the refractory protective pipe 6 is made movable downwardly of the heat transfer pipe 5 as by a bellows not shown in order to compensate for the different thermal expansion coefficients between the outer pipe 4 and the protective pipe 6. With the heat transfer pipe 5 and the refractory protective pipe 6 caused to relatively move with use of the gapping 7 at room temperature and at high temperature, the heat transfer pipe 5 and the refractory protective pipe 6 are preveted from getting mutually impaired in respect of their respective thermal expansions even at high temperature. Desirably, extraneous air for example be introduced in the gapping 7 to thereby avoid a corrosive gas of elevated temperature from intrusion into a wall of the refractory protective pipe 6 and subsequent contact with the heat transfer pipe 5. The refractory protective pipe 6 is secured at its tip to a tip protecting material 13 of a refractory nature that is disposed to cover a sealing material 10, and gappings 7 are also defined between the refractory protective pipe 6 and the outer heat transfer pipe 4 on its outer surface and between the tip protecting material 13 and the sealing material 10, these gappings being partitioned from the above stated gapping.

Also in this embodiment, the outer heat transfer pipe 4 is covered on its outer surface with the refractory protective pipe 6 with the result that the former pipe is protective against the gas of elevated temperature and high corrosiveness and hence excellent in durability. Furthermore, because of provision of the gapping 7 between the outer heat transfer pipe 4 and the refractory protective pipe 6, the dimensional changes of both pipes resulting from thermal expansion do not mutually propagate even if the difference in thermal expansion occurs between the metal constituting the outer heat transfer pipe 4 and the refractory constituting the refractory protective pipe 6. In consequence, the refractory protective pipe 6 is prevented from damage, delamination and detachment. Besides and preferably, the heat transfer pipe constututing metal is SUS 310 or the like which is highly resistant to heat and to corrosion. The section thicknesses of the inner pipe 3 and the outer heat transfer pipe 1 are set to be preferably in the range of about 4–6 mm, but they are decided in terms of strength, durability, weight and the like. The inside diameter of the inner pipe 2 for use as a passage of the air 8 to be heated is preferably in the range of 30–70 mm, and the width (½ of the difference between the inside diameter and the outside diameter of the inner pipe) of the spacing 3 between the outer heat transfer pipe 4 and the inner pipe 2 is preferably in the range of 10–30 mm.

Next, this embodiment is described with regard to its operation and with reference to FIG. 4. The heat transfer pipe 5 is arranged in a vertical posture in a gas stream (arrowed by Gd) of elevated temperature and high corrosiveness in an incinerator so that the air 8 to be heated is introduced into the spacing 3 of the outer heat transfer pipe 4 and descends in the spacing 3 and then ascends through the open tip 2A of the inner pipe 2 in the latter pipe (arrowed by 8*d*). During that time, such air is heated with an external gas stream of elevated temperature through the refractory protective pipe 6 and the wall of the outer heat transfer pipe 4. In this instance, the air 8 to be heated and caused to pass through the spacing 3 is heated alone with the gas G of elevated temperature, but the the air 8 to be heated and caused to pass through the inner pipe 2 thermally insulated is not exposed to heating. Namely, since the air contained in the inner pipe 2 is thermally isolated, the temperature change of the air 8 to be heated is held in the inner pipe 2 to small an extent as to be acceptable. Hence, high efficiency of heat transfer is attainable.

Figure 6:
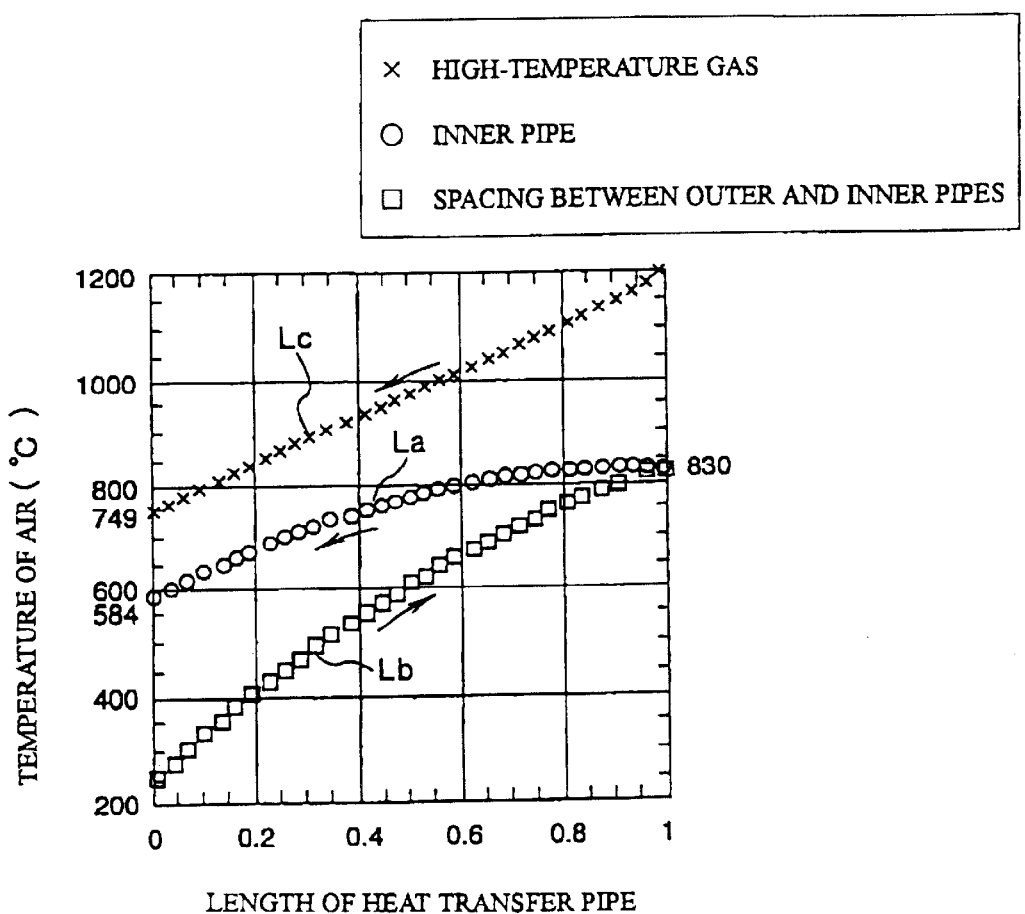
FIG. 6 is a view showing the analysis results of air temperatures in a heat transfer pipe of a comparative example.
Figure 7:
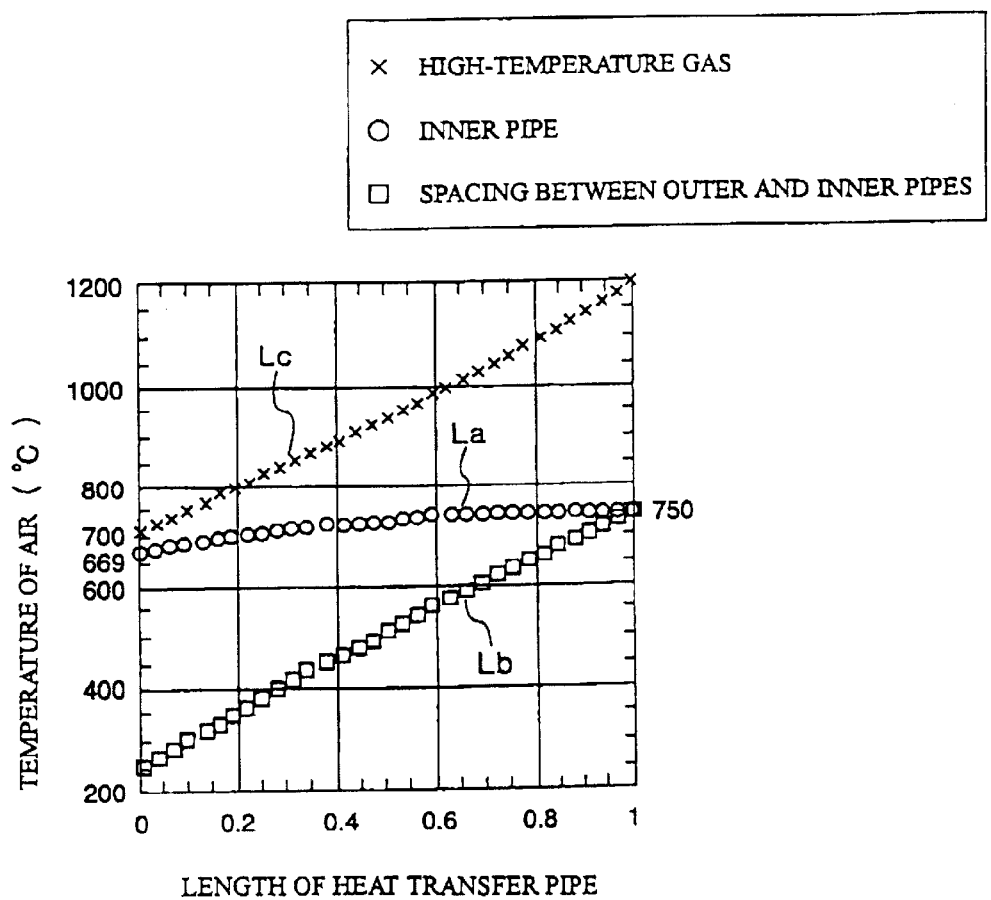
FIG. 7 is a view showing the analysis results of air temperatures in the heat transfer conduit of the invention.

The analysis results as to the relationship between the length of the heat transfer pipe in the heat transfer pipe 5 of this embodiment and the temperature of the air are shown in FIG. 6 and FIG. 7. In these drawings, La refers to the inner pipe, Lb to the spacing and Lc to the gas of elevated temperature. FIG. 6 is directed to a comparative example and hence to the analysis results obtained for an inner metallic heat transfer pipe formed of a carbon steel in common use, but not of a thermally insulated structure. This case reveals that the temperature of an air to be heated reaches the highest at a tip of the heat transfer pipe and that after being flowed and returned in such pipe, the air causes a sharp decline in temperature at a base end (discharge outlet) of such pipe. As contrasted, where the inner pipe is of a thermally insulated structure as viewed in FIG. 7, the decrease in temperature of the air to be heated in the inner pipe is small between a tip end of the heat transfer pipe and a base end thereof as shown. When FIG. 6 and FIG. 7 are compared with each other, it is found that the inner pipe of a thermally insulated structure allows the temperature change of the air to be heated in such pipe to be held to so small an extent as to be acceptable.

Embodiment 3

Embodiment 3 of the present invention is described with reference to FIG. 8 and FIG. 9.

Figure 8:
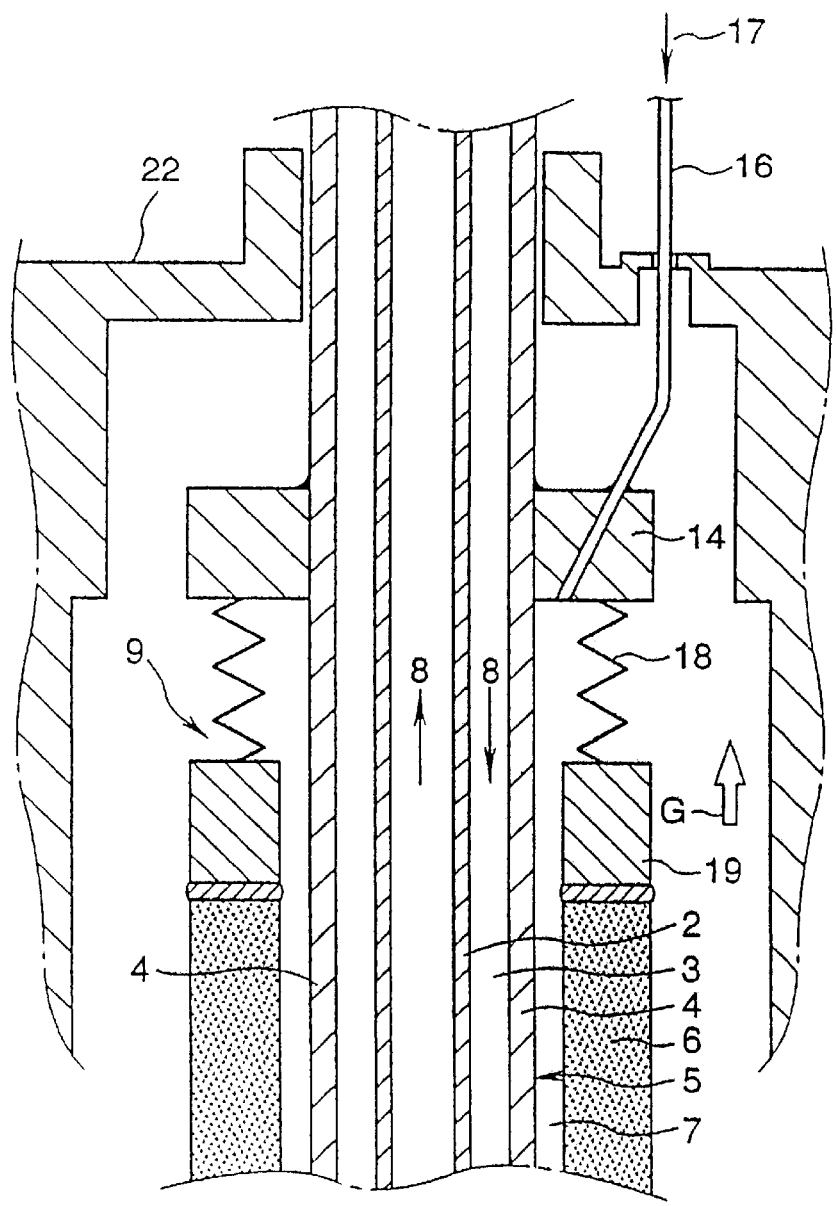
FIG. 8 is a longitudinally sectional view showing important upper parts of still another form of the apparatus for heating high-temperature air according to the invention.
Figure 9:
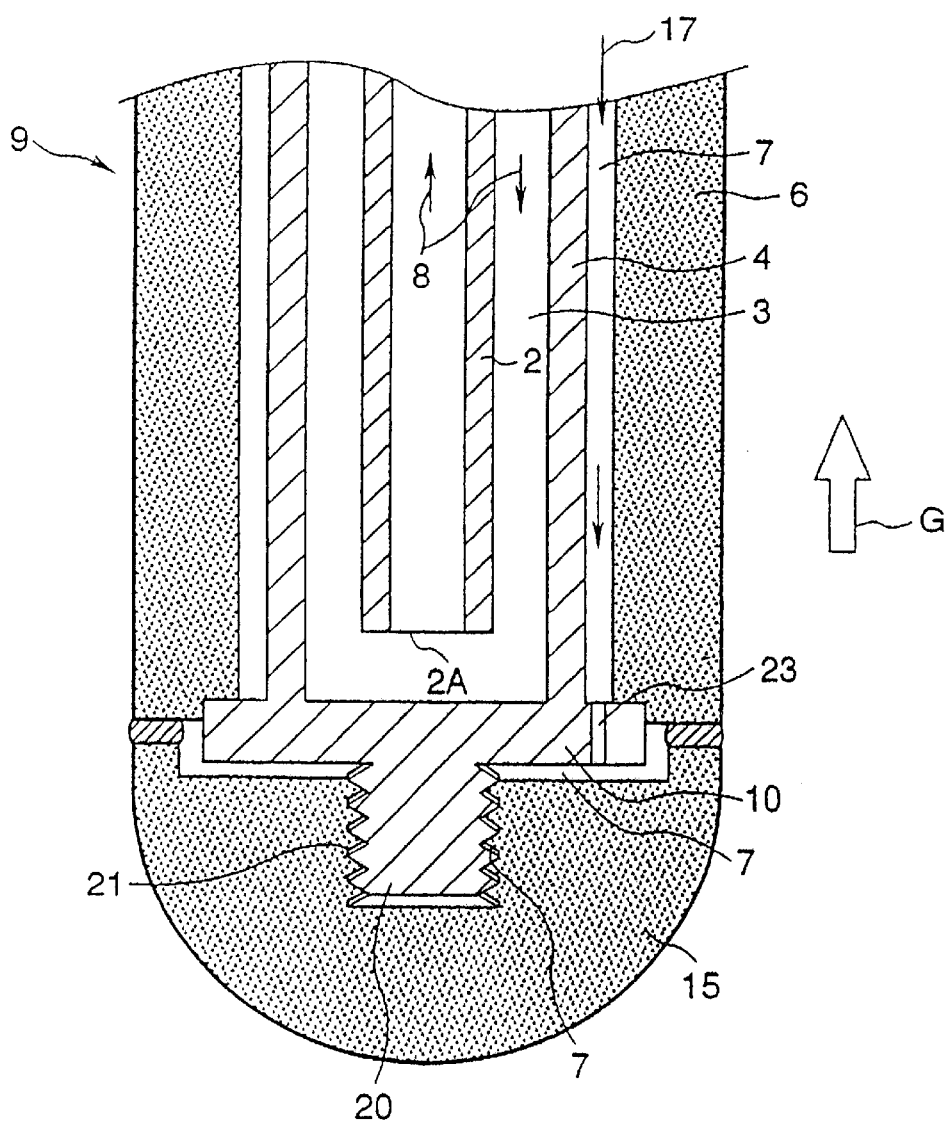
FIG. 9 is a longitudinally sectional view showing important top parts of still another form of the apparatus for heating high-temperature air according to the invention.

As shown in FIG. 8 and FIG. 9, an apparatus for heating high-temperature air is so constituted that a heat transfer conduit 9, i.e., a metallic heat transfer pipe 5 covered with a refractory protective pipe 6, is used in heating an air 8 to be heated and caused to flow in the heat transfer pipe 5 upon heat exchange with a gas G of elevated temperature. The heat transfer pipe 5 is constructed with an outer heat transfer pipe 4 and an inner pipe fixed thereto and opened at its tip end with a spacing 3 defined between both pipes for use as a flow passage of the air 8 to be heated. An upper port 14 is secured to an upper outer surface of the outer heat transfer pipe 4 with hermetic sealability retained.

Defined between the outer heat transfer pipe 4 and the refractory protective pipe 6 is a gapping 7 in which means 16 (air introducing pipe) is provided for introducing therein extraneous air so as to purge the corrosive gas G of elevated temperature. That is, an extraneous air 17 is introduced in the gapping between the outer heat transfer pipe 4 and the refractory protective pipe 6, such extraneous air being completely isolated from the air 8 to be heated, so that even upon intrusion of the corrosive gas of elevated temperature through a wall of the refractory protective pipe 6 into the gapping 7, this gas is prevented from getting reversely diffused toward the air 8 to be heated or intermixed therewith. This makes the heat transfer pipe and the like highly durable against corrosion at high temperature.

The upper port 14 of the heat transfer pipe is attached on a lower surface to an upper end surface of a bellows 18, and the bellows 18 is secured on its lower end surface to an upper end surface of a refractory presser 19. These attachments are effected as by welding so as to provide hermetic sealability. The refractory protective pipe 6 is secured at one end to a lower end surface of the refractory presser 19. When in use at high temperature, an upper end of the refractory protective pipe 6 is moved downwardly of the heat transfer pipe 5 by the action of the bellows 18 due to the difference in thermal expansion between the outer heat transfer pipe 4 and the refracrtory protective pipe 6. By the provision of the bellows 18, the extraneous air 17 can be introduced at high temperature while the outer heat transfer pipe 4 and the refracrtory protective pipe 6 are being relatively moved at room temperature and at high temperature. The extraneous air 17 flows along the inner surfaces of the bellows 18 and the refractory presser 19 and also along an outer surface of a fixing fitment not shown for use in fixing the protective pipe 6, eventually filling up the gapping 7.

In this embodiment, the refractory protective pipe 6 is fixed at its tip end to a refractory top end 15 placed to cover a lower sealing portion 10 of the outer heat transfer pipe 4 by the use of a male screw 20 and a female screw 21. That is, the male screw 20 is protruded downwardly in the lower sealing portion 10 of the outer heat transfer pipe 4. The female screw 21 is interengaged with the male screw 20 in the refractory top end 15 and with the gapping 7 provided. By means of the male screw 20 and the female screw 21, the refractory protective pipe 6 is spirally interengaged at a lower end with the refractory top end 15 with the gapping 7 defined therebetween. The gapping 7 in this top end is partitioned by the lower sealing portion 10 from the other gapping 7 stated above, and a through hole 23 is made in the lower sealing portion 10 so that the extraneous air 17 is introduced also into the gapping 7 in the top end.

In this embodiment, it is desired that the metallic material used to constitute the heat transfer pipe, the section thicknesess of the inner heat transfer pipe and the outer heat transfer pipe, the inside diameter of the inner heat transfer pipe, the spacing 3 between the outer and inner pipes and the like be set as in Embodiment 1 or 2.

Embodiment 4

Embodiment 4 of the present invention is described below with reference to the drawings.

Figure 10:
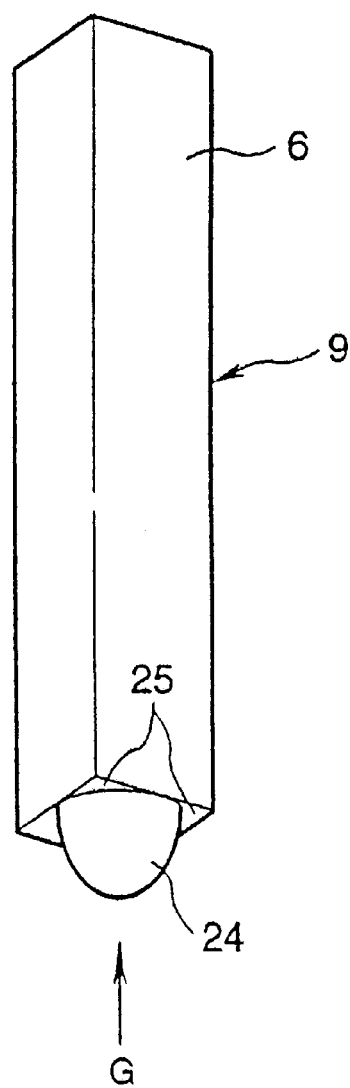
FIG. 10 is a perspective view showing another form of the heat transfer conduit of the apparatus for heating high-temperature air according to the invention.
Figure 11:
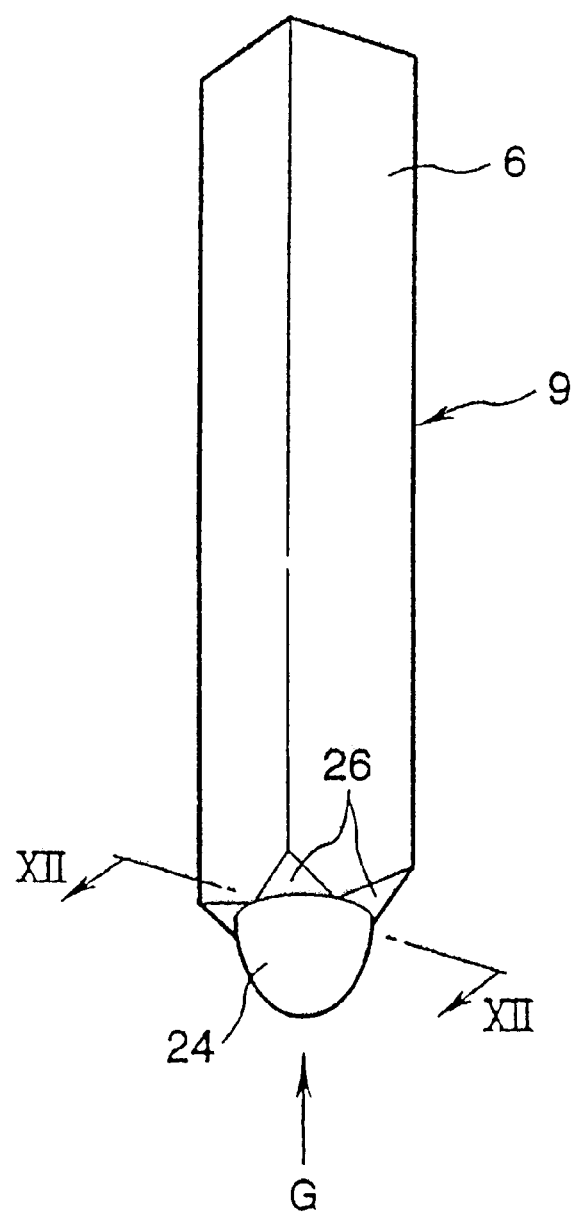
FIG. 11 is a perspective view showing still another form of the heat transfer conduit of the apparatus for heating high-temperature air according to the invention.

FIG. 10 is a perspective view showing one form of the heat transfer conduit of the apparatus for heating high-temperature air according to the invention, and FIG. 11 is a perspective view showing another form of the heat transfer conduit. Heat transfer conduits 9 shown in these drawings have a refractory protective pipe 6 disposed over their respective surfaces and provide an elongate tetraheral shape as seen horizontally sectionally. These conduits are arranged in a flow passage of a burnt exhaust gas G of elevated temperature which is derived by burning combustible components such as wastes or the like at a temperature as high as about 1300° C. so that heat recovery is carried out from the burnt exhaust gas G of a high temperature of 1000–1100° C. allowed to flow at a speed of 2–3 m per second. For use in formation of the refractory protective pipe 6, refractory materials are employed which are composed predominantly of alumina and also contain chromium oxide, zirconia and the like. The refractory protective pipe 6 of the heat transfer conduit 9 is formed at its tip end 24 into a convex hemispherical shape that is less resistant to the stream of gas. In this embodiment, such protective pipe is formed in such a manner that the diameter of such semispherical portion is substantially identical to the length of one side of such tetrahedral portion.

The tip end 24 in the convex shape acts to relax those thermal effects such as concentrated thermal stress arising from contact with a stream of gas of elevated temperature with consequent reduction of such tip end in respect of damage such as wear and breakage. In particular, since the convex portion of the tip end 24 is formed in the semispherical shape, those thermal effects applied to the tip end 24 are uniformly distributed throughout the latter end. This serves to further decrease damage to the tip end 24.

In the heat transfer conduit 9 seen in FIG. 10, the semispherical tip end 24 and a base end of the sectionally tetraheral shape have stepped portions 25 formed at their conrners. Desirably, each such stepped portion 25 is formed as small as possible to preclude the concentrated thermal stress noted above. Illustrated in FIG. 11 is a heat transfer conduit 9 constructed in consideration of that point, and this conduit is devoid of those stepped portions. Namely, the heat transfer conduit 9 is made smoothly extensive from the tip end 24 to the base end with the heat transfer conduit 9 of FIG. 10 subjected to a chamfering 26 at its stepped portions on four corners.

Figure 12:
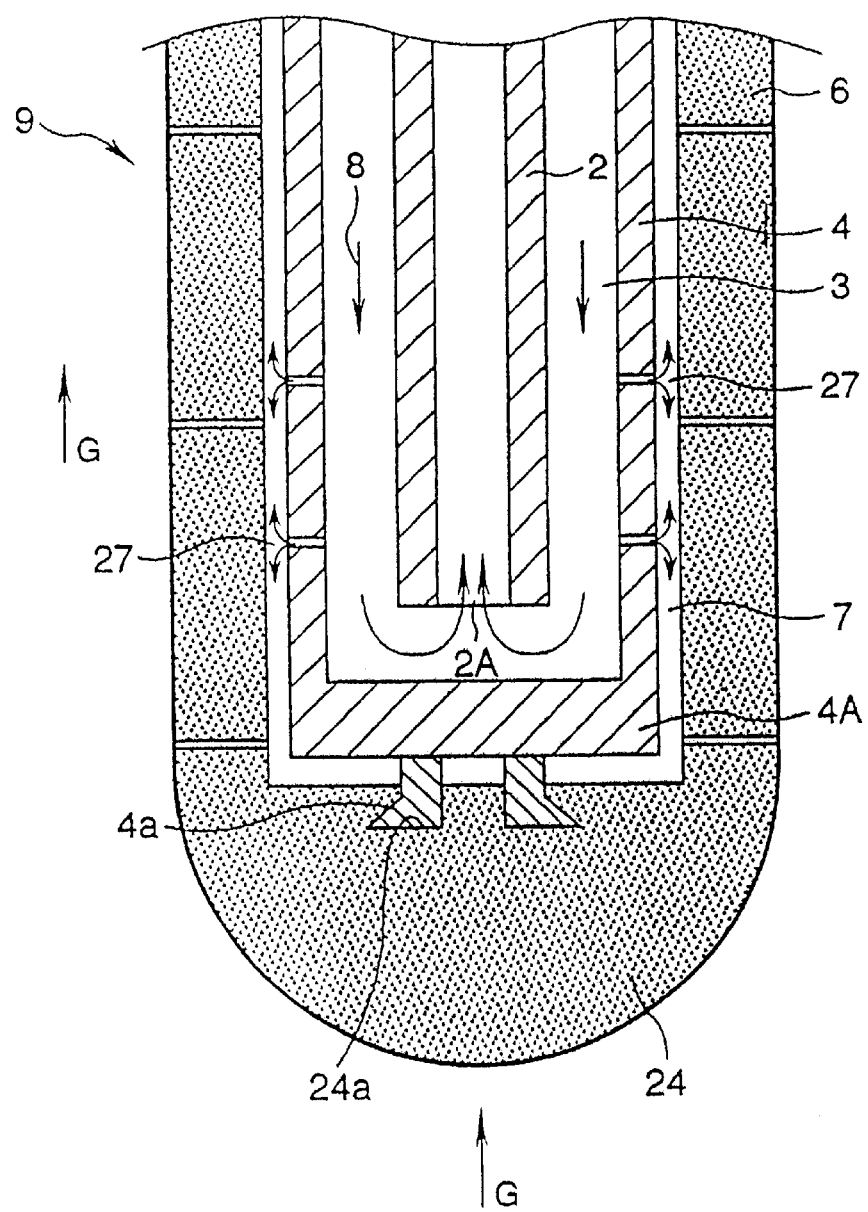
FIG. 12 is a longitudinally sectional view showing top parts of still another form of the apparatus for heating high-temperature air according to the invention.

FIG. 12 is a sectional view showing the tip end of the heat transfer conduit 9 viewed in FIG. 11 and taken along the line XII—XII. As seen in FIG. 12, the heat transfer conduit 9 is so constructed that an air 8 to be heated and allowed to flow through an outer heat transfer pipe 4 is heated on heat exchange with a gas G of elevated temperature by use of such outer heat transfer pipe formed of a metal and covered with a refractory protective pipe 6. The refractory protective pipe 6 has an inverted triangular hole 24a made on an inner surface the tip end 24, and the outer heat transfer pipe 4 has a pawl-like protrusion 4a formed on an outer surface of the top end. The refractory protective pipe 6 and the outer heat transfer pipe 4 are brought into integral relation to each other by interengagement of the hole 24a with the protrusion 4a.

An heat transfer pipe 2 is inserted in the outer heat transfer pipe 4 sealed at one end with a sealing member 4A such that the pipe 2 is made to communicate with the pipe 4 through an opened top end 2A. A gapping 7 is defined between the outer heat transfer pipe 4 and the refractory protective pipe 6, and the air 8 to be heated is flowed counter to the flow of the gas G of elevated temperature. A base end, not shown, of the inner heat transfer pipe 2 is made to communicate with a supply source of the air 8 to be heated.

Owing to provision of the gapping 7 between the outer heat transfer pipe 4 and the refractory protective pipe 6, the dimensional changes of both pipes resulting from thermal expansion do not mutually propagate even when the difference in thermal expansion takes place between the metal used to form the outer pipe 4 and the refracory used to form the protective pipe 6. Thus, the refractory protective pipe 6 is prevented from becoming impaired, delaminated or detached. Moreover, the outer heat transfer pipe 4 is provided with minute through holes 27 from which part of the air 8 to be heated and caused to flow in the pipe 4 is flowed into the gapping 7. Since, therefore, the gapping 7 has a positive pressure with respect to an ambient atmosphere (passage of the gas G of elevated temperature), the gas of elevated temperature is less likely to permeate the refractory protective pipe 6 and to intrude thereinto. With the two beneficial effects produced by the action of the convex tip end 24 and by the freedom from permeation of the gas of elevated temperature, damage and the like to the tip end 24 of the refractory protective pipe 6 are further alleviated. At the same time, the gas of elevated temperature is free from permeation to the refractory protective pipe 6 and subsequent contact with the outer metallic heat transfer pipe 4. Thus, the outer pipe 4 can be prevented with reliability against corrosive deterioration.

Figure 13:
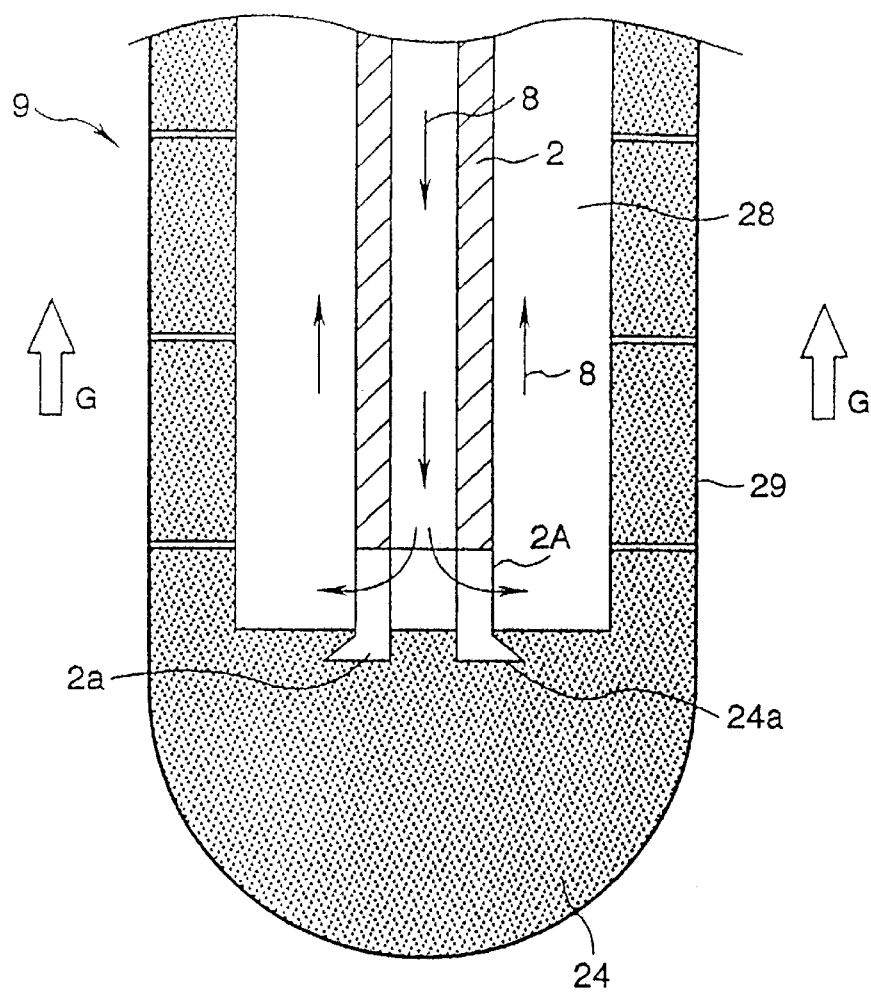
FIG. 13 is a longitudinally sectional view showing top parts of still another form of the apparatus for heating high-temperature air according to the invention.
Figure 14:
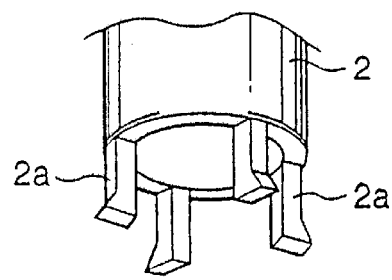
FIG. 14 is a perspective view showing important parts of a heat transfer pipe of the heat transfer conduit according to the invention.

A heat transfer conduit 9 shown in FIG. 13 is constructed with an outer metallic heat transfer pipe 2 opened at its tip end and an outer refractory heat transfer pipe 29 placed to be coaxial relative to the pipe 2 and to cover the pipe 2 with a gap passage 28 provided between both pipes. After being passed through the outer metallic heat transfer pipe 2, an air 8 to be heated is heated with the gas of elevated temperature while such air is being passed out of the open tip end 2A of the inner tube 2 through the gap passage 29 between the inner pipe 2 and the outer pipe 29. In an apparatus for heating high-temperature air of such structure, a top end 24 of the outer refractory heat transfer pipe 29 is also formed in the same convex shape as viewed in FIG. 12. FIG. 14 is a perspective view showing a pawl-like protrusion 2a of the inner heat transfer pipe 2 at its tip end.

Figure 15:
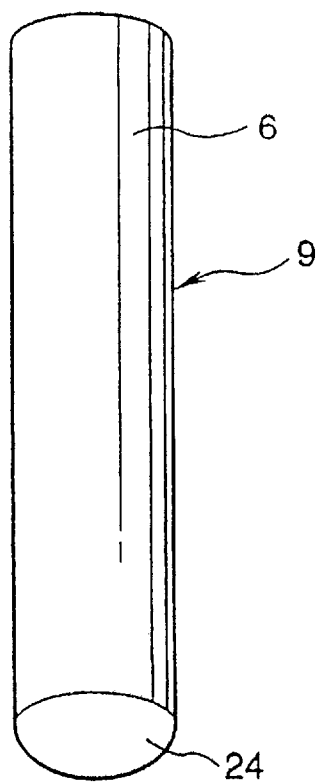
FIG. 15 is a perspective view showing still another form of the heat transfer conduit of the apparatus for heating high-temperature air according to the invention.

FIG. 15 is a perspective view showing still another form of the heat transfer conduit according to the present invention. Although the heat transfer conduit 9 is shown in FIG. 10 as being in a tetrahedral shape when seen horizontally sectionally, a heat transfer conduit illustrated in this embodiment is formed to be sectionally circular. Namely, a refractory protective pipe 6 is an elongate member in a sectionally circular shape. In this embodiment, the diameter of a convex tip portion is set to be substantially identical to the diameter of a base portion, and therefore, no problems are created as related to the sepped portions discuused above. Other structural details are the same as in FIG. 10.

Figure 16:
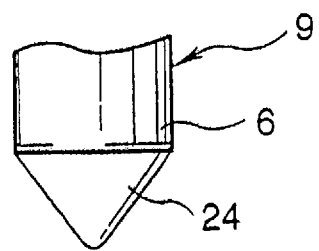
FIG. 16 is a side view showing important parts of still another form of the heat transfer conduit of the apparatus for heating high-temperature air according to the invention.
Figure 17:
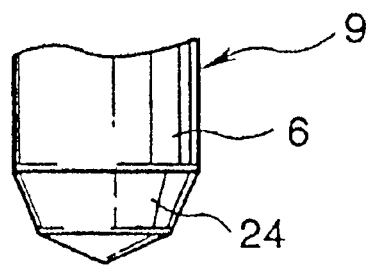
FIG. 17 is a side view showing important parts of still another form of the heat transfer conduit of the apparatus for heating high-temperature air according to the invention.
Figure 18:
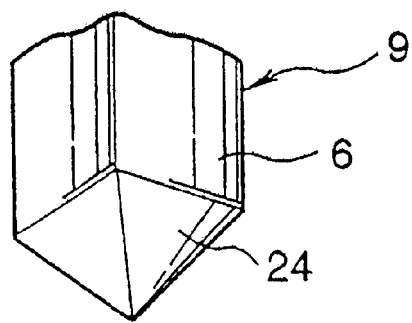
FIG. 18 is a perspective view showing important parts of still another form of the heat transfer conduit of the apparatus for heating high-temperature air according to the invention.

The convex shape of the heat transfer conduit 9 at its top end 24 may be conical as seen in FIG. 16, or may be polyconically convex as seen in FIG. 17. The conical shape of FIG. 16 is chamfered at its top end. The polyconically convex shape is not limited to a shape shown in FIG. 17 and formed with two conical planes, but may be a polycone such as a tetrahedral cone and the like and a polygon shown in FIG. 18 and formed convex on a polyplane. In short, the above convex shape of the top end 24 may be formed as a convex made up of either one or both of a plane and a curve and should not be construed as being restricted to any particular shape.

Figure 19:
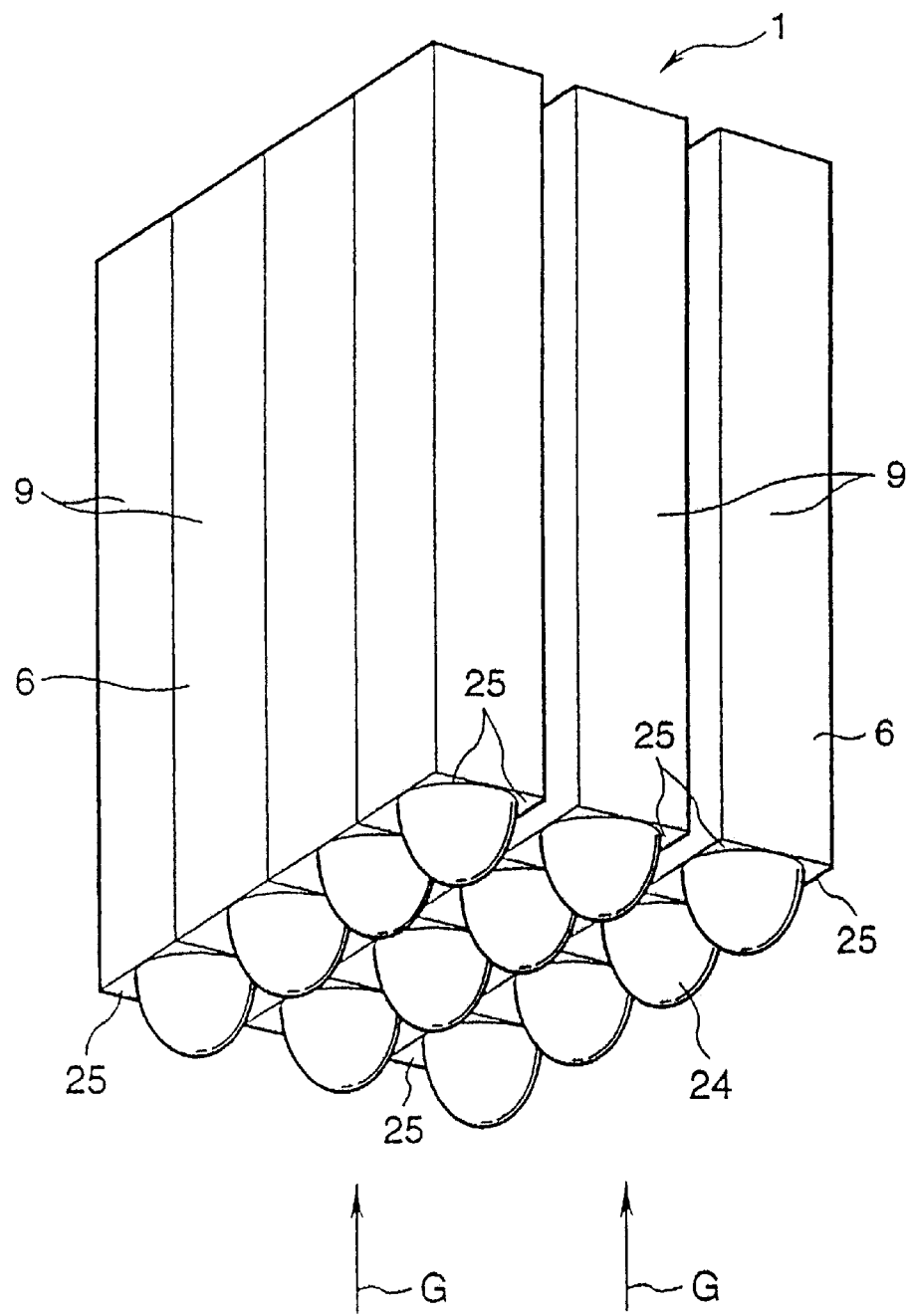
FIG. 19 is a perspective view showing one form of the apparatus for heating high-temperature air according to the invention.
Figure 20:
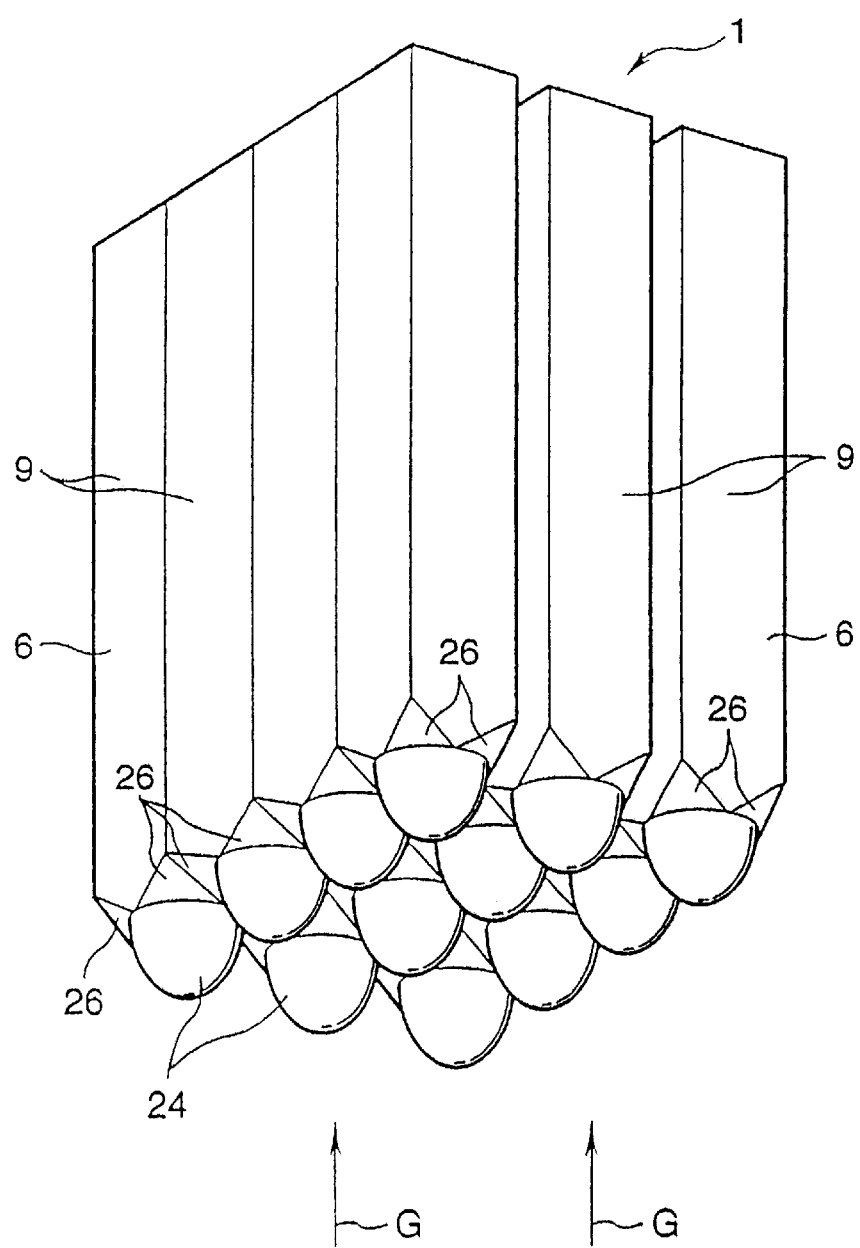
FIG. 20 is a perspective view showing another form of the apparatus for heating high-temperature air according to the invention.

FIG. 19 and FIG. 20 each are perspective views showing important parts of the apparatus for heating high-temperature air according to the present invention. In FIG. 19, four heat transfer conduits 9 are arranged in intimate contact with each other as taking the heat transfer conduit 9 of FIG. 10 as a unit, and this conduit arrangement is disposed in three arrays and placed in a suspended posture in a gas atmosphere of elevated temperature. In FIG. 20, four heat transfer conduits 9 are arranged in intimate contact with each other as taking the heat transfer conduit 9 of FIG. 11 as a unit, and this conduit arrangement is disposed in three arrays and placed in a suspended posture in a gas atmosphere of elevated temperature. In each case, a plurality of tetrahedral pillar-shaped heat transfer conduits 9 are disposed in series with no gap left between and among these conduits. This is capable of reducing dust deposition on the refractory protective pipe 6 as compared to the arrangement of FIG. 15 in which cylindrical heat transfer conduits 9 are disposed in series.

In this embodiment, as described hereinabove, the top end of the refractory protective pipe of the heating apparatus of high-temperature air is in a convex shape that is less resistant to the gas flow of elevated temperature. Thus, those thermal effects such as concentrated thermal stress and the like are relaxed which are caused upon contact with the gas flow of elevated temperature, and the top end of the refractory protective pipe is alleviated against damage such as wear, breakage and the like.

Embodiment 5

Embodiment 5 ot the present invention is described below with reference to the drawings.

Figure 21:
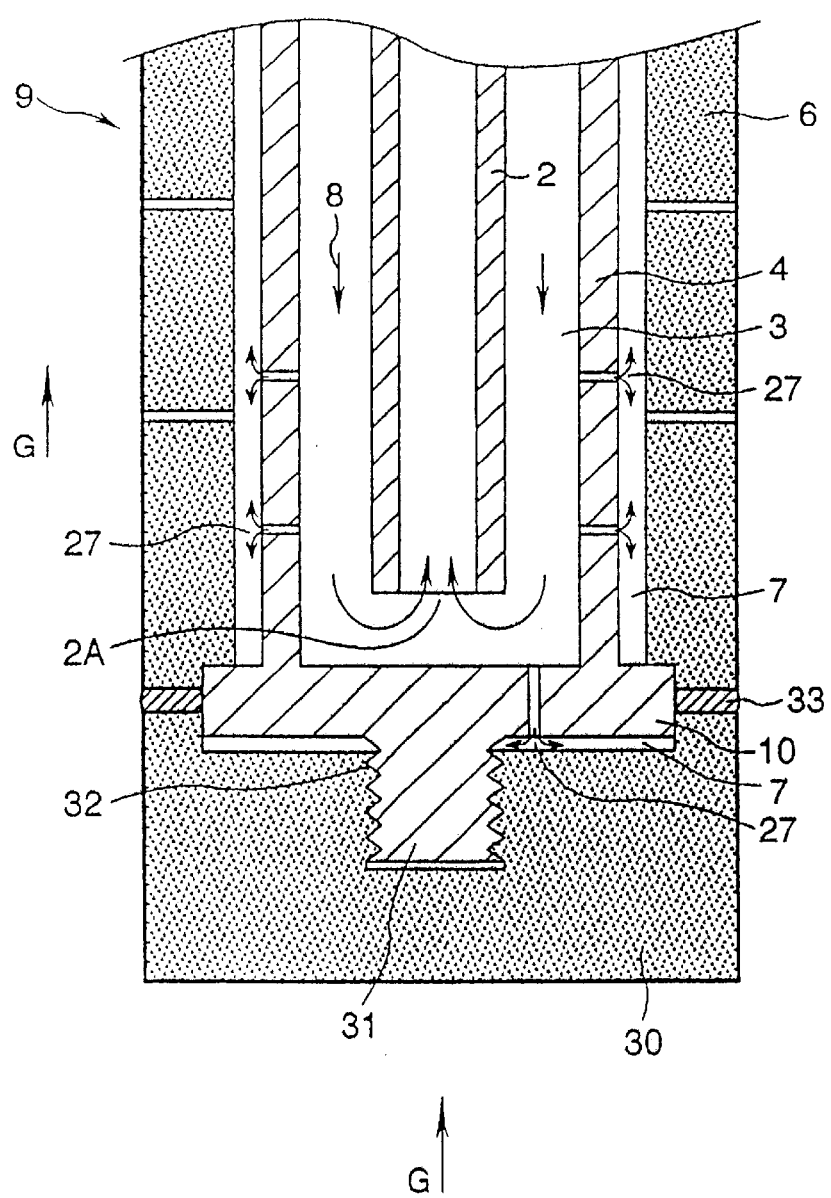
FIG. 21 is a longitudinally sectional view showing important top parts of a further form of the apparatus for heating high-temperature air according to the invention.
Figure 22:
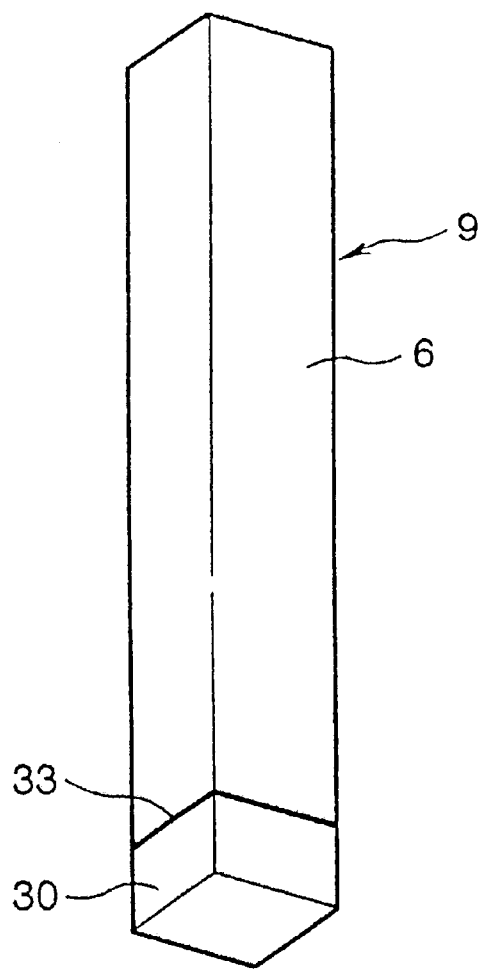
FIG. 22 is a perspective view showing still another form of the heat transfer conduit of the the apparatus for heating high-temperature air according to the invention.

FIG. 21 is a sectional view showing important parts of one form of the heat transfer conduit of the apparatus for heating high-temperature air according to the invention, and FIG. 22 is a perspective view showing the appearance of the heat transfer conduit. A heat transfer conduits 9 shown in FIG. 22 has a refractory protective pipe 6 disposed over its surface and provides an elongate tetraheral shape as seen horizontally sectionally. This conduit is arranged in a flow passage of a burnt exhaust gas G of elevated temperature which is derived from burning combustible components such as wastes or the like at a temperature as high as about 1300° C. so that heat recovery is carried out from the burnt exhaust gas G of a high temperature of 1000–1100° C. allowed to flow at a speed of 2–3 m per second. For use in formation of the refractory protective pipe 6, refractory materials are employed which are composed predominantly of alumina and also contain chromium oxide, zirconia and the like.

More specifically, as shown in FIG. 21, the heat transfer conduit 9 is so constructed that an air 8 to be heated and caused to flow through an outer heat transfer pipe 4 is heated upon heat exchange with a gas G of elevated temperature with use of such outer heat transfer pipe formed of a metal and covered with the refractory protective pipe 6. An inner metallic heat transfer pipe 2 is inserted in the outer heat transfer pipe 4 sealed at one end with a sealing member 10 such that the inner tube 2 is made to communicate through its open top end 2A with the outer pipe 4. The air 8 to be heated is allowed to flow in the inner pipe 2 and through a spacing 3 between the outer pipe 4 and the inner pipe 2 and in a direction opposite to the flow of the gas G of elevated temperature. Further, a gapping 7 is defined between the outer heat transfer pipe 4 and the refractory protective pipe 6. A base end, not shown, of the inner heat transfer pipe 2 is made to communicate with a supply source of the air 8 to be heated.

The refractory protective pipe 6 shown in FIG. 22 in this embodiment is provided at its top end with a refractory cap 30 which is substantially of the same shape as and of the same outside diameter as the protective pipe 6 and is freely detachable. The cap 30 is screwed, as shown in FIG. 21, to the sealing member 10 of the outer heat transfer pipe 4 opposed to the tip end with the gapping 7 partitioned from the other gapping. That is to say, the cap 30 is screwed into and fixed to a male screw 31 formed in the sealing member 10. A female screw 32 is formed at a portion at which to be engaged with the male screw 31. Designated at 33 in that figure is refractory mortar disposed to maintain hermetic sealability against an external atmosphere when the cap 30 is fixed.

In the above structure, the cap 30 can be removed and replaced by a new one even when such cap is subjected to partly concentrated wear and damage. Replacement is thus made with utmost ease. Additionally, the cap 30 is attached by screwing and hence supported by spiral line contact so that no particular stress concentration is present even if the temperature is variable between at room temperature and at high temperature, and delamination and damage are less likely to occur.

Furthermore, the gapping 7 is defined between the outer heat transfer pipe 4 and the refractory protective pipe 6 or the cap 30. In this instance, even when the difference in thermal expansion takes place between the metal used to form the outer heat transfer pipe 4 and the refractory used to form the refractory protective pipe 6 or the cap 30, the dimensional changes caused by the thermal expansions do not propagate toward each other. The refractory protective pipe 6 or the cap 30 can thus be avoided from getting damaged, delaminated or detached.

Moreover, in this embodiment as shown in FIG. 21, the outer heat transfer pipe 4 is provided with minute through holes 27 from which part of the air 8 to be heated and caused to flow in the pipe 4 is flowed into the gapping 7. Since, therefore, the gapping 7 has a positive pressure with respect to an ambient atmosphere (passage of the gas G of elevated temperature), the gas of elevated temperature is less likely to permeate the refractory protective pipe 6 or the refractory cap 30 and to intrude thereinto. With the beneficial effect produced by the freedom from permeation of the gas of elevated temperature, damage and the like to the cap 30 are further alleviated. At the same time, the gas of elevated temperature is free from permeation to the refractory protective pipe 6 or the cap 30 and subsequent contact with the outer metallic heat transfer pipe 4. The outer pipe 4 can thus be reliably prevented against corrosive deterioration.

Figure 23:
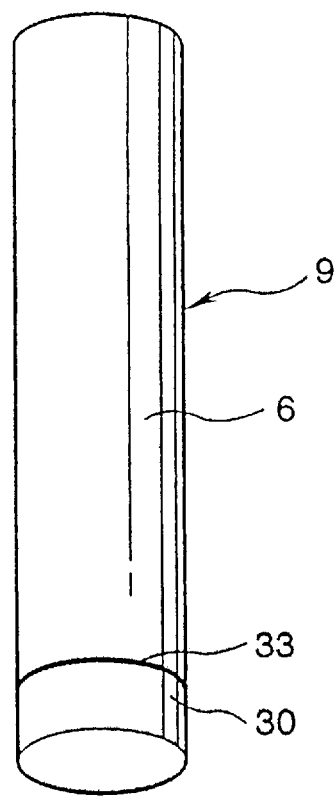
FIG. 23 is a perspective view showing still another form of the heat transfer conduit of the the apparatus for heating high-temperature air according to the invention.

FIG. 23 is a perspective view showing the appearance of still another form of the heat transfer conduit according to the present invention. Although the heat transfer conduit 9 is shown in FIG. 22 above as being in a tetrahedral shape when seen horizontally sectionally, a heat transfer conduit illustrated in this embodiment is formed to be sectionally circular. Namely, a refractory protective pipe 6 is an elongate member in a sectionally circular shape. Portions where the cap 30 and the refractory protective pipe 6 are connected to each other are formed to be smoothly coextensive when seen externally.

Figure 24:
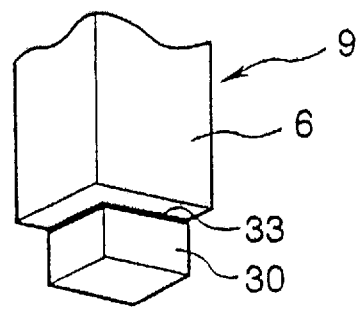
FIG. 24 is a perspective view showing important parts of still another from of the heat transfer conduit of the the apparatus for heating high-temperature air according to the invention.

FIG. 24 is a perspective view showing the appearance of still another form of the heat transfer conduit according to the present invention. The outside diameter of a sectionally tetrahedral cap 30 is made smaller than that of a refractory protective pipe 6. The reason for this is that in the case where a cap not of a sectionally circular, but of for example a sectionally tetrahedral shape, is formed into a rotary screwing type, the outside diameter of the cap is required to be set for the caps of adjoining heat transfer conduits 9 to be not impinged with each other during rotation when a plurality of heat transfer conduits 9 are arranged with no gap left therebetween as will be described later.

Figure 25:
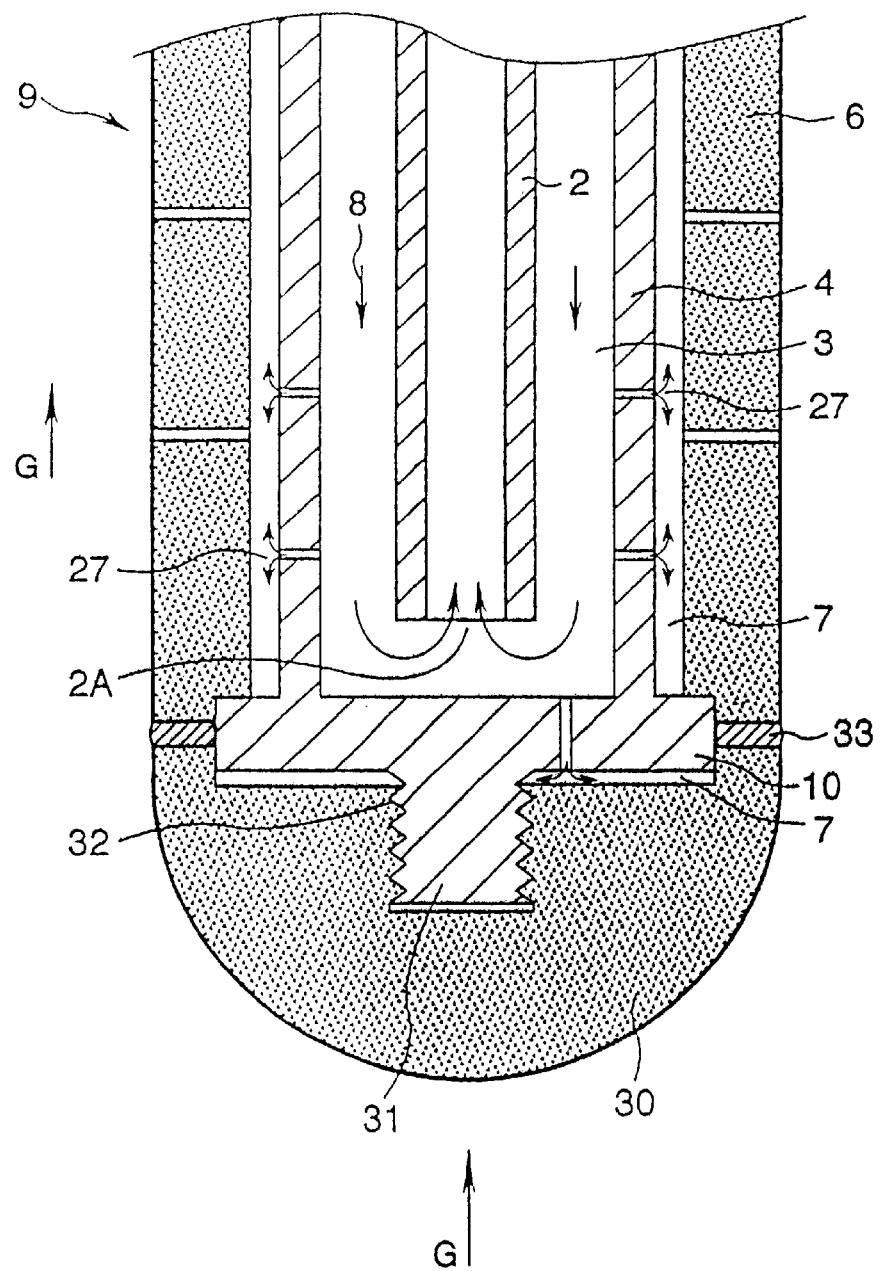
FIG. 25 is a longitudinally sectional view showing important top parts of still another from of the apparatus for heating high-temperature air according to the invention.

FIG. 25 is a sectional view showing important parts of still another of the heat transfer conduit according to the present invention. This figure is different from FIG. 21 in that a cap 30 is formed in a convex shape that is less resistant to the flow of gas, in a semispherical shape in this embodiment. The diameter of the semispherical cap is made substantially identical to the length of one side of the tetrahedral shape. Other structural details are the same as in FIG. 21. Further explanation is omitted with like parts designated by like reference numerals.

By provision of the convex cap 30, those thermal effects such as concentrated thermal stress and the like caused by contact with a gas flow of elevated temperature are relaxed with consequent alleviation of wear, breakage and the like. In particular, the semispherical shape makes those thermal effects uniformly distributive throughout a top end of the cap 30, contributing to further reduction in damage and the like with regard to the cap 30 itself.

Figure 26:
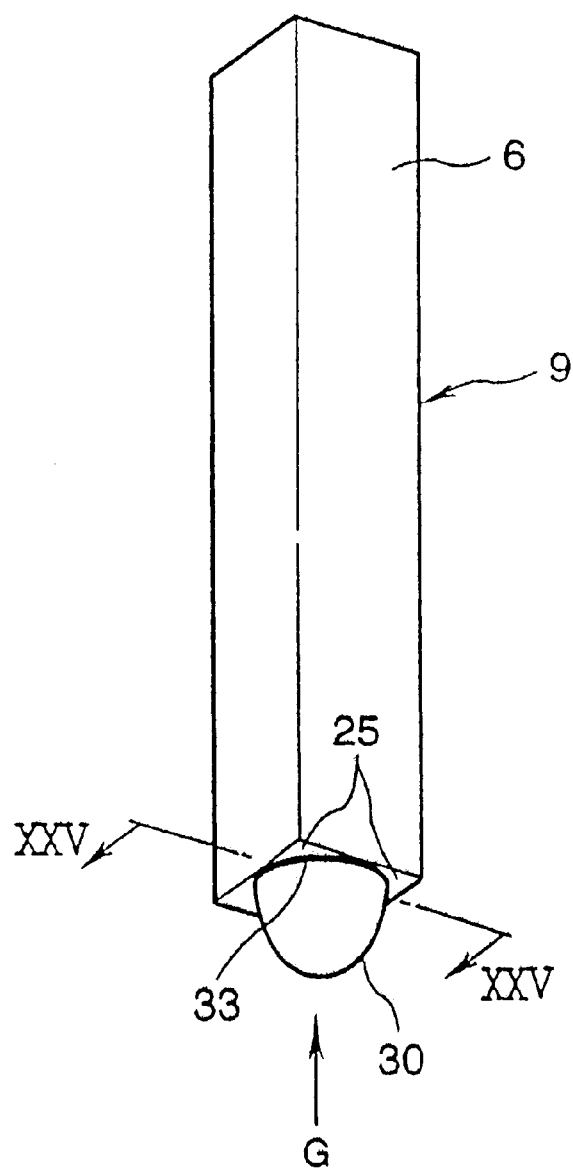
FIG. 26 is a perspective view showing still another form of the heat transfer conduit of the apparatus for heating high-temperature air according to the invention.
Figure 27:
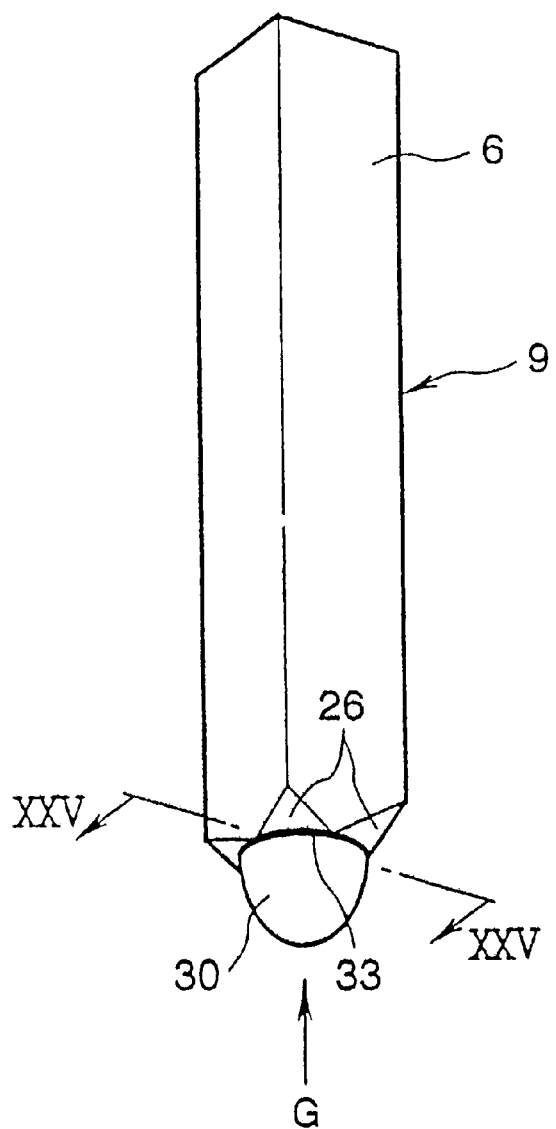
FIG. 27 is a perspective view showing still another form of the heat transfer conduit of the the apparatus for heating high-temperature air according to the invention.

FIG. 26 is a perspective view showing the appearance of the heat transfer conduit of FIG. 25, and FIG. 25 is a sectional view taken along the line XXV—XXV of FIG. 26. FIG. 27 is a perspective view showing the appearance of another form of the heat transfer conduit of FIG. 25, and FIG. 25 is a sectional view also taken along the line XXV—XXV of FIG. 27. In a heat transfer conduit 9 of FIG. 26, the top cap 30 and the sectionally tetrahedral shape at its base end have stepped portions formed on their corners. In order to avoid the thermal stress mentioned above, it is desired that the stepped portions 25 be made as small as possible. A heat transfer conduit 9 constructed in consideration of that respect is shown in FIG. 27, and this conduit is free of those stepped portions. That is, the heat transfer conduit 9 is formed smoothly extensive from the cap 30 to the base end with the heat transfer conduit 9 of FIG. 26 chamfered at 26 at its stepped portions on four corners.

Figure 28:
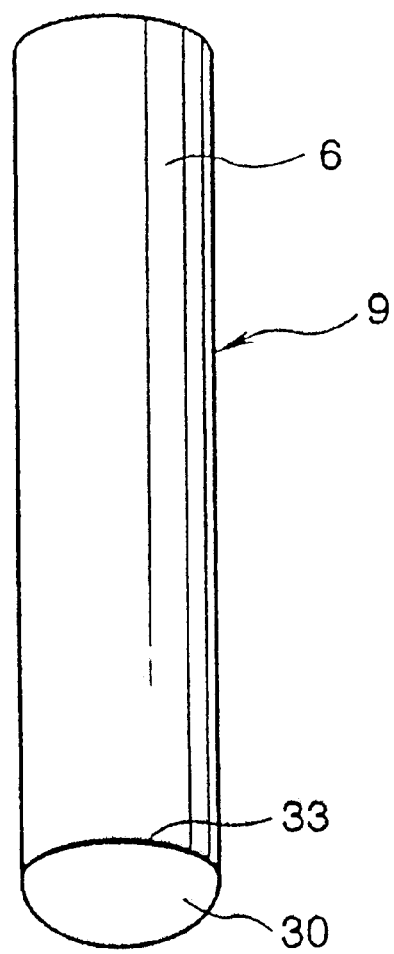
FIG. 28 is a perspective view showing still another form of the heat transfer conduit of the the apparatus for heating high-temperature air according to the invention.

FIG. 28 is a perspective view showing the appearance of still another form of the heat transfer conduit according to the present invention. Although the heat transfer conduit 9 is shown in FIG. 26 as being in a tetrahedral shape when seen horizontally sectionally, a heat transfer conduit illustrated in this embodiment is formed to be sectionally circular. Namely, a refractory protective pipe 6 is an elongate member in a sectionally circular shape. Portions where the semispherical cap 30 and the rfractory protective pipe 6 are connected to each other are of the same diameter and are smoothly coextensive. Hence, no problems concerning stepped portions are present.

Figure 29:
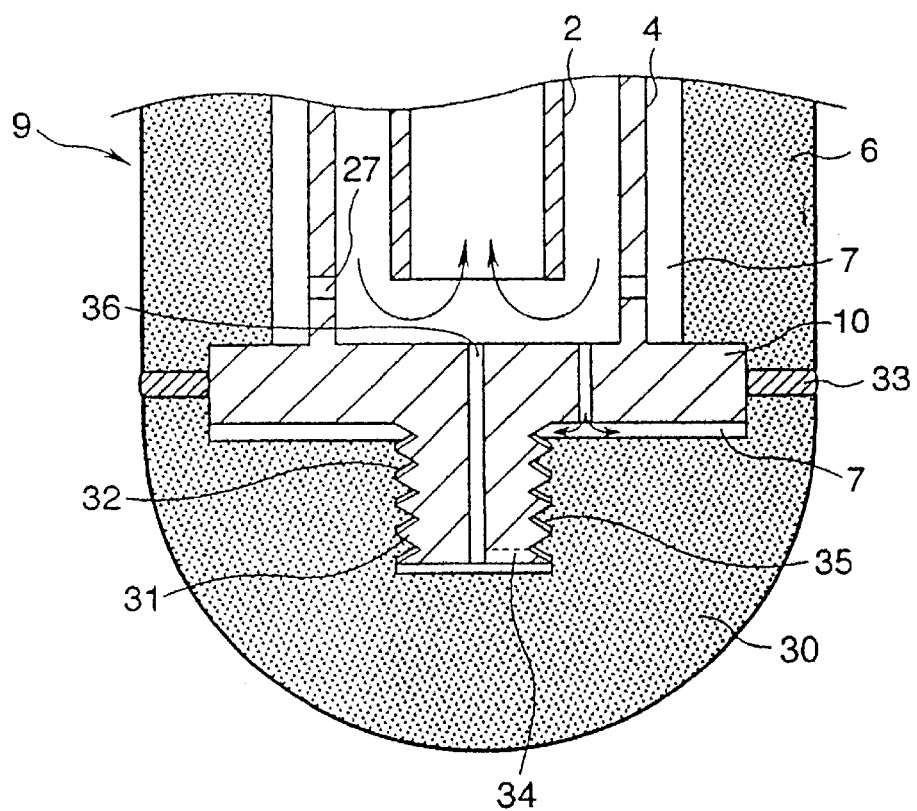
FIG. 29 is a longitudinally sectional view showing important top parts of still another from of the apparatus for heating high-temperature air according to the invention.

FIG. 29 is a sectional view showing important parts of still another form of the heat transfer conduit according to the present invention. A cap 30 is screwed into a male screw 31 located in a sealing member 10 of a outer heat transfer pipe 4, and spacings 34, 35 hermetically sealed are defined at the screwed portion. The spacing 35 noted here is a spacing partly defined in the above screwed portion. Minute through holes 36 are made at a portion where the male screw 31 is disposed, which holes allow an air 8 to be heated to partly flow into the spacings 34, 35. This embodiment is so constructed that part of the air 8 to be heated is supplied through the spacings 34, 35 to a gapping 7 of the above top end. Other structural details are the same as in FIG. 25, and further explanation is omitted with like parts designated by like reference numerals.

Consequently, since the spacings 34, 35 of the cap-screwed portion can have a positive pressure with respect to the ambient atmosphere, an external gas G of elevated temperature is alleviated from becoming permeated to the refractory cap 30. Also from this point, the cap itself can be prevented against damage and the like.

Figure 30:
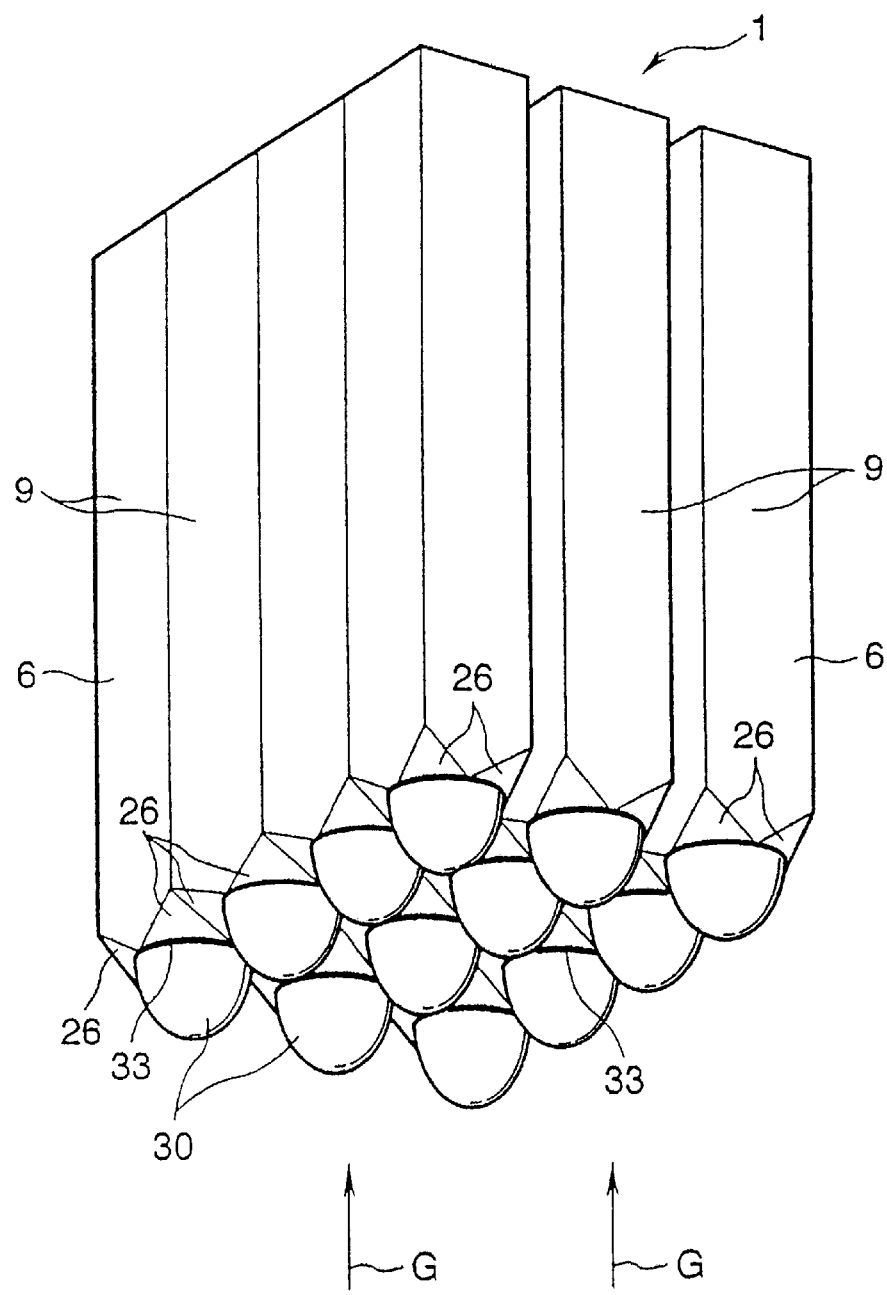
FIG. 30 is a perspective view showing still another form of the heat transfer conduit of the the apparatus for heating high-temperature air according to the invention.

FIG. 30 is a perspective view showing important parts of the apparatus for heating high-temperature air according to the present invention. In this figure, four heat transfer conduits 9 are arranged in intimate contact with each other as taking the heat transfer conduit 9 of FIG. 27 as a unit, and this conduit arrangement is disposed in three arrays and placed in a suspended posture in a gas atmosphere of elevated temperature. A plurality of tetrahedral pillar-shaped heat transfer conduits 9 are longitudinally disposed in series with no gap left between and among these conduits and in parallel to the flow of gas. This leads to reduced dust deposition on the refractory protective pipe 6.

In the foregoing embodiments, the convex shape of the cap 30 is described as being in a semispherical shape. The present invention is not limited to that shape. For instance, polyplanar convex shapes such as a cone, a pyramid, a polygon and the like are suitably useful. To attach the cap 30 to and detach from a refractory protective pipe 6, various systems may be chosen in place of the above screwing system. In one such system, a stopper portion is formed in the cap and inserted connectedly in a hole made in the refractory protective pipe.

Figure 31:
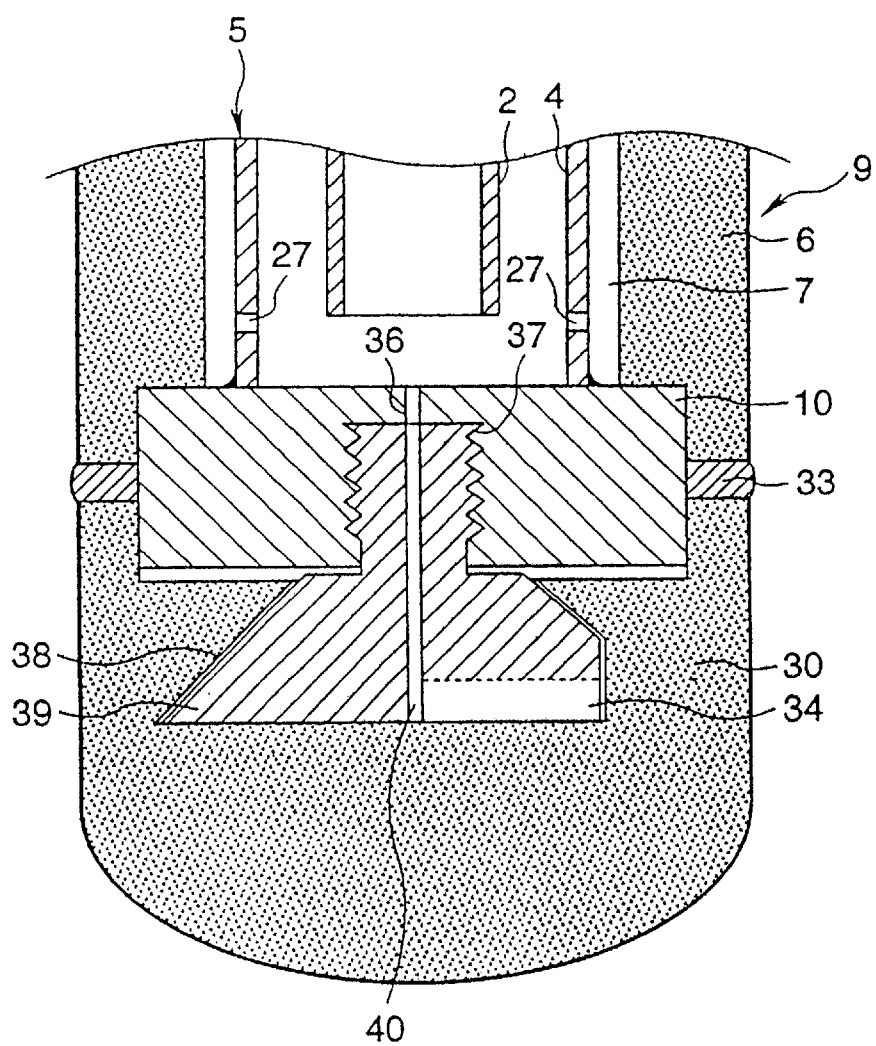
FIG. 31 is a longitudinally sectional view showing important top parts of still another from of the apparatus for heating high-temperature air according to the invention.

FIG. 31 shows another example in which a top sealing member 10 is attached as by welding to a top end of an outer heat transfer pipe 4, and a female screw hole 37 is made in the sealing member 10. A triangular hole 38 is recessed in a refractory cap 30, and a support bolt 39 is embedded at its triangular head in the hole 38. A stem portion of the support bolt 39 is twisted into the female screw hole 37. In the sealing member 10 and the support bolt 39, through holes 36, 40 are made in straightly joined relation to each other in order to partly introduce an air 8 to be heated so that an surface of the support bolt 39 is protected.

Figure 32:
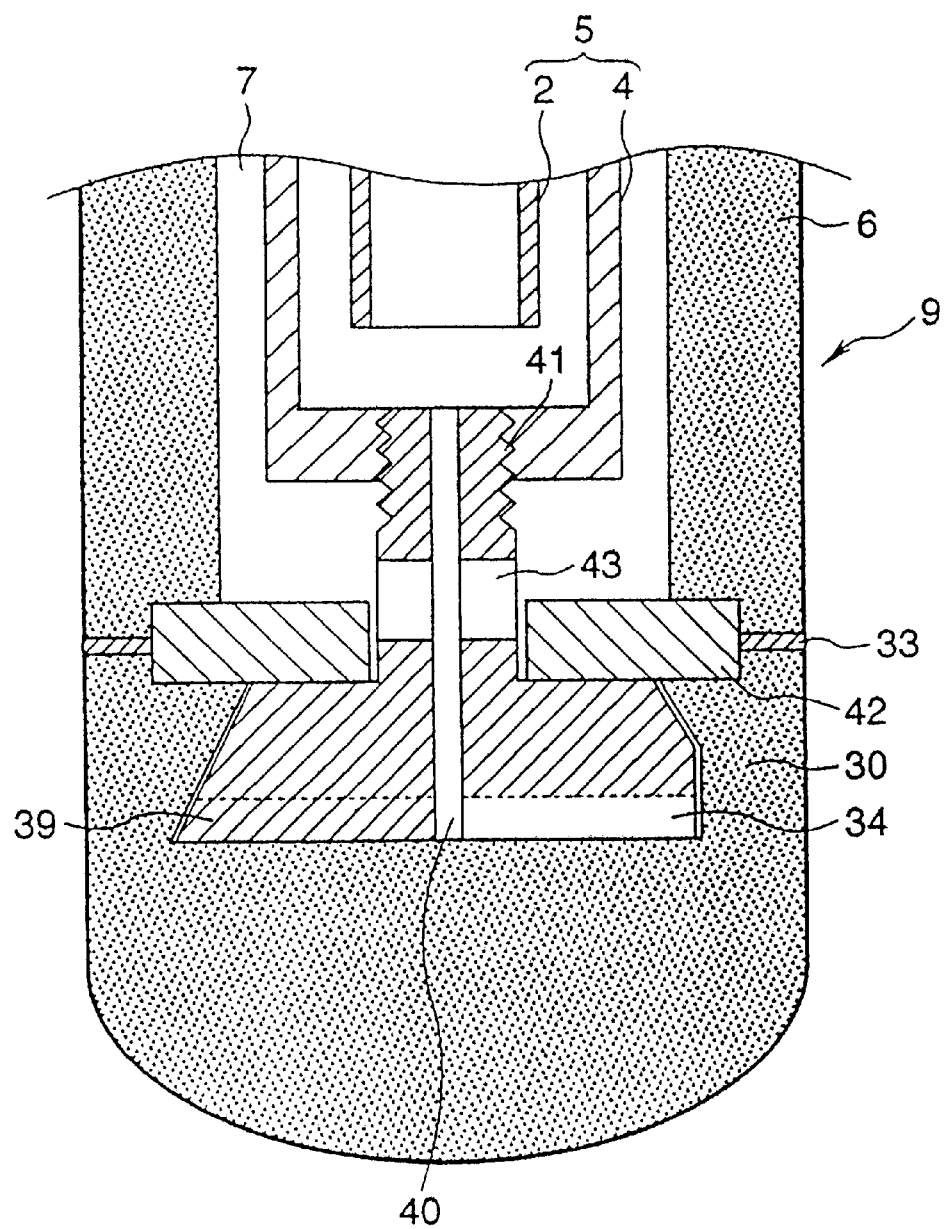
FIG. 32 is a longitudinally sectional view showing important top parts of still another from of the apparatus for heating high-temperature air according to the invention.

In an example shown in FIG. 32, a female screw hole 41 is made in a top surface portion of a heat transfer pipe 4, and a stem portion of a support bolt 39 is screwed in the female screw hole 41. A ring-like refractory material receptor 42 is placed over the support bolt 39, and a refractory protective pipe 6 is supported by the refractory material recepter 42. The support bolt 39 has a hole 43 made therein, which hole flows an air 8 to be heated out of the through hole 40. Other structural details are the same as in FIG. 31. In FIG. 31 and FIG. 32, the refractory protective pipe 6 is extremely firmly held by the support bolt 39.

Figure 33:
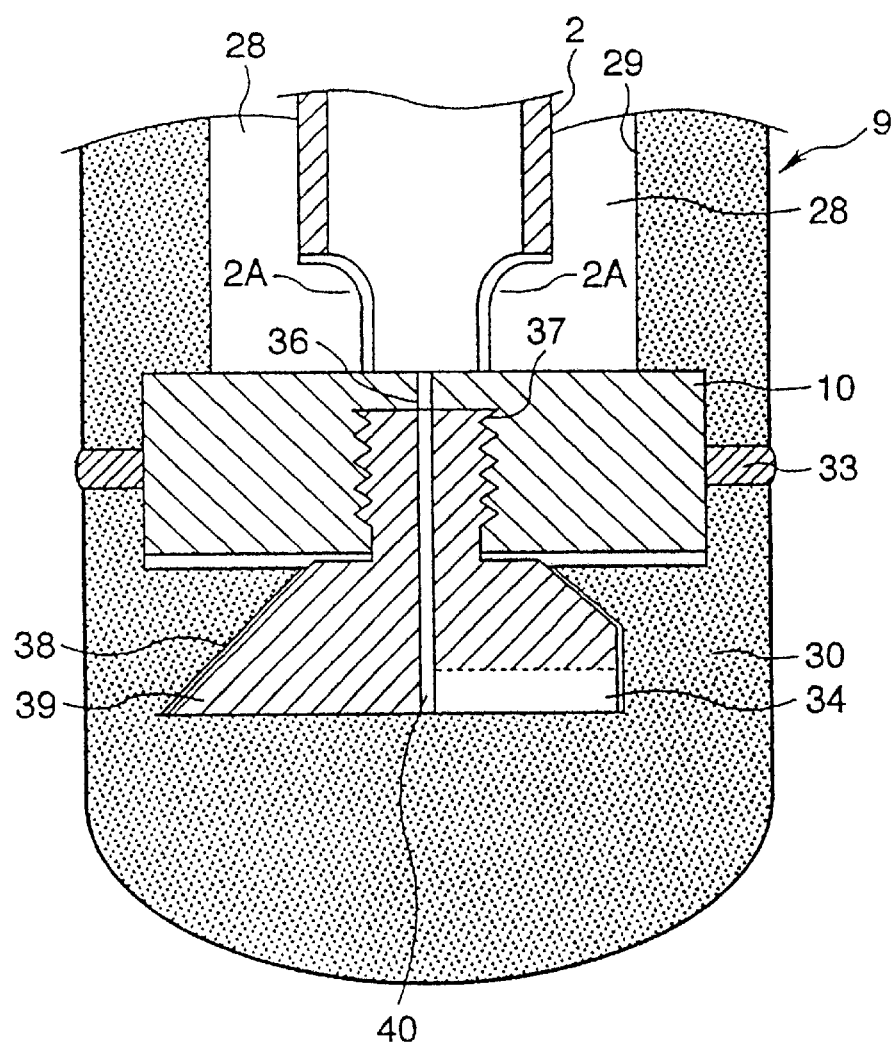
FIG. 33 is a longitudinally sectional view showing important top parts of still another from of the apparatus for heating high-temperature air according to the invention.
Figure 34:
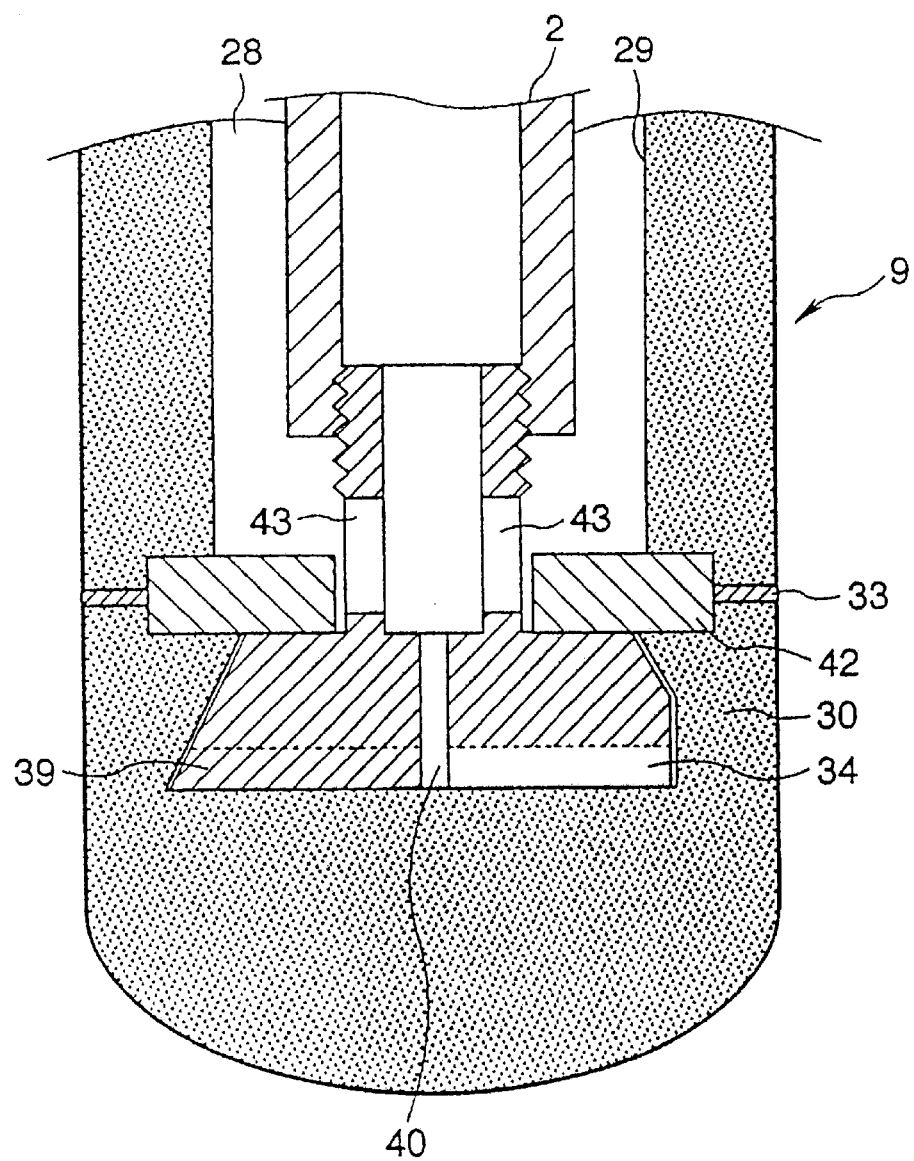
FIG. 34 is a longitudinally sectional view showing important top parts of still another from of the apparatus for heating high-temperature air according to the invention.

In an example shown in FIG. 33, the cap of FIG. 31 is attached to an top end of the heat transfer conduit 9 constructed with the the inner metallic heat transfer pipe 2 and the outer refractory heat transfer pipe 29 as seen in FIG. 13. In an example shown in FIG. 34, the cap of FIG. 32 is attached to an top end of the heat transfer conduit 9 constructed with the the inner metallic heat transfer pipe 2 and the outer refractory heat transfer pipe 29 as seen in FIG. 13.

Embodiment 6

Embodiment 6 of the apparatus for heating high-temperature air according to the present invention is described below with reference to FIG. 35 to FIG. 38. In these figures, like reference numerals denote like parts.

Figure 35:
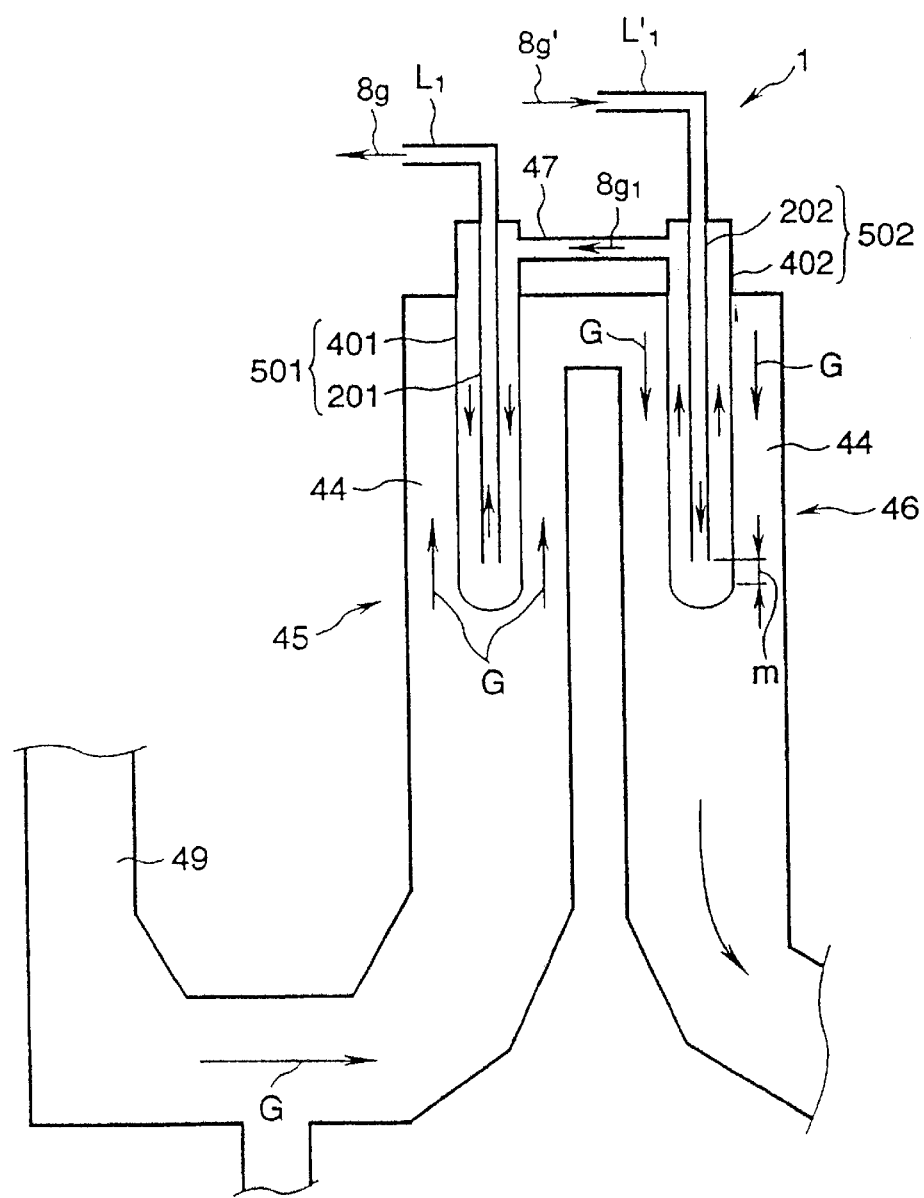
FIG. 35 is a schematically longitudinally sectional view showing still another from of the apparatus for heating high-temperature air according to the invention.

An apparatus 1 for heating high-temperature air shown in FIG. 35 is constructed with a first air heater 45 located upstream of a flow passage 44 of gas of elevated temperature and a second air heater 46 located downstream of that flow passage. More specifically, the first air heater 45 and the second air heater 46 are provided, respectively, with a heat transfer conduit 9 shown for example in FIG. 25. Namely, such heaters are provided with heat transfer pipes 501, 502 constituted with outer heat transfer pipes 401, 402 covered with a refractory protective pipe 6 and inner heat transfer pipes 201, 202 arranged coaxially of the outer heat transfer pipes 401, 402. The inner heat transfer pipe 201 used to constitute the first air heater 45 is connected to a line L1 of an air to be heated, whereas the inner heat transfer pipe 202 used to constitute the second air heater 46 is connected to a line L1' of an air to be heated. Moreover, the outer heat transfer pipe 401 of the first air heater 45 and the outer heat transfer pipe 402 of the second air heater 46 are joined by a connoting pipe 47.

In the apparatus 1 for heating high-temperature air thus constructed, an air 8g' of low temperature supplied from the line L1' of an air to be heated to the second air heater is heated with a burnt exhaust gas G of elevated temperature while such air is being flowed through the inner heat transfer pipe 202 into the outer heat transfer pipe 402, and the heated air 8g1 to be heated is heated through the connecting pipe 47 in the outer heat transfer pipe 402 of the first air heater 45 so that an air 8g of a higher temperature is provided which is utilized as other heat sources from the inner heat transfer pipe 202 and the line L1 of an air to be heated.

Figure 36:
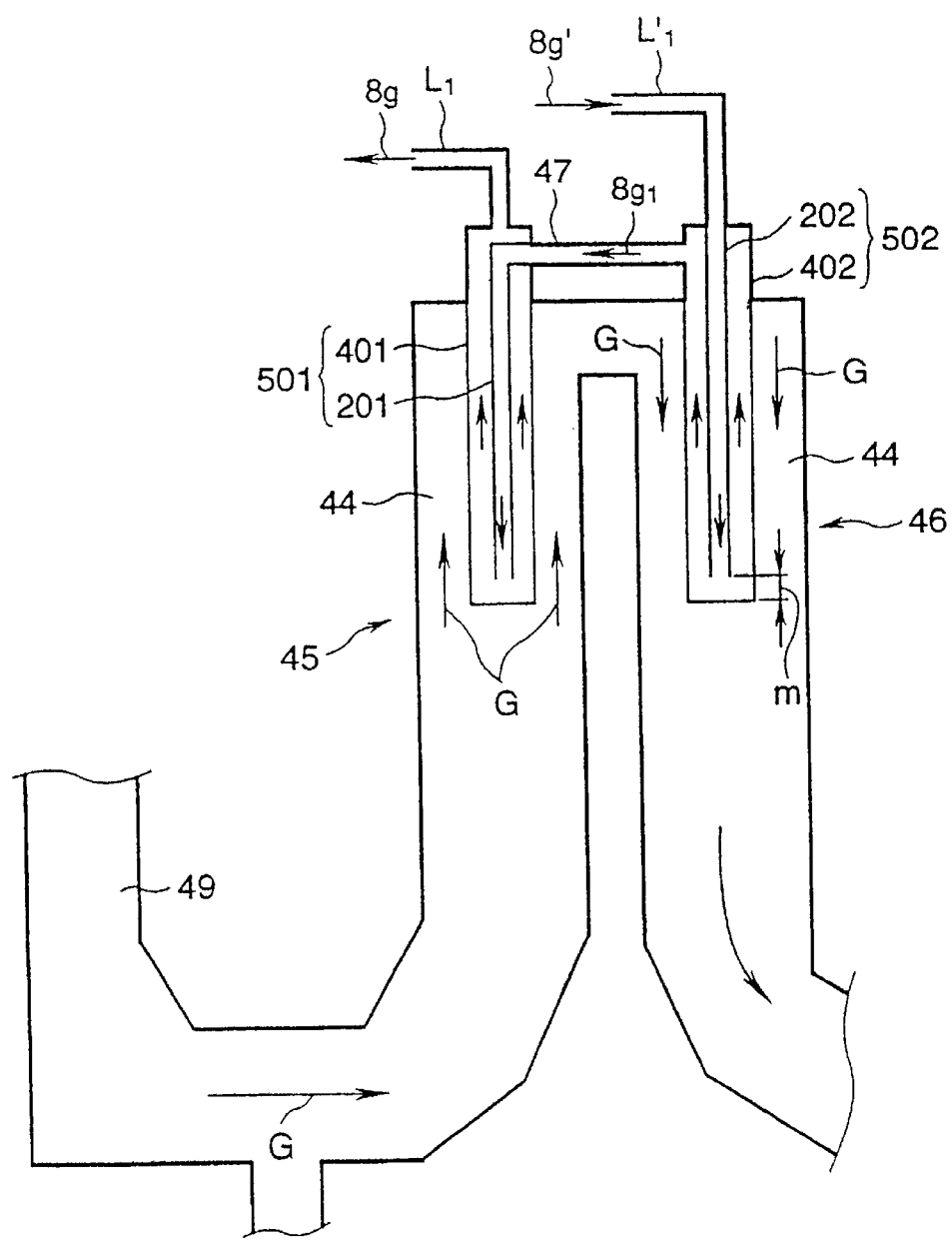
FIG. 36 is a schematically longitudinally sectional view showing still another from of the apparatus for heating high-temperature air according to the invention.

FIG. 36 shows still another example. An air 8g1 of high temperature heated in the second air heater 46 is supplied through the connecting pipe 47 to the inner heat transfer pipe 201 and the outer heat transfer pipe 401 of the first air heater 45 and heated therein into an air 8g of a higher temperature which is utilized as other heat sources from the line L1 of an air to be heated.

In each of the above examples, the apparatus 1 for heating high-temperature air is described in which the air 8g' of low temperature to be heated is first supplied to inner heat transfer pipe 202 of the second air heater 46. The air 8g' may be supplied, where desired, to the outer heat transfer pipe 402 of the second air heater 46.

Figure 37:
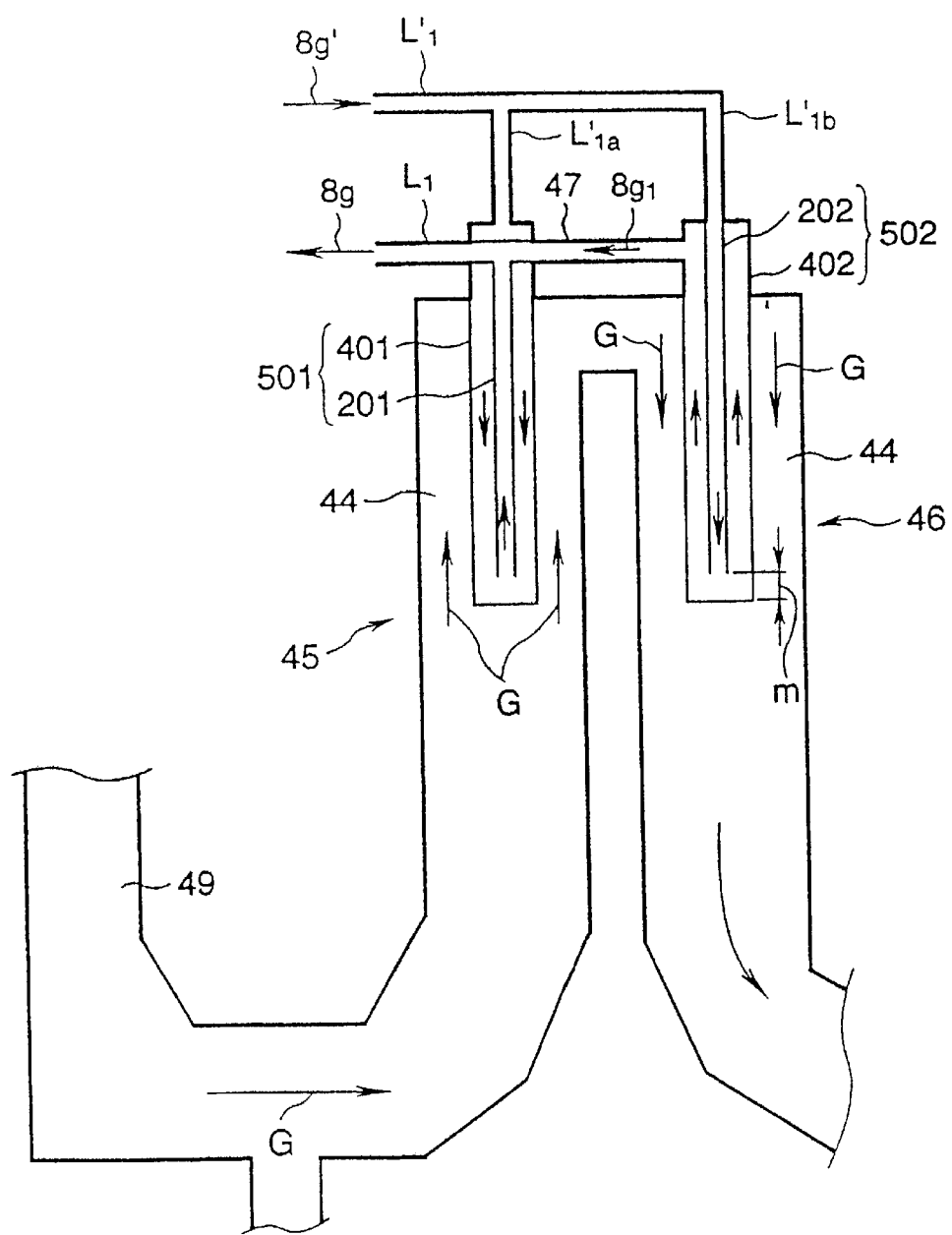
FIG. 37 is a schematically longitudinally sectional view showing still another from of the apparatus for heating high-temperature air according to the invention.
Figure 38:
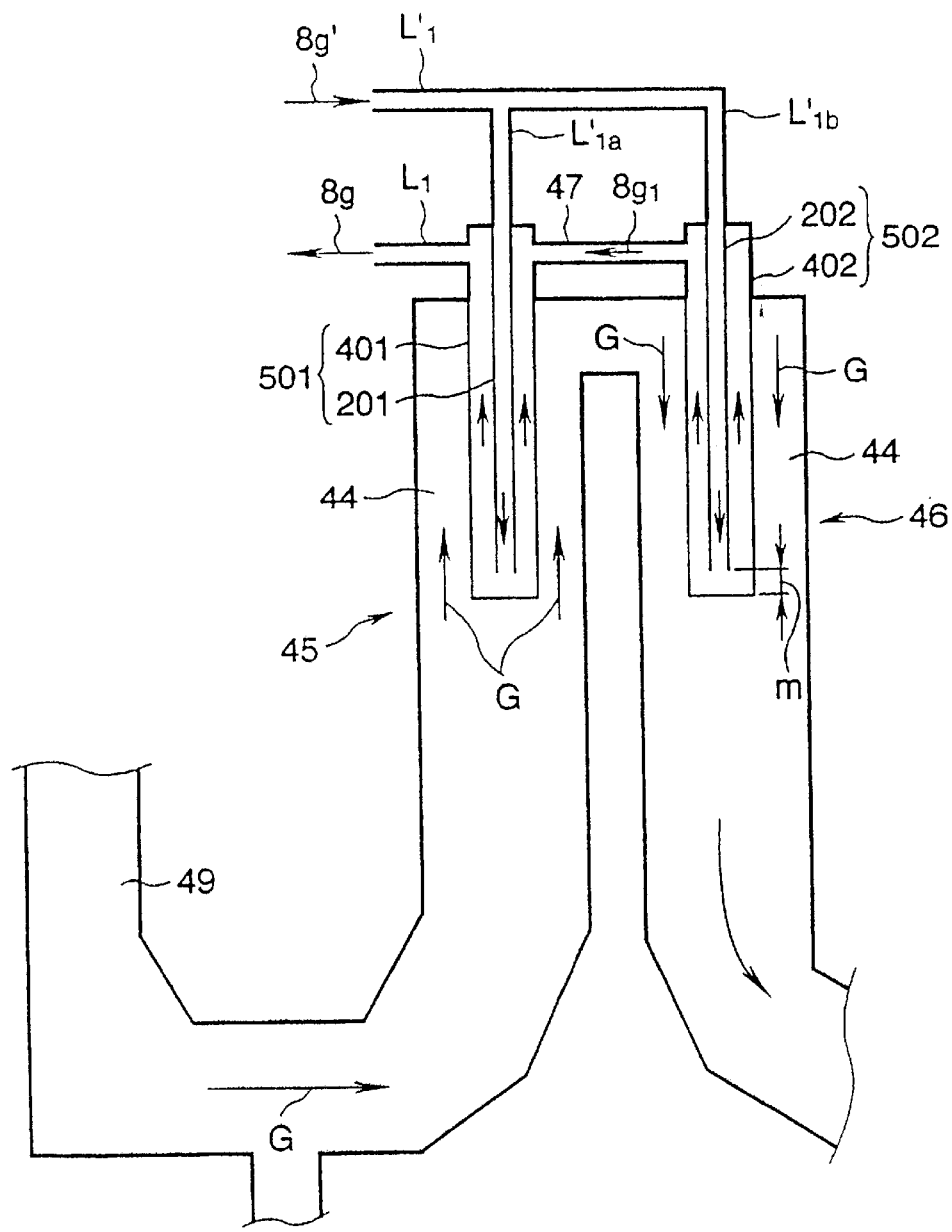
FIG. 38 is a schematically longitudinally sectional view showing still another form of the apparatus for heating high-temperature air according to the invention.

FIG. 37 and FIG. 38 show still another examples of the apparatus 1 for heating high-temperature air. In an apparatus 1 for heating high-temperature air shown in FIG. 37, an air 8g' of low temperature to be heated is partly supplied from a bifurcated pipe L'1a to the outer heat transfer pipe 401 of the first air heater 45 and heated therein, whereas the remainder of such air is supplied from a bifurcated pipe L'1b to the inner heat transfer pipe 202 of the second air heater 46 and heated therein. An air 8g of a higher temperature heated in the first air heater 45 and the second air heater 46 is supplied through the line L1 of an air to be heated to other facilities.

In an apparatus 1 for heating high-temperature air shown in FIG. 38, an air 8g' of low temperature to be heated is partly supplied from a bifurcated pipe L'1a to the inner heat transfer pipe 202 of the first air heater 45 and heated therein. An air 8g of a higher temperature thus heated is supplied through the line L1 of an air to be heated to other facilities. Each of these example illustrates that an air 8g' of low temperature to be heated is partly supplied from a bifurcated pipe L'1a to the outer heat transfer pipe 401 or the inner heat transfer pipe 202 of the first air heater 45 and heated therein, whereas the remainder of such air is supplied from a bifurcated pipe L'1b to the inner heat transfer pipe 202 of the second air heater 46 and heated therein. The remainder of an air 8g' of low temperature to be supplied in the second air heater 46 may be supplied, where needed, to the outer heat transfer pipe 402. Thus, the air 8g' to be heated may be selectively supplied to the first air heater 45 and the second air heater 46. In particular, in the case of supply to the first air heater, the air is supplied to the outer heat transfer pipe 201. In such instance, an air 8g' of a relatively low temperature to be heated is introduced in a lower end or high-temperature portion so that the temperatures of air, pipe walls and refractories are prevented from rise at that portion. The apparatus for heating high-temperature air can thus be rendered highly durable.

According to the apparatus for heating high-temperature air shown in this embodiment, a given air to be heated is obtained by use of the first air heater and the second air heater as stated hereinabove. In consequence, the length can be small with eventual weight saving of a support structure for use in suspending the heating apparatus. Also advantageously, it is markedly simple for the heating apparatus to be taken out upwardly of a flow passage for a gas of elevated temperature during maintenance. Additionally, the flow area for an air to be heated with respect to the flow area for a gas of elevated temperature is made sufficiently large so that the flow rate can be reduced in obtaining a given air to be heated, and this is effective for decreasing pressure loss.

Figure 39:
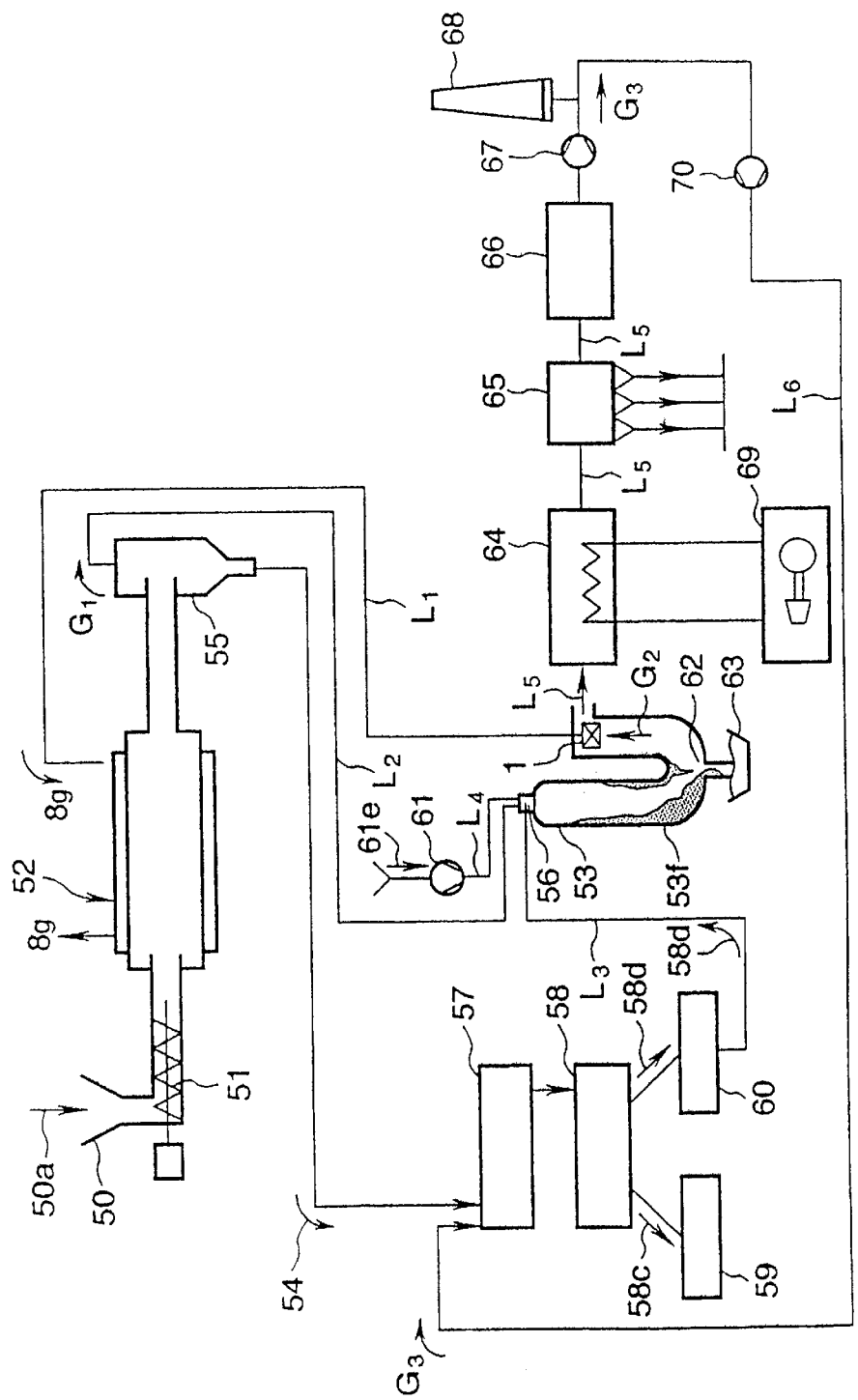
FIG. 39 is a schematic view showing one form of the apparatus for disposing of wastes according to the invention.

Next, one embodiment of the apparatus for disposing of wastes is described which is provided with the apparatus for heating high-temperature air according to the present invention. FIG. 39 is a schematic view showing one form of the apparatus for disposing of wastes.

In the apparatus for disposing of wastes of this embodiment, a waste 50a such as city waste or the like is crushed for example by a biaxial shearing crusher to provide a grain of 150 mm or below which is charged as by a conveyor into a charge chamber 50. the waste 50a placed in the charge chamber 50 is supplied through a screw feeder to a thermal decomposition reactor 52. As the thermal decomposition reactor 52, a horizontal rotary drum is used in this embodiment, and such drum is maintained in low oxygen atmosphere by means of a sealing mechanism not shown.

The waste 50a is thermally decomposed in the thermal decomposition reactor 52, and a heat source is a heated air 8g (heat medium) supplied through a heated line L1 of an air heated by the apparatus 1 for heating high-temperature air which is an heat exchanger located rearwardly of a burning melting furnace 53 to be described later.

By use of the heated air 8g, the thermal decomposition reactor 52 is maintained at 300–600° C., usually at 450° C. or so.

Further, the waste 50a heated with the heated air 8g is thermally decomposed into a thermally decomposed gas G1 and a thermally decoposed residue 54 composed chiefly of nonvolatile components which are transported to a dischager 55 where such gas is separated from such residue. The thermally decomposed gas G1 separated in the discharger 55 is supplied through a thermally decomposed gas line L2 to a burner 56 of the burning melting furnace 53. The thermally decomposed residue 54 taken out of the discharger 55 is relatively high in temperature, say about 450° C., and hence is cooled to about 80° C. by a cooler 57, followed by supply to a separator 58 which is made up of for example a magnetically selective type, an eddy current type, a centrifugal type or a wind selective type alone or in combination, all of which are in common use. In this separator, the residue is separated into a fine combustible component 58d (inclusive of ash) and a crude incombustible component 58c, and the incombustible component 58c is recovered for reuse in a container 59.

Moreover, the combustible component 58d is pulverized for example into 1 mm or below with use of a pulverizer 60, supplied through a combustible component line L3 to the burner 56 of the burning melting furnace 53 and burnt in a high temperature region of about 1300° C. together with the thermally decomposed gas G1 supplied from the thermally decomposed gas line L2 and an air 61e for use combustion supplied from a blower 61. An ash generated at that time is converted by means of the burning heat to a melt slug 53f which deposits on an inner surface of the burning melting furnace 53 and further flows down along the inner surface and drops through a bottom outlet 62 into a water pool 63 in which such slug solidifies by cooling.

The burning melting furnace generally called a dissolution furnace permits the combustible component 58d such as carbon or the like to burn at a high temperature of about 1300° C. and to melt the incombustible component containing ash, generating the melt slug 53f and a burnt exhaust gas G2 of elevated temperature. The melt slug 53f is dropped into the water pool 63 and then solidified. On the other hand, the burnt exhaust gas G2 is heat recovered as a gas stream of 2–3 m per second in flow rate and of 1000–1100° C. by the apparatus 1 for heating high-temperature air located downstream of the furnace.

The apparatus 1 for heating high-temperature air in this embodiment is constructed with either one or a suitable combination of the high-temperature air heaters stated above. As seen in FIG. 25, one example is constituted of a pair of heat transfer pipes and a refractory protective pipe 6 provided at a top end with a detachable cap 30. That is, as mentioned above, even when the cap 30 gets centrally worn or damaged upon contact with a gas flow of elevated temperature, the cap alone can be simply replaced by a new one.

The burnt exhaust gas G2 having passed partly through the apparatus 1 for heating high-temperature air is heat recovered through a flue gas line L5 in a waste heat boiler 64 and dust removed in a dust collector 65. After removal of poisonous components in a exhaust gas cleaner 66, such gas is discharged as a clean exhaust gas G3 in the atmosphere by an induction blower 67 and from a chimney 68. Steam obtained from the waste heat boiler 64 is utilized for electricity generation by means of an electricity generator 69 provided with a steam turbine. Part of the clean exhaust gas G3 is supplied through a cold gas line L6 to a cooler 57 with use of a fan 70.

According to the apparatus for disposing of wastes illustrated in this embodiment, the apparatus for heating high-temperature air is made wholly highly durable so that improved working efficiency is attained as concerns the apparatus for disposing of wastes. Although the present invention has been described in great detail with regard to the embodiments shown in the drawings, the invention should not be considered restrictive to these embodiments. It is to be noted that various changes and modification s may be made without departing from the spirit of the invention.

Embodiment 7

Figure 40:
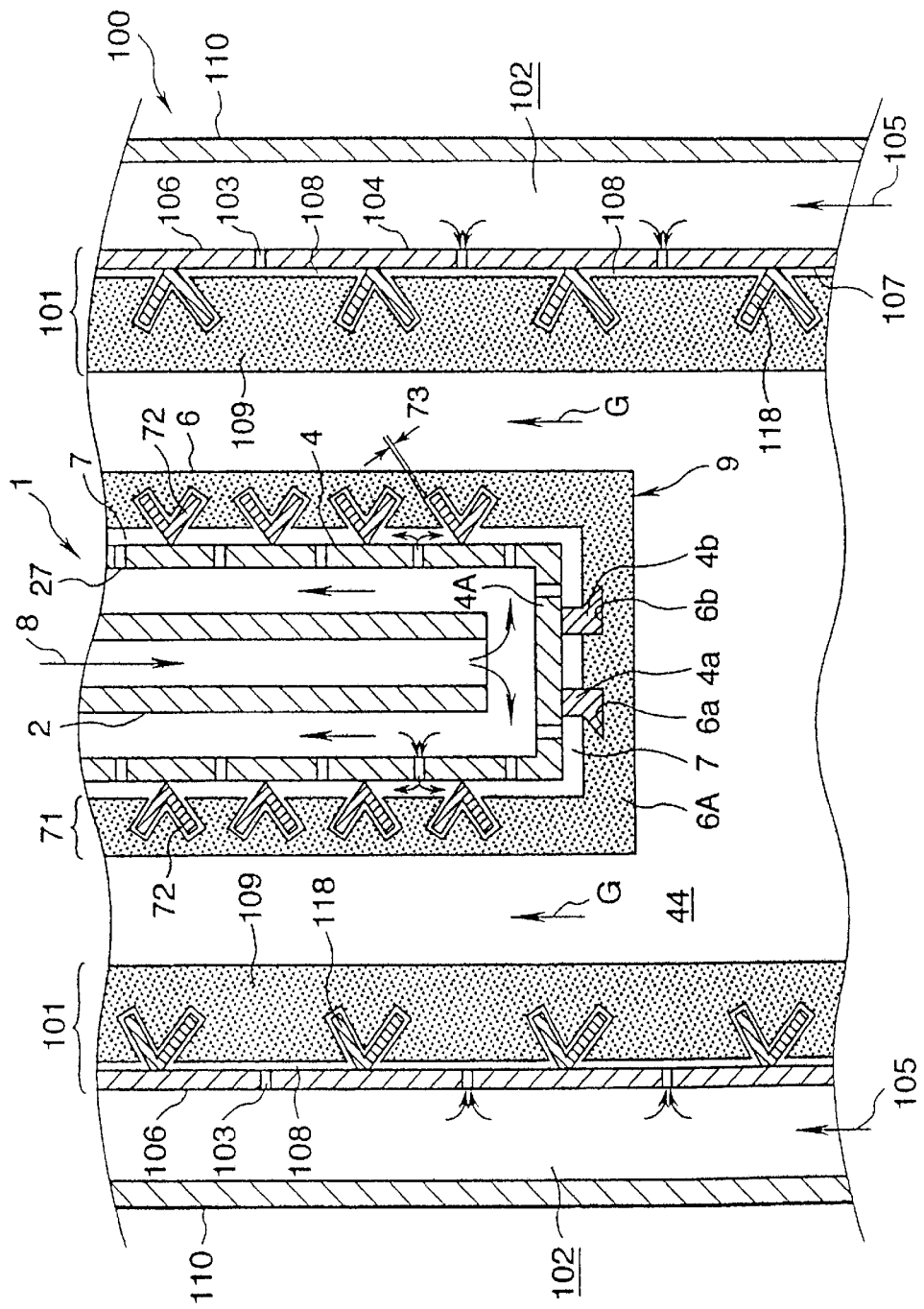
FIG. 40 is a longitudinally sectional view showing important parts of still another form of the apparatus for heating high-temperature air according to the invention.

FIG. 40 is a partial sectional view showing embodiment 7 of the present invention.

A passage wall for an exhaust gas G of high temperature arranged to partition a passage for an exhaust gas of high temperature from the external atmosphere is provided with a heat exchanger, and an apparatus 1 for heating an high-temperature air is located coaxially of the heat exchanger and in an exhaust passage surrounded by the heat exhanger. The high-temperature air heating apparatus 1 has a heat transfer conduit 9 constructed with an inner metallic heat transfer pipe 2, an outer metallic heat transfer pipe 4 sealed at a top portion and disposed as a metallic wall for coaxially covering the inner heat transfer pipe 2 with a gapping 3 defined as an air passage between the inner and outer pipes, and a refractory protective pipe 6 sealed at a top portion and disposed to coaxially cover the heat transfer pipe.

The outer heat transfer pipe 4 communicating on an inner surface with the gapping 3 for use as the air passage is disposed to cooperate with the refractory protective pipe 6 communicating on an outer surface with an exhaust gas passage 44 in forming a partiotion wall 71 soa as to separate the air passage from the exhaust gas passage.

A first gapping 7 is defined between an outer surface of the outer heat transfer pipe 4 and an inner surface of the refractory protective pipe 6, and the outer heat transfer pipe 4 has a plurality of through holes communicating with the first gapping 7.

The refractory protective pipe 6 is provided with on an inner surface of a sealed end 6A of the top portion with ant holes 6a, 6b, while the outer heat transfer pipe 4 is provided on an outer surface of a sealed end 4A of the top portion with ant-shaped protrusions 4a, 4b disposed to be interengageable with the ant holes 6a, 6b, respectively. By interengagement of the ant holes 6a, 6b with the protrusions 4a, 4b, the outer portion of the refractory protective pipe 6 is positioned with respect to the outer heat transfer pipe 4.

A plurality of anchors 72 are attached by welding to the outer surface of the outer heat transfer pipe 4, which anchors act to support the refractory pipe 6, so that the first narrow gapping 7 defined between the outer heat transfer pipe 4 and the refractory pipe 6 is rendered substantially uniform over its entire length. Even with the first gapping 7 provided, the refractory pipe 6 of great mass is held in securely supported relation to the outer heat transfer pipe 4 by means of the anchors 72. A second gapping 73 is further defined between the anchord 72 and the refractory pipe 6 and made to communicate with the first gapping 7.

Next, the structure of a heat exchanger 100 is described with reference to FIG. 40, which heat exchanger is arranged on a wall of the exhaust gas passage surrounding the high-temperature air heating apparatus 1. The heat exchanger 100 is attached to a furnace wall of a burning melting furnace at its exhaust gas outlet. In the heat exchanger 100, a partition wall 101 is located to separate an exhaust gas of high temperature and low pressure (for example, a gas inlet temperature T=about 800 to 1500° C. and a gas inlet pressure P1=about −100 to −4900 Pa) containing corrosive components such as hydrogen chloride and the like and dusts from an air passage 102 defined to flow an air 105 of a lower temperature and a higher pressure than those of the burnt exhaust gas G (for example, of an air inlet temperature T3=about 300° C. and of an air inlet passage P3=about +1000 to 10000 Pa). In that way, the heat of the burnt exhaust gas G is transmitted to the air 105.

A burnt exhaust gas G of a pressure P2 cooled to a temperature T2 (for example, to about 500 to about 1300° C.) by means of the heat exchanger is further subjected to heat recovery as by a waste heat boiler and then transported to an exhaust gas treating stage in which a suction blower has been installed. At this exhaust gas treating stage, the burnt exhaust gas G is treated to collect dusts, to remove poisonous materials and to avoid fumes, followed by escaping of the treated gas through a chimney in the atmosphere.

The heat exchanger 100 is further described in greater detail.

Figure 41:
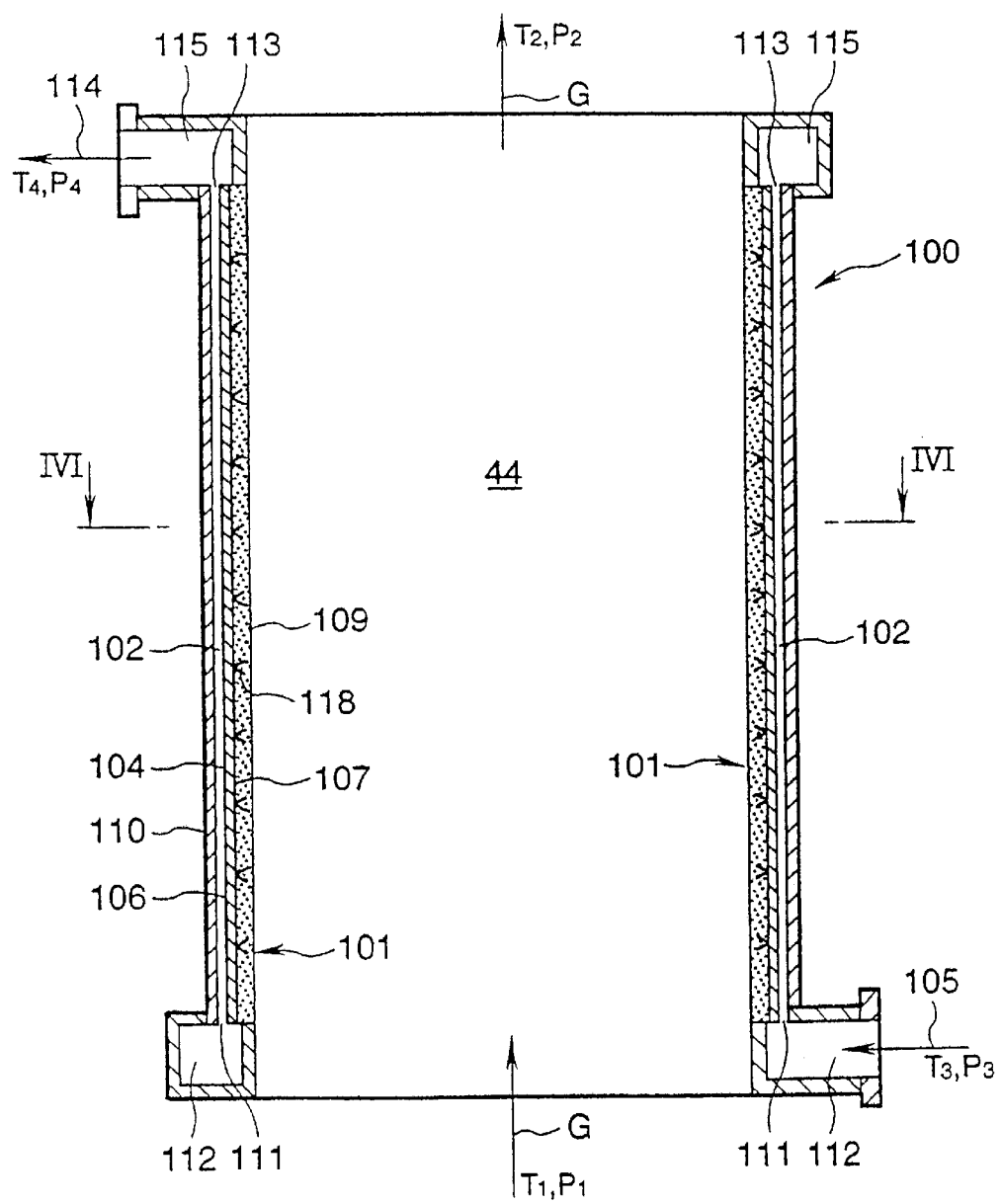
FIG. 41 is a longitudinally sectional view showing the heat exchanger of FIG. 40.
Figure 42:
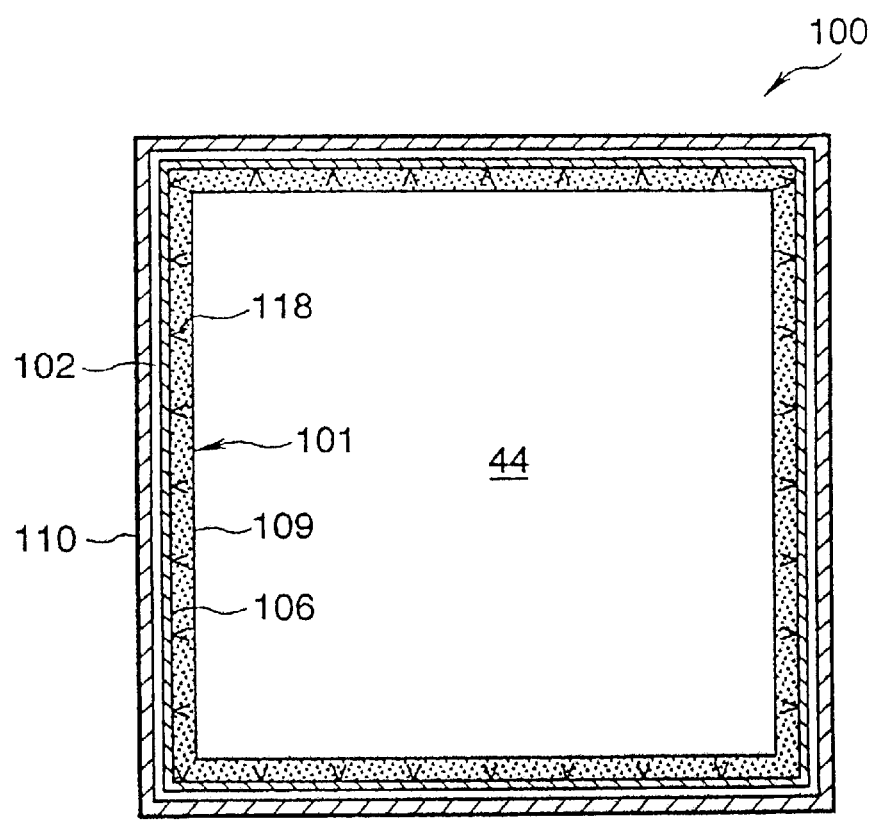
FIG. 42 is a horizontally sectional view taken along the line IVI—IVI of FIG. 41.

FIG. 41 is a longitudinal sectional view showing the above heat exchanger, and FIG. 42 is a horizontal sectional view taken along the line IVI—IVI of FIG. 41. As shown in FIG. 41, the exhaust gas passage 44 of a sectinally rectangular shape is widely provide at a central portion of the heat exchanger 100 of a sectionally rectangular shape on the whole, and the air passage 102 is partitioned by the partition wall 101 and located in a sectionally angular rectangular shape and around the exhaust gas passage 44.

The partition wall 101 has a plurality of through holes 103 made at predetermined regions (see FIG. 40, or FIG. 43 and FIG. 44 to be described later). Additionally, this partition wall has a metallic plate 106 disposed on one side (i.e., on an outer peripheral surface 104) for use as a metallic wall of good thermal conductivity to be contacted with an air 105 and also a porous refractory ceramic layer 109 disposed for use as a refractory wall to be contacted on a surface with the burnt exhaust gas on the other side (i.e., on an inner peripheral surface 107) of the whole metallic plate 106 with a first gapping 108 (see FIG. 40, or FIG. 43 and FIG. 44 to be described to be later) defined between the metallic plate and the ceramic layer.

As the ceramic layer 109, it is desired that a castable refractory material for example of silicon carbide (SiC) of high thermal conductivity and high heat resistance be coated or sprayed entirely of the inner peripheral surface 107 of the metallic plate 106 and in a thickness of about 10 to about 50 mm. An alumina-rich refractory and a chromia refractory material may also be used for the ceramic layer 109.

The ceramic layer 109 has contained therein a multiplicity of air spaces (i.e., voids) which permit a gas to pass through such layer. Because the ceramic layer 109 is disposed over the inner peripheral surface 107 of the metallic plate 106, a burnt exhaust gas G of high temperature containing corrosive components is not brought into direct contact with the metallic plate 106 so that such plate is prevented against a large degree of corrosion.

The air passage 102 is provided between the metallic plate 106 and an outer wall plate 106 outwardly disposed with a given gap left relative to the metallic plate 106.

A lower end portion 111 of the air passage 102 is so made as to communicate with a lower air chamber 112 arranged to equalize the pressure of the air 105 having been supplied thereto and to flow such air uniformly fully in the air passage 102. An upper end portion 113 of the air passage 102 is made to communicate with an upper air chamber 115 arranged to equalize the pressure of a heat exchange-derived high-temperature air 114 and to discharge such air uniformly fully from the air passage 102.

Subsequently, the structure of the passage wall for the heat exchanger 100 is described with reference to FIG. 43 to FIG. 45. FIG. 43 is a sectional view, partly enlarged, of the heat exchanger 100, and FIG. 44 is a horizontal sectional view taken along the line IVIV—IVIV of FIG. 43. FIG. 45 is a front elevational view showing part of a surface portion of the metallic plate of FIG. 43.

Figure 43:
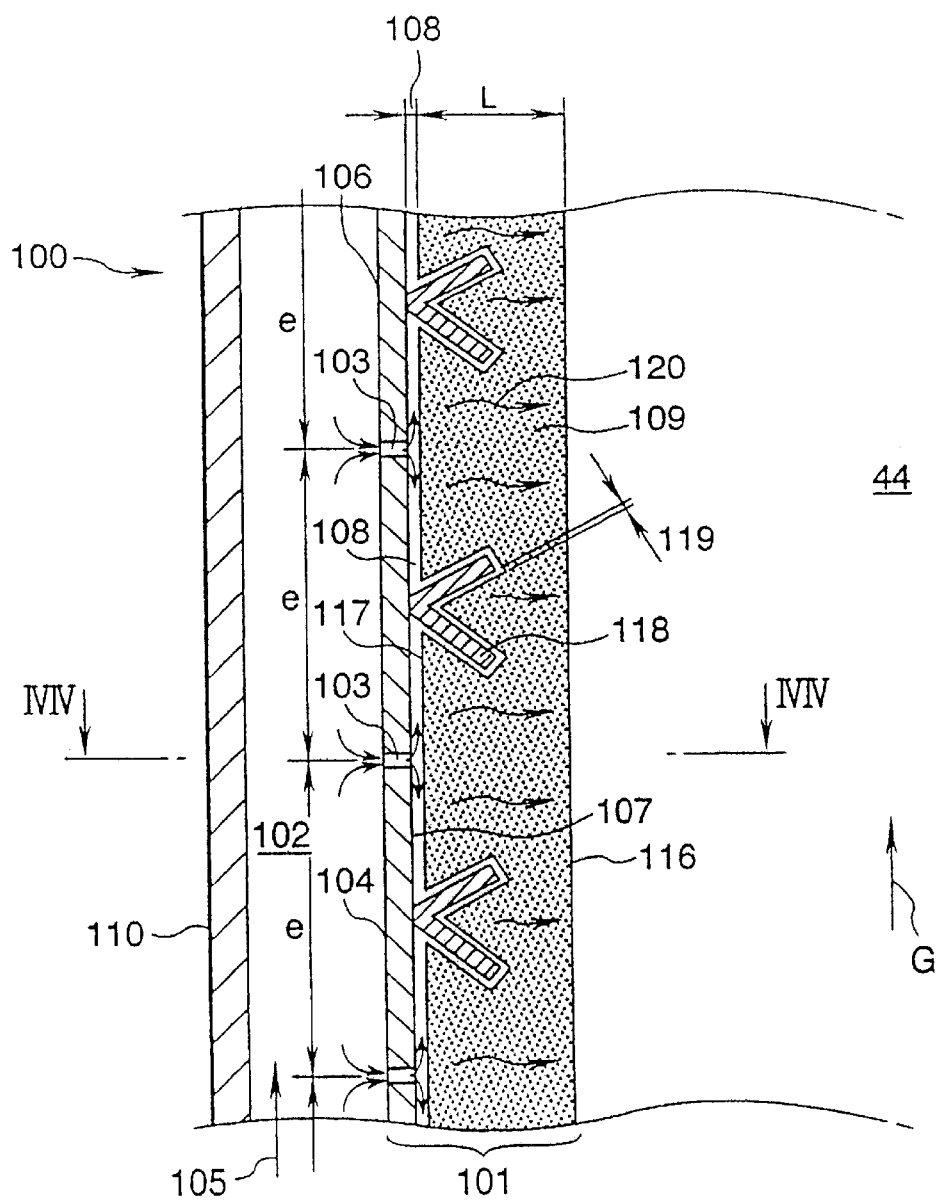
FIG. 43 is a sectional view, partly enlarged, of the heat exchanger of FIG. 40.
Figure 44:
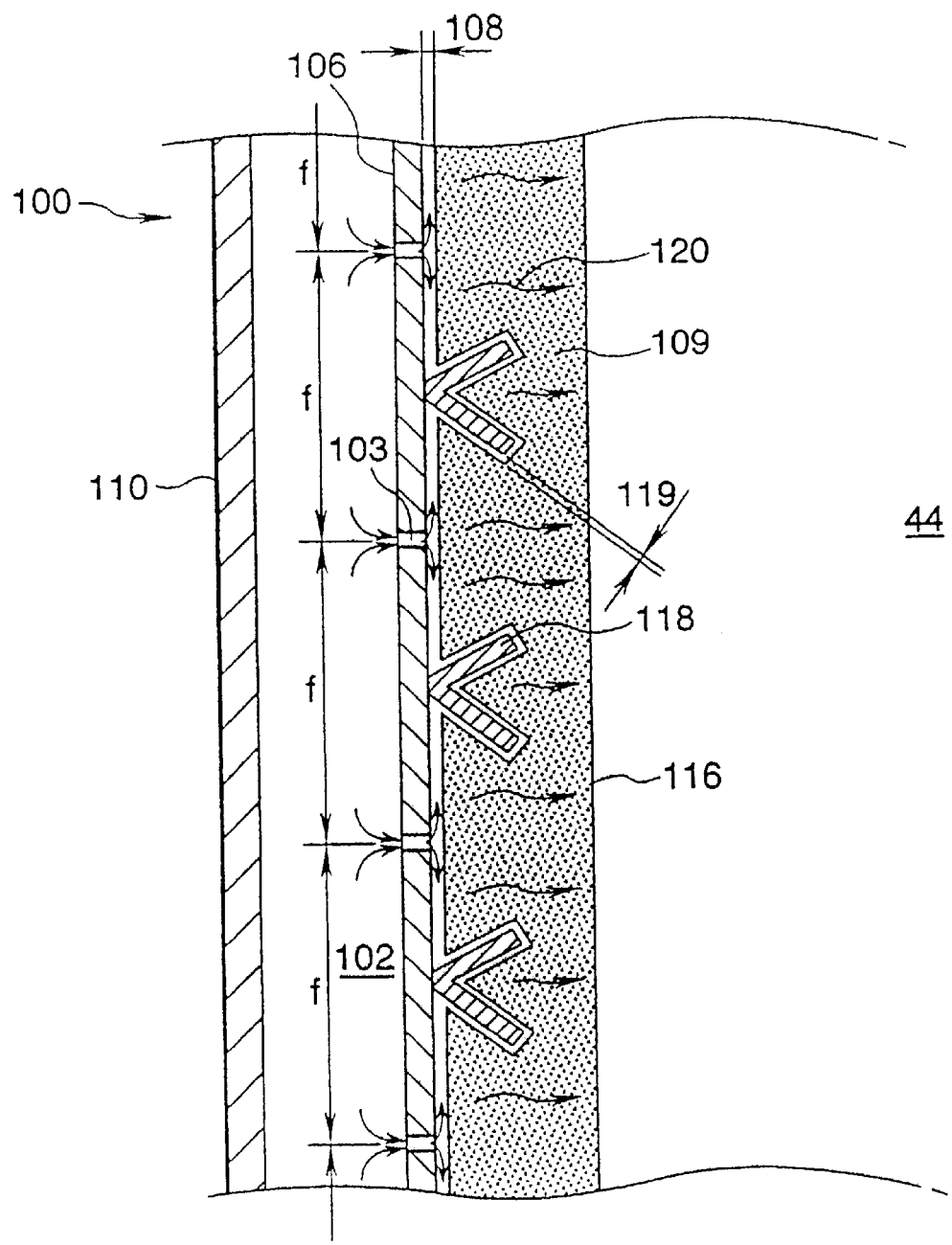
FIG. 44 is a horizontally sectional view taken along the line IVIV—IVIV of FIG. 43.
Figure 45:
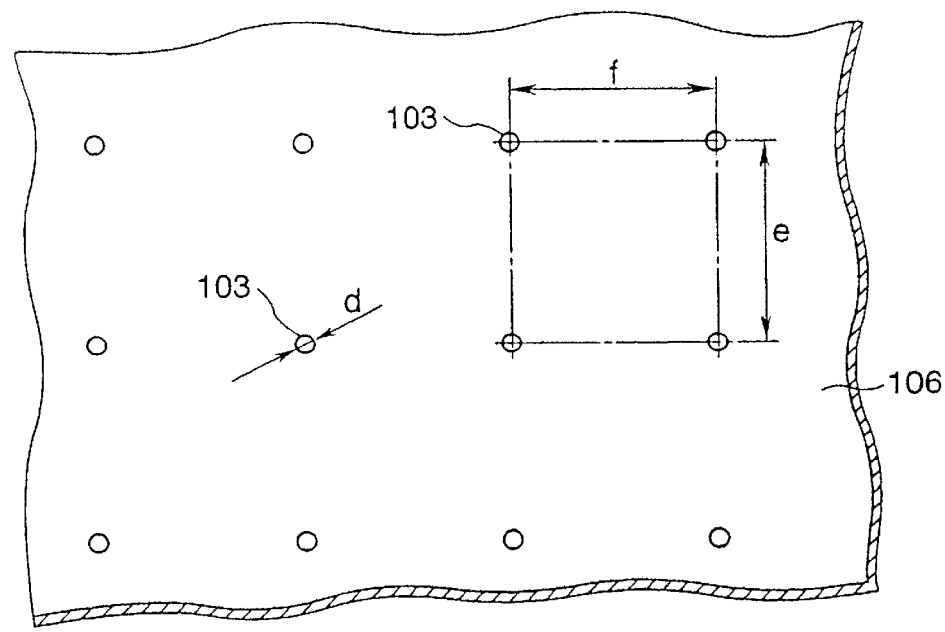
FIG. 45 is a front elevational view showing part of a surface of a metallic sheet.

As shown in FIG. 43 to FIG. 45, the metallic plate 106 contacted with the passage 102 for the air 105 has a plurality of through holes 103 made at given regions, and the ceramic layer 109 disposed on one surface (a front side 116) in contact with the passage 44 for the burnt exhaust gas G is arranged on the inner peripheral surface 107 of the metallic plate 106.

In use of the heat exchanger 100, the first gapping 108 of a given size (preferably of 1 to 3 mm) is present between the full inner peripheral surface 107 of the metallic plate 106 and the other full surface (back side 117) of the ceramic layer 109, and the gapping 108 is in communication with the through holes 103. The metallic plate 106 provided therein with the through holes 103 is of a plate-like shape noted above, but may be of a plate or the like having a network structure so long as the latter plate is provided therein with openings like the through holes.

The anchors 118 in a plural number are secured in place to the inner peripheral surface 107 of the metallic plate 106, which anchors serve as support members to support the ceramic layer 109 when in defining the first gapping 108. The partition wall-constituting anchors 118 are formed of iron and in V-shaped rod-like arrangement, and are fixed at their bottom portions to the metallic plate 106 by means of welding and embedded at their body portions in the ceramic layer 109. Thus, such anchors firmly hold the ceramic layer 109 in place.

In the case of use of the heat exchanger 100, the second gapping 119 of a given size (preferably of 1 to 3 mm) is present between the whole surface of each of the anchors 118 and the ceramic layer 109 and is in communication with the first gapping 108. The second gapping 119 may in some instances be omitted.

In order to define the first and second gappings 108, 119, an interlaminar material is firstly disposed by winding vinyl resin such as vinyl sheet, vinyl tape or vinyl hose, or paper tape, or by coating tar or paint.

More specifically, prior to formation of the ceramic layer 109, the inner peripheral surface 107 of the metallic plate 106 is wholly covered with polyvinyl chloride sheet, or is wholly coated with aqueous paint.

Meanwhile, before or after being welded to the metallic plate 106, each of the anchors 118 is wound with insulating tape formed of polyvinyl chloride, covered with commercially available vinyl hose to be used for tap water and cut short, or coated with aqueous paint. Alternatively, the anchor 118 may be immersed in the stock liquid of the aqueous paint.

Subsequently, a water-containing silicon carbide castable material (or alumina-rich or chromia castable material) is coated or sprayed on a whole surface of the above vinyl sheet or the like (i.e., interlaminar material) disposed over the metallic plate 106, followed by drying and calcination of the castable material upon heating up to for example about 500 to about 600° C., whereby the ceramic layer 109 is obtained.

During that heating, the vinyl sheet or the like mentioned above is melted and vaporrized at from about 150° C. or above to about 200° C. or above and thus is finally removed.

It is noted that the anchor 118 has a larger thermal expansion coefficient than the ceramic layer 109. In such case, the gapping 119 may be defined in advance at room temperature (for example, at 20° C.) between the anchor 118 and the ceramic layer 109 so that even if the anchor 118 gets expanded more greatly than the ceramic layer 109 upon exposure of the heat exchanger 100 to a high temperature when in use, the gapping 119 can absorb the difference in thermal expansion coefficient.

Consequently, the finished structure is free of stresses which would be apt to arise from the difference in thermal expansion coefficient while in heating and cooling of that structure. The ceramic layer 109 can thus be prevented against cracking or breakage.

In addition to the above attention drawn to the difference in thermal expansion coefficient, it is desired that the second gapping 119 be previously set to have a larger size when being defined at room temperature such that this gapping provides a desired size during use of the heat exchanger.

In that case, even when the heat exchanger 100 is operated with heating at a high temperature, the difference in thermal expansion coefficient can be absorbed, and the second gapping 119 is rendered always present between the whole surface of the anchor 118 and the ceramic layer 109. The second gapping 119 and the first gapping 108, therefore, are always in communication with each other.

When the air 105 flowing through the air passage 102 is compared to the burnt exhaust gas G flowing through the exhaust gas passage 44, both passages being separated by the partition passage 100, the air 105 has a higher pressure than the burnt exhaust gas G.

Thus, the high-pressure air 105 flowing in the air passage 102 intrudes into the ceramic layer 109, while utilizing the pressure difference as an impulsion, through both the through holes 103 and the first gapping 108. In the case where the second gapping 119 located around the anchor 118 and then to intrude into the ceramic layer 109.

The air 105 is then flowed through the cavities of the ceramic layer 109 toward the exhaust gas passage 44 as arrowed at 120, and upon arrival at the surface 116 of the ceramic layer 109, is flowed into the exhaust gas paasage 44 and mixed with the burnt exhaust gas G.

In this embodiment, the ceramic layer 109 of great mass disposed with respect to the metallic plate 106 and with the first gapping 108 provided between such layer and such plate is securely held in place by the anchors 118 in a plural number. The ceramic layer 109 is thus supported with great dirmness and sufficient stability so that the gapping 108 of a small size (for example, of 1 to 3 mm) can always be retained with uniformity.

Moreover, since an air stream is directed to the exhaust gas passage 44 in the whole ceramic layer 109, the burnt echaust gas G is pushed back even when such gas tends to intrude into the ceramic layer 109 amd to flow toward the metallic plate 106 and the anchors 118.

For that reason, the burnt exhaust gas G does not almost intrude into the ceramic layer 109, nor does it contact the metallic plate 106 and the anchors 118. Hence, the metallic plate 106 and the anchors 118 are protected from corrosion in the influence of those corrosive components contained in the burnt exhaust gas G. This imparts markedly prolonged service lif to each of the members 106, 118.

For failure of the burnt exhaust gas G to enter the ceramic layer 109 in this embodiment, the surface 116 of such layer is made free of deposition of the dusts contained in the burnt exhaust gas G so that the surface 116 is maintained necessarily clean. Thus, no corrosion arising from dust deposition occurs in the metallic plate 106, avoiding reduced efficiency of heat transfer. To be more specific, the service life of the heat exchanger 100 is greatly improved in this embodiment because the metallic plate 106 and the anchors 118 are prolonged in relation to service life.

Besides and owing to the provision of the first gapping 108, those portions which are devoid of air flow in the ceramic layer 109 are not present between and among adjacent through holes 103. Additionally, even in the case of irregular voids in the ceramic layer 109, it does not occur that the burnt exhaust gas G reversely flows and eventually contacts the metallic plate 106.

Therefore, it is made possible to set pitches e, f of each through hole 103 in terms of the diameter d (hole diameter) to be larger than in the heat exchanger od the prior art (Japanese Utility Model Laid-Open No. 6-40668), thereby decreasing the number of through holes 103 to be made. This results in saved boring of the through holes 103 and hence simplified production of the heat exchanger 100.

Figure 46:
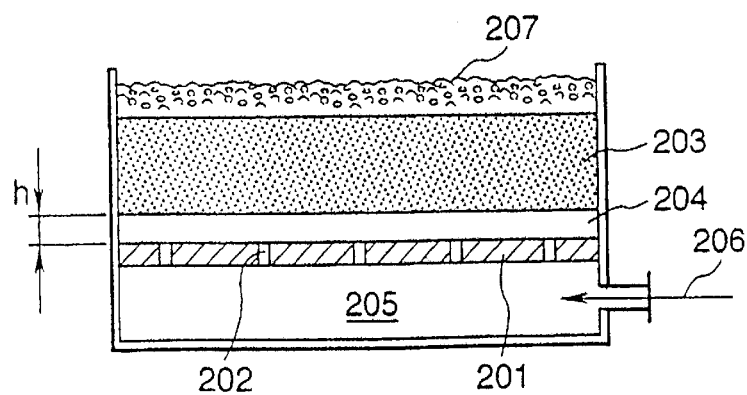
FIG. 46 is a sectional view showing important parts as concerns experiments of the heat exchanger of FIG. 40.

In FIG. 46, there are shown the experimental results obtained with the heat exchanger of this embodiment. As seen in that figure, a plurality of through holes 202 are provided in a metallic plate 201, and a gapping 204 of a given size (for example, h=2 to 3 mm) is defined between a refractory material wall 203 (for example, castable refractory material such as silicon carbide) and the metallic plate 201, the gapping 204 being in communication with the through holes 202.

Thus, when an air 206 is supplied in an air chamber 205 located backward of the metallic plate 201, the air 205 having passed via the through holes 202 gets substantially uniformly pressurized in the gapping 204 serving as a pressure chamber, consequently flowing upwardly in the refractory material wall 203. This has been confirmed by those bubbles of aqueous soap coated over one surface of the refractory material wall 203 and generated uniformly throughout the such wall surface.

Figure 47:
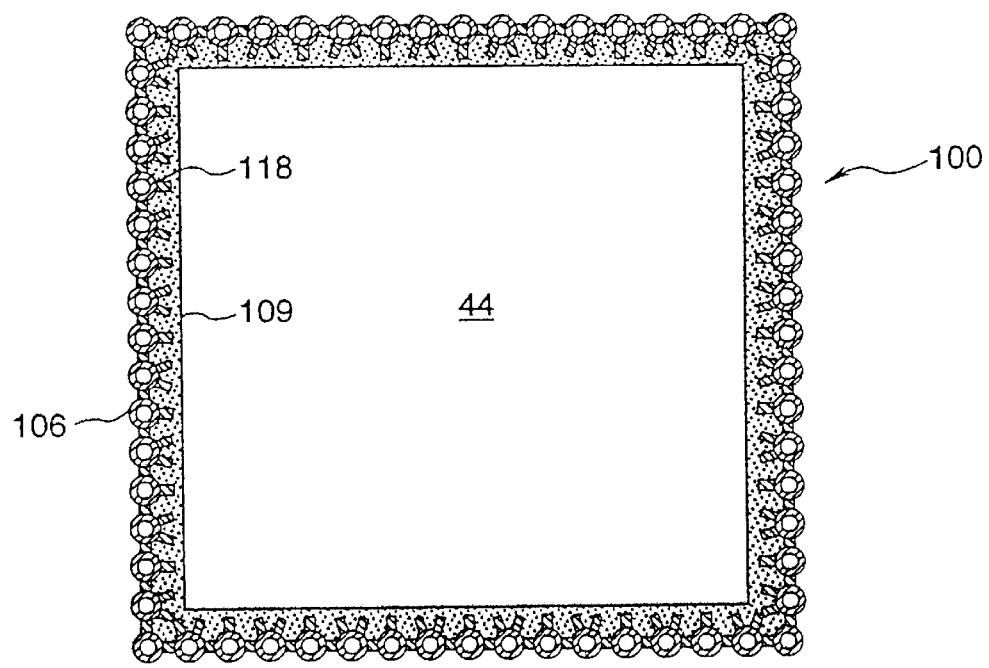
FIG. 47 is a horizontally sectional view similar to FIG. 42.
Figure 48:
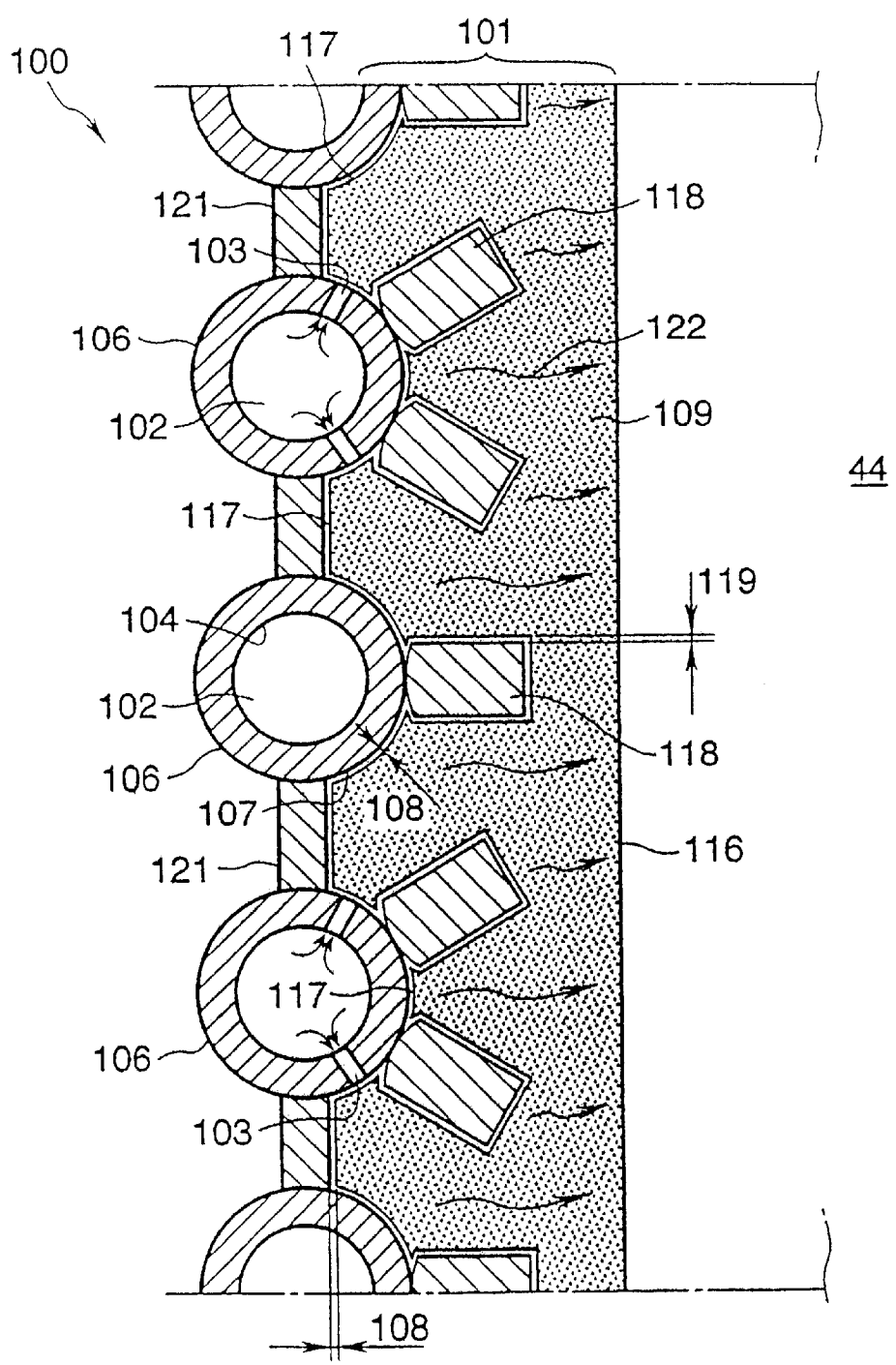
FIG. 48 is a sectional view, as partly enlarged, of FIG. 47.
Figure 49:
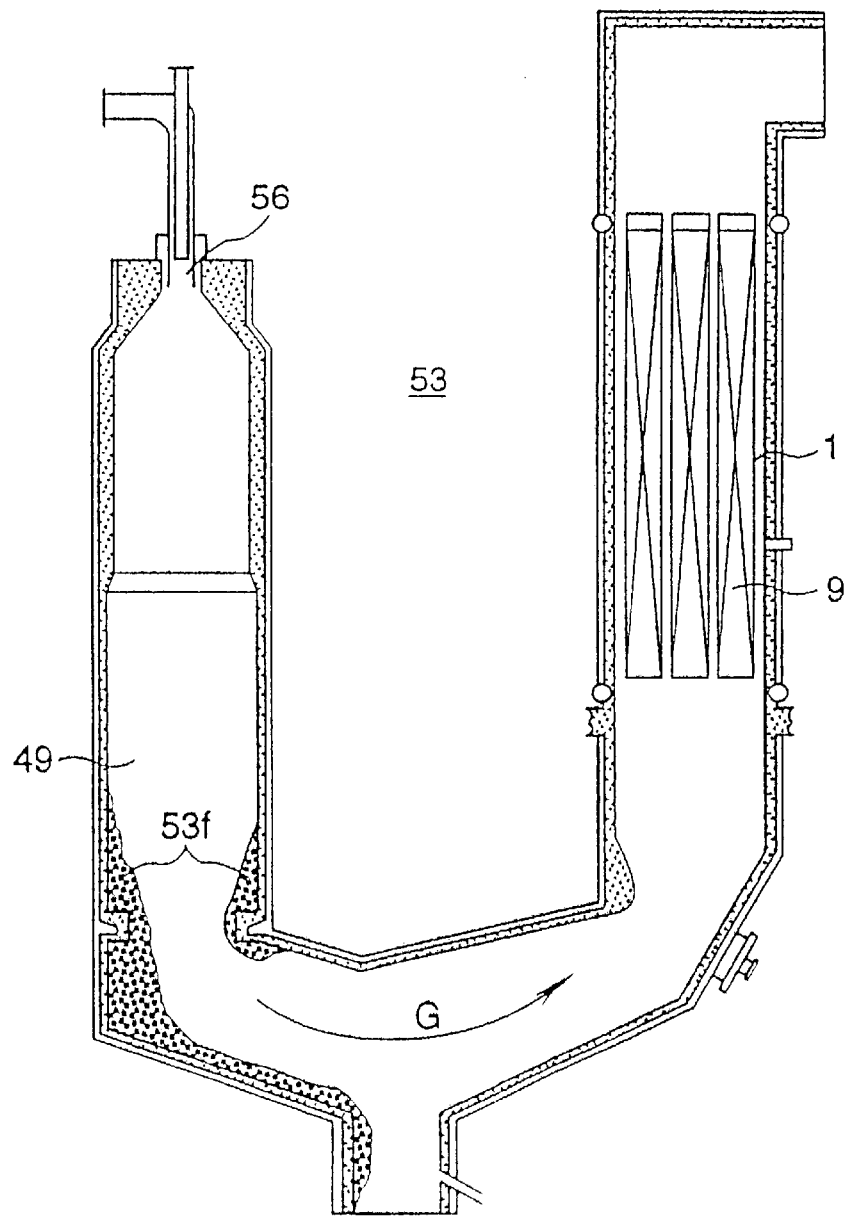
FIG. 49 is a schematically sectional view showing an apparatus for heating high-temperature air according to the prior art.

FIG. 47 and FIG. 48 show still another form of the heat exchanger 100 according to the present invention. FIG. 47 is a horizontal sectional view similar to FIG. 42, and FIG. 48 is a sectional view in partial enlargement of FIG. 47. A heat exchanger 100 of this form is substantially identical in its longitudinal section to the structure of FIG. 41.

The above heat exchanger 100, like the form seen in FIG. 42, is such wherein a partition wall 101 is provided to separate an exhaust gas passage 44 in which to flow burnt exhaust gases of high temperature and of low temperature containing corrosive components and dusts from an air passage 102 in which to flow airs 105 of lower temperature and of higher temperature than the burnt exhaust gases so that the heat of such gases is transmitted to the airs 105.

The partition wall 101 has a plurality of through holes 103 made at given regions thereof, metallic pipes 106 each provided on one surface (inner surface 104) with a metallic wall for contact with the air 105, a porous ceramic layer 109 located opposite to the other surface (outer surface 107) of the metallic pipe 106 and provided on one surface (front surface 116) with a refractory material wall for contact with a burnt exhaust gas G, and a plurality of anchors 118 disposed as support members to support the ceramic layer 109.

When in use of the heat exchanger 100, a first gapping 108 is defined between the whole outer surface 107 of the metallic pipe 106 and the other whole surface (back surface 117) of the ceramic layer 109, the first gapping 108 being made to communicate with the through holes 103.

As shown in FIG. 47, the heat exchanger 100 is formed to be generally rectangular in its entire section like that viewed in FIG. 47, and an exhaust gas passage 44 is thus provided widely centrally of the heat exchanger 100.

The metallic pipes 106 in a plural number for use as metallic walls serve in their respective insides as air passages 102 and are arranged vertically of and around the exhaust gas passage 44 of the heat exchanger 100. The metallic pipes 106 are secured respectively to a connecting plate 121.

The metallic pipes 106 have through holes 103 bored at given portions and in a desired number. For instance, all o the metallic pipes 106 may be provided with a plurality of through holes 103, but a metallic pipe 106 with through holes 103 and a metallic pipe 106 without through holes 103 can be alternately placed as shown in FIG. 48. This leads to reduced number of metallic pipes 106 requiring provision of the through holes 103, resulting in saved boring of the through holes 103.

The first gapping 108 is present between the ceramic layer 109 and the metallic pipes 106 and between the ceramic layer 109 and the connecting plate 121, which gapping is in communication with the through holes 103.

The ceramic layer 109 is of the same material as in the foregoing embodiment (FIG. 41). The ceramic layer 109 is held along the exhaust gas passage 44 by means of the anchors 118 in a plural number fixed as the support members at given locations of either one or both of each metallic pipe 106 and the connecting plate 121. Each such anchors 118 is usually in an iron-made plate-like shape, but may be in a V-shaped rod-like shape.

In this embodiment, each anchor 118 is welded at its base portion to the outer surface 107 of the metallic pipe 106 and is embedded at its body portion in the ceramic layer 109. Thus, the ceramic layer 109 is firmly held with respect to the metallic pipes 106, and the first gapping 108 is always maintained at a given size (for example, of 1 to 3 mm). In use of the heat exchanger 100, a second gapping 119 of a given size (For example of 1 to 3 mm) is also present between the whole surface of each anchor 118 and the ceramic layer 109, this second gapping being in communication with the first gapping 108.

The first and second gappings 108, 119 in this embodiment are formed in the same manner as the first and second gappings 108, 119 shown in the preceding embodiment of FIG. 41.

Since the second gapping 119 is provided with the heat exchanger 100 placed in heated condition, the difference in thermal expansion coefficient between the anchors 118 and the ceramic layer 109 can be absorbed as stated above even when this heat exchanger is exposed to a high temperature while being used. Further, a gap is always present between the whole surface of each anchor 118 and the ceramic layer 109 so that the second gapping 119 is in continuous communication with the first gapping 108.

An air 105 in the air passage 102 passes via the through holes 103 and the first gapping 108 by utilizing the pressure difference as an impulsion, thus intruding into the ceramic layer 109. Part of the air 105 flows from the first gapping 108 to the second gapping 119 running around the anchors 118 and then intrudes into the ceramic layer 109. The air 105 continues to pass through the voids interspersed in the ceramic layer 109 in a direction arrowed at 122 and toward the exhaust gas passage 44 with eventual entry in the exhaust gas passage 44.

As stated above, the ceramic layer 109 retains an air tending to flow toward the exhaust gas passage 44. Hence, a burnt exhaust gas 122 is pushed back by such air flow as arrowed at 122 even if the gas is forced to intrude into the ceramic layer 109 and to flow toward the metallic pipes 106 and the connecting plate 121.

Accordingly, the burnt exhaust gas does not almost intrude into the ceramic layer 109, nor does it contact the metallic pipes 106, the connecting plate 121 and the anchors 118. This permits the metallic pipes 106, the connecting plate 121 and the anchors 118 to be protected against corrosion resulting from those corrosive components contained in the burn exhaust gas, thereby prolonging the service lives of the members 106, 121, 118 to a great extent.

The same advantages as those obtained in connection with the embodiment of FIG. 41 can be made feasible because the first and second gappings 108, 119 are provided, and the ceramic layer 109 is firmly supported by the anchors 118.

Heretofore, anchors 118 have got seriously corroded upon contact with a burnt exhaust gas having intruded into a ceramic layer 109. These anchors have thus been covered with a castable material for purposes of anticorrosion.

In this embodiment, in contrast to the prior art practice, part of the air flows from the second gapping 119 through the ceramic layer 109 toward the exhaust gas passage 44. The burnt exhaust gas can therefore be prevented from intrusion into the ceramic layer 109 and subsequent contact with the anchors 118. This dispenses with the above castable material for use in gaining anticorrosion, making the resultant heat exchanger strructurally simple and easy to produce the same.

In the partition wall constructed above, a plurality of support members are fixed to the metallic walls to thereby hold the refractory material wall with respect to each such metallic wall. Thus, a minute gap can be always uniformly maintained between the metalli wall and the refractory material wall.

In addition, even in the case of the provision of such gapping between the metallic wall and the refractory material wall, such refractory wall of great mass can be firmly supported relative to the metallic wall. This makes it possible to locate the heat exchanger not only vertically but also laterally and slantly, imposing no restriction on positioning of the heat exchanger.

Furthermore, a multiplicity of anchors (support members) formed of iron and having a high thermal conductivity are secured to the metallic plate and the like so that, upon heating of the anchors by a burnt exhaust gas, the resulting heat is transmitted to the metallic plate and the like. The finished heat exchanger is thus improved in respect of the efficiency of heat transfer.

Each of the preceding embodiments is shown such that an combustion air in a burning melting furnace is burnt by means of a heat exchanger. This air is not particularly restrictive for burning by the heat exchanger, but an air for use in a thermal decomposition drum (not shown) and other airs may be acceptable.

Although the first and second gappings are used in each such embodiment, the first gapping alone may be accepted with the second gapping omitted.

The heat exchanger may also be formed to be circular, polygonal, ellipse or the like as seen entirely sectionally, in addition to a rectangular shape illustrated in each of the preceding embodiments. In the relevant figures, like or similar parts are designated by like reference numerals.

Figure 50:
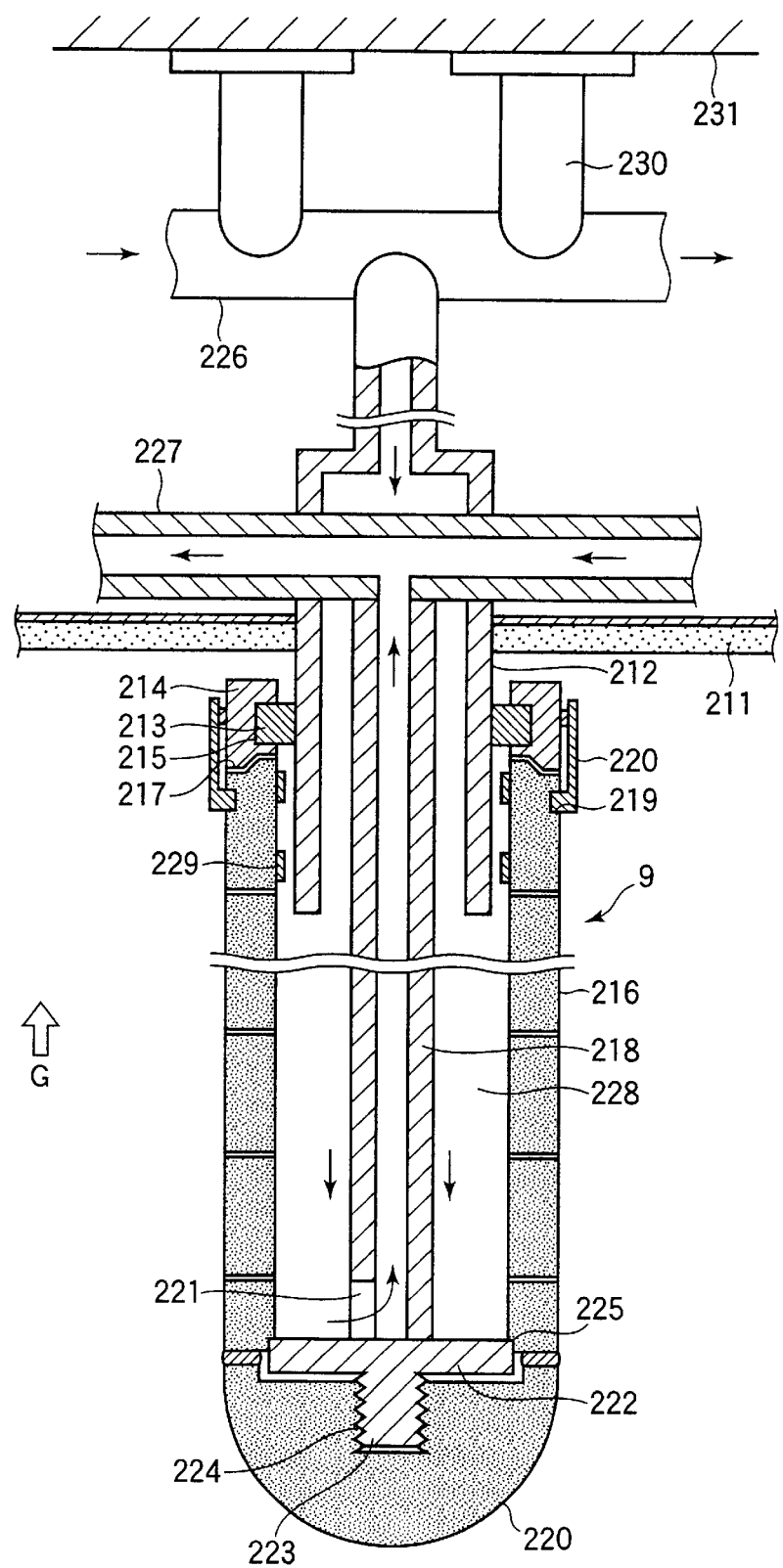
FIG. 50 is a schematically longitudinally sectional view showing still another form of the air heater according to the invention.

FIG. 50 shows another detail example of the heat transfer conduit 9 of the first air heater 45 as shown in FIG. 37. As shown in the FIG. 50, the air heater 45 is constructed with the heat transfer conduit 9 located in the passage of the burnt exhaust gas G. The heat transfer conduit 9 is constructed with a seal pipe 212, a metal ring member 214, a heat transfer pipe 216 formed of a refractory material having a heat conductivity, and a metallic pipe 218.

The seal pipe 212 goes through the ceiling 211 of the air heater 45 into the passage of the exhaust gas, and fixed to the ceiling 211. The ring member 214 is arranged outside of the seal pipe 212. A seal member is arranged between outside surface of the seal pipe 212 and the inside surface of the ring member 214 so that the ring member is able to move along a longitudinal axis of the seal pipe 212. A base part of seal member 213 is set into the ring-shaped groove 215 formed on an inner surface of the ring member 214. The top end of the heat transfer pipe 216 is bound to the ring member 214 by high temperature adhesive 217. A cramp 220 is set into the ring-shaped groove 215 formed on a circumference side of the seal member 213 and the other end of the cramp 220 is welded to the ring member 214. And bottom edge of the heat transfer pipe 216 is sealed by cap 220.

The metallic pipe 218 is arranged inside of the seal pipe 212 and the heat transfer pipe 216 in coaxial each other. The metallic pipe 218 provides a through hole 221 at a lower part of a pipe, and a support metallic fitting 222 being welded at a bottom end part of the metallic pipe 218. The metallic support fitting 222 is set into the hollow part 225 provided at an inner surface of the heat transfer pipe 216 to support the heat transfer pipe 216 by the metallic pipe 218. The support metallic fitting 222 provides a bolt 223 at an under surface thereof. The bolt 223 is screwed into a female screw 224 to hold the cap 220.

And the top end of the seal pipe 212 is connected to the inlet pipe 226 that an air to be heated is supplied. The inlet pipe 226 is supported by the structure 231 of the air heater 45 through the support member 230. And, the top end of the metallic pipe 218 is connected to an outlet pipe 227 that a heated air is flowed out. It is not illustrated, however, the exit of pipe 227 is supported by structure 231. Due to being composed like this, according to the air heater 45 shown in FIG. 50, the air supplied from the inlet pipe 226 is heated when the air is flowing through the space between the heat transfer pipe 216 and metallic pipe 218. The heated air flows into the metallic pipe 218 from the through hole 221, and flows out from the outlet pipe 227. At this time, since the metallic pipe 218 is expanded by heat, then the metallic support fitting 225 is shifted to downward. The heat transfer pipe 216, however, is arranged movable freely against the seal pipe 213, the expansion of the heat transfer pipe 226 is allowed following the shift of the metallic support fitting 222. Therefore, the damages of the heat pipe 216 formed of the refractory material being caused by the thermal expansion of the metallic pipe can be prevented. Furthermore, since the heat pipe 216 is supported at the bottom by the metallic support fitting 222, less tensile stress is occurred on the heat transfer pipe 216 formed by the refractory material. Thus the durability of the heat transfer pipe 216 is increased because the refractory materials are generally strong against compression stress and weak against tensile stress.

What is claimed is:

1. An air heater having a heat transfer conduit to be placed in high temperature highly corrosive gas, said heat transfer conduit comprising:

a short seal pipe (212) going through a ceiling of said air heater and fixed at the ceiling, a metal ring member (214) arranged outside of the short seal pipe through a sealing material and arranged to be able to move along a longitudinal axis of said short seal pipe, a heat transfer pipe (216) formed of a refractory material having a heat conductivity, connected to said metal ring member at a top end portion and sealed at a lower end portion, a metallic pipe (218) arranged inside of said short seal pipe and said heat transfer pipe in coaxial relationship, providing a through hole at a lower part thereof and providing a metallic support fitting welded at the bottom thereof, and wherein said short seal pipe is connected to an inlet pipe of an air to be heated and supported by a structural member of said air heater at a top end thereof, said metallic pipe is connected to an outlet pipe of a heated air and supported by a structural member of said air heater at a top end thereof, said heat transfer pipe is supported by said metallic support fitting by being set into a hollow part formed on an inner surface of said heat transfer pipe.

* * * * *